(12) United States Patent
Galles et al.

(10) Patent No.: US 11,593,294 B2
(45) Date of Patent: Feb. 28, 2023

(54) METHODS AND SYSTEMS FOR LOOSELY COUPLED PCIE SERVICE PROXY OVER AN IP NETWORK

(71) Applicant: Pensando Systems Inc., Milpitas, CA (US)

(72) Inventors: Michael Brian Galles, Los Altos, CA (US); Silvano Gai, Bend, OR (US); Mario Mazzola, San Jose, CA (US); Luca Cafiero, Palo Alto, CA (US); Francis Matus, Gainesville, GA (US); Krishna Doddapaneni, Cupertino, CA (US); Sarat Kamisetty, Fremont, CA (US)

(73) Assignee: Pensando Systems Inc., Milpitas, CA (US)

( * ) Notice: Subject to any disclaimer, the term of this patent is extended or adjusted under 35 U.S.C. 154(b) by 0 days.

(21) Appl. No.: 17/326,282

(22) Filed: May 20, 2021

(65) Prior Publication Data
US 2022/0374379 A1    Nov. 24, 2022

(51) Int. Cl.
*G06F 13/40* (2006.01)
*H04L 45/745* (2022.01)
*H04L 41/50* (2022.01)

(52) U.S. Cl.
CPC ...... *G06F 13/4022* (2013.01); *H04L 41/5077* (2013.01); *H04L 45/745* (2013.01);
(Continued)

(58) Field of Classification Search
CPC ......... G06F 13/4022; G06F 2213/0026; G06F 2213/0058; H04L 41/5077; H04L 45/745
See application file for complete search history.

(56) References Cited

U.S. PATENT DOCUMENTS

| 9,639,589 B1* | 5/2017 | Theimer | G06F 11/3006 |
| 2008/0239945 A1* | 10/2008 | Gregg | G06F 11/2094 370/217 |
| 2012/0093211 A1* | 4/2012 | Ogami | H04L 1/188 375/224 |
| 2014/0122769 A1 | 5/2014 | Su et al. | |
| 2014/0351395 A1 | 11/2014 | Murthy et al. | |

(Continued)

OTHER PUBLICATIONS

Van Renesse, Robbert et al. "Chain Replication for Supporting High Throughput and Availability", 2004, 14 pgs.
(Continued)

*Primary Examiner* — Glenn A. Auve
(74) *Attorney, Agent, or Firm* — Loza & Loza LLP

(57) ABSTRACT

PCIe devices installed in host computers communicating with service nodes can provide virtualized and high availability PCIe functions to host computer workloads. The PCIe device can receive a PCIe TLP encapsulated in a PCIe DLLP via a PCIe bus. The TLP includes a TLP address value, a TLP requester identifier, and a TLP type. The PCIe device can terminate the PCIe transaction by sending a DLLP ACK message to the host computer in response to receiving the TLP. The TLP packet can be used to create a workload request capsule that includes a request type indicator, an address offset, and a workload request identifier. A workload request packet that includes the workload request capsule can be sent to a virtualized service endpoint. The service node, implementing the virtualized service endpoint, receives a workload response packet that includes the workload request identifier and a workload response payload.

20 Claims, 41 Drawing Sheets

(52) U.S. Cl.
CPC ............... *G06F 2213/0026* (2013.01); *G06F 2213/0058* (2013.01)

(56) References Cited

U.S. PATENT DOCUMENTS

| | | |
|---|---|---|
| 2015/0067229 A1 | 3/2015 | Connor et al. |
| 2016/0380964 A1 | 12/2016 | Kuo et al. |
| 2017/0054593 A1* | 2/2017 | Borikar ................. H04L 49/35 |
| 2018/0034769 A1 | 2/2018 | Modi et al. |
| 2018/0115586 A1 | 4/2018 | Chou et al. |
| 2018/0309595 A1 | 10/2018 | Ma |
| 2020/0192848 A1* | 6/2020 | Maroney ............. G06F 12/0292 |
| 2020/0272920 A1 | 8/2020 | Liu et al. |
| 2020/0382329 A1 | 12/2020 | Yuan |
| 2021/0044570 A1 | 2/2021 | Hsu Liu et al. |
| 2021/0099368 A1 | 4/2021 | Chitalia et al. |

OTHER PUBLICATIONS

Terrace, Jeff et al. "Object Storage on CRAQ—High-throughput chain replication for read-mostly workloads", 2009, 16 pgs.

Xillybus, "Down to the TLP: How PCI express devices talk (Part I)", Nov. 13, 2012, 7 pgs.

Expether Consortium "Technology Deep Dive", https://expether.org/technology.html, retrieved Apr. 2, 2021, 4 pgs.

Silla, Federico, "GPU virtualization: from vGPU and MIG to rCUDA", HPC-AI 2020 UK Conference, (2020), 41 pgs.

Metz, J. "Let's Talk Fabrics", Jun. 27, 2018, 49 pgs.

PCI Express, "Base Specification Revision 3.1a", Dec. 7, 2015, 1075 pgs.

Minturn, Dave, "Under the Hood with NVMe over Fabrics", Dec. 15, 2015, 47 pgs.

NVM Express, "NVM ExpressTM over Fabrics, Revision 1.1", Oct. 22, 2019, 83 pgs.

NVM Express, "NVM ExpressTM Management Interface, Revision 1.1C", Feb. 2, 2021, 155 pgs.

PCI-SIG®, "Single Root I/O Virtualization and Sharing Specification, Revision 1.1", Jan. 20, 2010, 100 pgs.

Non-Final Office Action, U.S. Appl. No. 17/326,279; (dated Mar. 1, 2022), 50 pgs.

* cited by examiner

| Virtualized PCIe Function Map (at service node) 2201 | | | | | |
|---|---|---|---|---|---|
| PCIe Device Identifier 2202 | PCIe Function Identifier (from Workload Packet) 2203 | Request Type Indicator 2204 | Address Offset 2205 | Transaction Endpoint Node 2206 | Transaction Endpoint Type 2207 |
| 12 | 3 | Read | 0xFF...0 | Node/Chain ID 1 | Executable Code Indicator |
| 12 | 2 | Write | 0xFF...0 | Node/Chain ID 1 | Switch PCIe Device 1 (via switch PCIe bus) |
| 55 | 3 | Write | 0xFE...0 | Node/Chain ID 1 | Executable Code Indicator |
| 1024 | 42 | Write | 0x0F...0 | Node/Chain ID 1 | Local Device (in service node) |
| ... | | | | | |
| 1 | 7 | Write | 0x00...7 | Node/Chain ID 1 | Switch PCIe Device 2 (via switch PCIe bus) |

FIG. 22

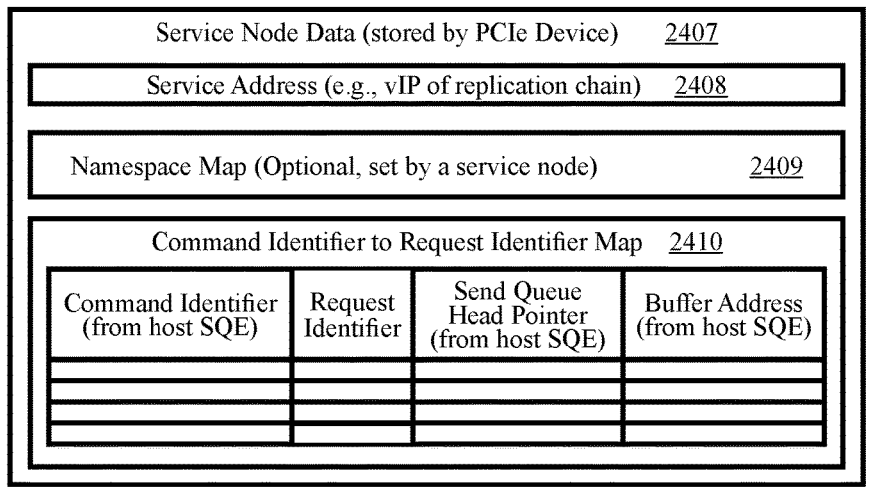

| Service Node Data (stored by PCIe Device) 2407 |
| --- |
| Service Address (e.g., vIP of replication chain) 2408 |
| Namespace Map (Optional, set by a service node) 2409 |

| Command Identifier to Request Identifier Map 2410 |||||
| --- | --- | --- | --- |
| Command Identifier (from host SQE) | Request Identifier | Send Queue Head Pointer (from host SQE) | Buffer Address (from host SQE) |
|  |  |  |  |
|  |  |  |  |
|  |  |  |  |

FIG. 27

| Command Identifier to Request Identifier Map (at Service Node) 2801 |||||||
| --- | --- | --- | --- | --- | --- | --- |
| PCIe Device Identifier | PCIe Function Identifier | Command Identifier (from host SQE) | Request Identifier | Command Identifier (SQE to SAN) | Send Queue Head Pointer (from host SQE) | Buffer Address (from host SQE) |
|  |  |  |  |  |  |  |
|  |  |  |  |  |  |  |
|  |  |  |  |  |  |  |
|  |  |  |  |  |  |  |

FIG. 28

METHODS AND SYSTEMS FOR LOOSELY COUPLED PCIE SERVICE PROXY OVER AN IP NETWORK

TECHNICAL FIELD

The embodiments relate to networking equipment, high availability networking equipment, switches, routers, network interface cards, PCIe physical functions, PCIe virtual functions, storage area networks, NVMe controllers, and NVMe-oF hardware.

BACKGROUND

Data centers are currently populated by servers, switches, and routers installed in equipment racks. The switches are often called top-of rack (TOR) because, historically, they were often positioned at the top of the equipment rack with the servers underneath. High availability switching can be obtained with two TOR switches in active-active or active-passive configurations. A local network, also called a private network, inside the rack connects the servers to the TOR switches. The TOR switches connect the private networks to public networks. The public networks can connect the TOR switches of the racks to one another and to the world outside the data center. Storage area networks may be deployed in some of the racks to provide persistent storage for the servers installed in other racks.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method can include receiving a data link layer packet (DLLP) from a host computer via a PCIe bus, unpacking the DLLP to obtain a transport layer packet (TLP) that includes a TLP address value, a TLP requester identifier, and a TLP type, sending a DLLP ACK message to the host computer in response to receiving the TLP, using the TLP to create a workload request capsule that includes a request type indicator, an address offset, and a workload request identifier, sending a workload request packet that includes the workload request capsule to a virtualized service endpoint, and receiving a workload response packet that includes the workload request identifier and a workload response payload.

Another aspect of the subject matter described in this disclosure can be implemented by a system. The system can include a PCIe device attached to a PCIe bus of a host computer. The PCIe device can be configured to receive a transport layer packet (TLP) that includes a TLP requester identifier, send a DLLP ACK message via the PCIe bus in response to receiving the TLP, use the TLP to create a workload request capsule, send the workload request capsule to a virtualized service endpoint, receive a workload response packet that includes a workload request identifier, and send a second TLP that is responsive to the TLP to the host computer via the PCIe bus.

Another aspect of the subject matter described in this disclosure can be implemented by a system. The system can include a circular replication chain that includes a plurality of service nodes configured to replicate virtualized service state information via chain replication, and a load balancer configured to distribute workload packets among the plurality of service nodes. Each of the service nodes can be configured to provide a virtualized PCIe function, receive a workload request packet that includes a workload request capsule from a PCIe device, process the workload request capsule to produce a workload response payload by using an address offset or a request type indicator in the workload request capsule, send the workload response payload in a workload response packet to the PCIe device, send replication packets to a downstream peer in the circular replication chain, and receive replication packets from an upstream peer in the circular replication chain.

Another aspect of the subject matter described in this disclosure can be implemented by a system. The system can include a means for providing a virtualized PCIe function using a replication chain that includes a plurality of service nodes.

In some implementations of the methods and devices, the method can include using the TLP requester identifier and the workload response payload to produce a second TLP, and sending the second TLP to the host computer via the PCIe bus. In some implementations of the methods and devices, the method can include receiving the workload request packet, producing the workload response payload based on the request type indicator or the address offset, producing the workload response packet, and sending the workload response packet. In some implementations of the methods and devices, producing the workload response payload includes using the request type indicator to determine a request type, using a local base address and the address offset to determine a local address, creating a first local TLP that includes the request type in a TLP type field and that includes the local address in a TLP address field, sending the first local TLP to a PCIe function via a local PCIe bus, and receiving a second local TLP that is responsive to the first local TLP, wherein the second local TLP is used to produce the workload response payload.

In some implementations of the methods and devices, producing the workload response payload includes using the request type indicator to identify an executable code, and producing a code output by executing the executable code, wherein the code output is used to produce the workload response payload. In some implementations of the methods and devices, the method can include receiving a workload write request capsule that includes a write address offset and data, using the write address offset to determine a write address, using a direct memory access operation to write the data into a location in a memory, wherein the location in the memory is determined using the write address, and sending a workload write response capsule indicating that the data has been successfully written. In some implementations of the methods and devices, a virtualized PCIe function map associates a plurality of PCIe functions with a plurality of virtualized service endpoints, the host computer sends the TLP to a PCIe function, and the virtualized service endpoint is determined based on the PCIe function and the virtualized PCIe function map. In some implementations of the methods and devices, a plurality of TLPs is used to create the workload request packet, and the workload response packet is used to produce a second plurality of TLPs.

In some implementations of the methods and devices, the host computer sends the TLP to a PCIe function that has a base address, and the address offset indicates a difference of the TLP address value relative to base address. In some implementations of the methods and devices, a plurality of service nodes in a circular replication chain are configured for chain replication of a virtualized service state information, each of the service nodes has an upstream peer and has a downstream peer in the circular replication chain, and a load balancer routes the workload request packet to a selected service node that is one of the service nodes. In some implementations of the methods and devices, processing the workload request packet by the selected service node does not change the virtualized service state information, and the selected service node sends the workload response packet without waiting for a virtualized service state replication confirmation. In some implementations of the methods and devices, processing the workload request packet by the selected service node changes the virtualized service state information, and the selected service node waits for a virtualized service state replication confirmation from the upstream peer before sending the workload response packet.

In some implementations of the methods and devices, the system can include a service node configured to receive the workload request capsule, use an address offset and a request type indicator in the workload request capsule to produce the workload response packet, and send the workload response packet to the PCIe device. In some implementations of the methods and devices, the service node can be configured to receive a workload write request capsule that includes a write address offset and data, use the write address offset to determine a write address, use a direct memory access operation to write the data into a location in a memory, wherein the location in the memory is determined using the write address, and send a workload write response capsule indicating that the data has been successfully written. In some implementations of the methods and devices, the PCI device can be configured to receive a workload write request capsule that includes a write address offset and data, use the write address offset to determine a write address, use a direct memory access operation to write the data into a location in a memory of the host computer, wherein the location in the memory is determined using the write address, and sending a workload write response capsule indicating that the data has been successfully written. In some implementations of the methods and devices, the load balancer routes the workload request packet to a selected service node that is one of the service nodes, processing the workload request capsule by the selected service node does not change the virtualized service state information, and the selected service node sends the workload response packet without waiting for a virtualized service state replication confirmation from the upstream peer. In some implementations of the methods and devices, the load balancer routes the workload request packet to a selected service node that is one of the service nodes, processing the workload request capsule by the selected service node changes the virtualized service state information, the selected service node sends a replication packet to the downstream peer, and the selected service node waits for a virtualized service state replication confirmation from the upstream peer before sending the workload response packet.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 22 is a diagram of an exemplary virtualized PCIe function map according to some aspects.

FIG. 27 is a diagram illustrating exemplary service node data stored by a PCIe device according to some aspects.

FIG. 28 is a diagram illustrating an exemplary command identifier to request identifier map according to some aspects.

Throughout the description, similar reference numbers may be used to identify similar elements.

DETAILED DESCRIPTION

Figure 1:
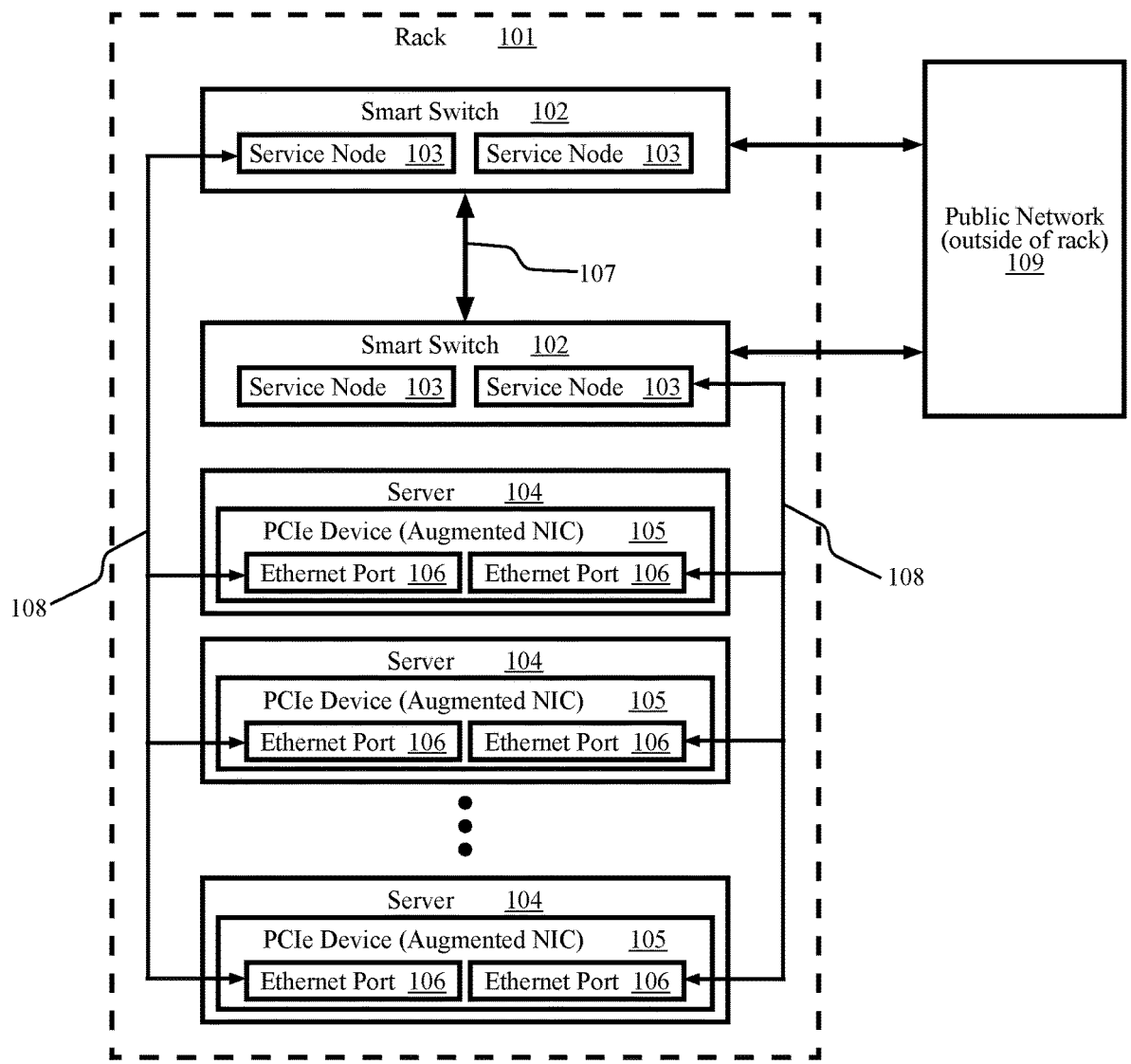
FIG. 1 is a high-level diagram illustrating an equipment rack with a local network carrying local transport protocol (LTP) network traffic according to some aspects.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

The hardware infrastructure of data centers often has a large number of servers connected to one or two switches. The switches connect the local or private network of the servers to the outside or public network of the data center. The switches may provide services such as network address translation (NAT) and or firewalling. Recent data center advances have involved configuring the servers with powerful network interface cards (NICs) that are often called smartNICs. SmartNICs can offload functionality that previously burdened the server's central processing units (CPUs). For example, a smartNIC can implement entire network protocol stacks, storage adapters, security functions, etc. As such, the host computers (the servers) can dedicate more processing power to the workloads. The workloads include the web servers, database servers, and other programming the data center's tenants run on the servers. The end result has been more efficient and cost effective data centers.

SmartNICs, however, can be expensive and power hungry and a typical data center may require hundreds to thousands of smartNICs. Thus, it has been realized that significant portions of the advanced services provided by smartNICs can be disaggregated such that servers can be equipped with less expensive purpose built NICs that consume less power and the services previously provided by full featured smartNICs can be collectively provided by a combination of purpose built NICs and a smart switch, or smart switches. In an embodiment, a NIC for such an implementation is a PCIe device that provides access points to virtualized services that are offered by a smart switch. The PCIe device and the smart switch work in concert using a simplified and lightweight network protocol, referred to as a local transport protocol (LTP), to communicate. LTP can be a highly reliable protocol with low overhead because it is designed to operate between a PCIe device and a smart switch that typically communicate within a rack of servers over only a few meters of cable or fiber. UDP has been used to carry LTP between service nodes and PCIe devices with good results while adding a minimal amount of overhead. In contrast, transmission control protocol provides reliable transmission at great distances at the cost of much higher overhead.

A further advance can be realized by equipping the smart switches with service nodes. A single service node may act as a smart switch, but advantages in availability and scalability can be realized with numerous service nodes integrated into a smart switch. The service nodes can be configured as a circular replication chain. The circular replication chain is an advancement over the replication chains currently being researched for database applications. Non-circular replication chains have a head node, one or more intermediate nodes, and a tail node. Certain operations must be directed to the head node of a non-circular replication chain. Circular replication chains have no head and no tail. The characteristics of the service state information maintained by the service nodes leads to strong consistency in the replication.

Many advantages may be obtained by using service nodes to provide virtualized offloads via network connected PCIe devices. The price per server may be substantially reduced because the PCIe devices are more simplified versions of typical smartNICs. Furthermore, the PCIe devices may have less need for maintenance, replacement, or upgrading because they are more simplified devices. Additionally, the PCIe devices will consume less power per bit of processed data, e.g., nanowatt/packets per second (pps) or nanojoule/packet. While the PCIe devices may have a more simplified set of capabilities, more advanced capabilities are provided by the service nodes. The service nodes can be relatively easy to maintain at least because a service node can be taken out of its replication chain, off lined, upgraded, and reinserted into the replication chain without service disruption. A hitless upgrade can thereby be achieved. Additional switching capacity can be added by adding service nodes to a chain, which may be easier than installing a more powerful switch. It is expected that replication chains in combination with providing virtualized services and CPU offloads will lead to a paradigm shift in data center operations.

Using a combination of purpose built NICs and smart switches with service nodes, network services can be coordinated between the NICs and the service nodes in a manner that enables advanced services to be provided for a set of host servers in a cost efficient and energy efficient manner. In one example, a rack that includes forty-eight servers can be equipped with forty-eight purpose built NICs and eight service nodes instead of forty-eight full featured smartNICs. Such a network architecture can provide significant savings in terms of both capital expense (capex) and operating expense (opex) as compared to a network architecture in which each server has a full featured smartNIC. Additionally, utilizing such a combination of NICs and service nodes can reduce overall power consumption per unit of data processed, which will reduce the environmental impact of such computing systems. Although there are clear cost and environmental benefits to such an approach, designing and operating a network with services disaggregated between NICs and service nodes is not a trivial task. Various methods and systems are described herein that enable the implementation of a network with services that are disaggregated between NICs and service nodes in ways that heretofore have not been realized.

FIG. 1 is a high-level diagram illustrating an equipment rack 101 with a local network 108 carrying local transport protocol (LTP) network traffic according to some aspects. Two smart switches 102 are installed in the rack 101 and are connected to one another by a high bandwidth spine 107. The smart switches 102 include service nodes 103 that can provide virtualized functions via the local network 108. Numerous servers 104 are also installed in the rack 101 and PCIe devices 105 are installed in the servers 104. The PCIe devices may be considered to be augmented NICs. The augmentation is that in addition to network connectivity, the NICs also provide access to the virtualized functions provided by the service nodes. The smart switches connect the local network 108 to a public network 109. The public network can be the tightly controlled and secured network within the data center and outside the rack 101. The local network can carry local transport protocol (LTP) packets between the PCIe devices 105 and the service nodes 103. The smart switches 102 and the service nodes 103 can be configured to keep LTP packets within the local network 108.

Figure 2:
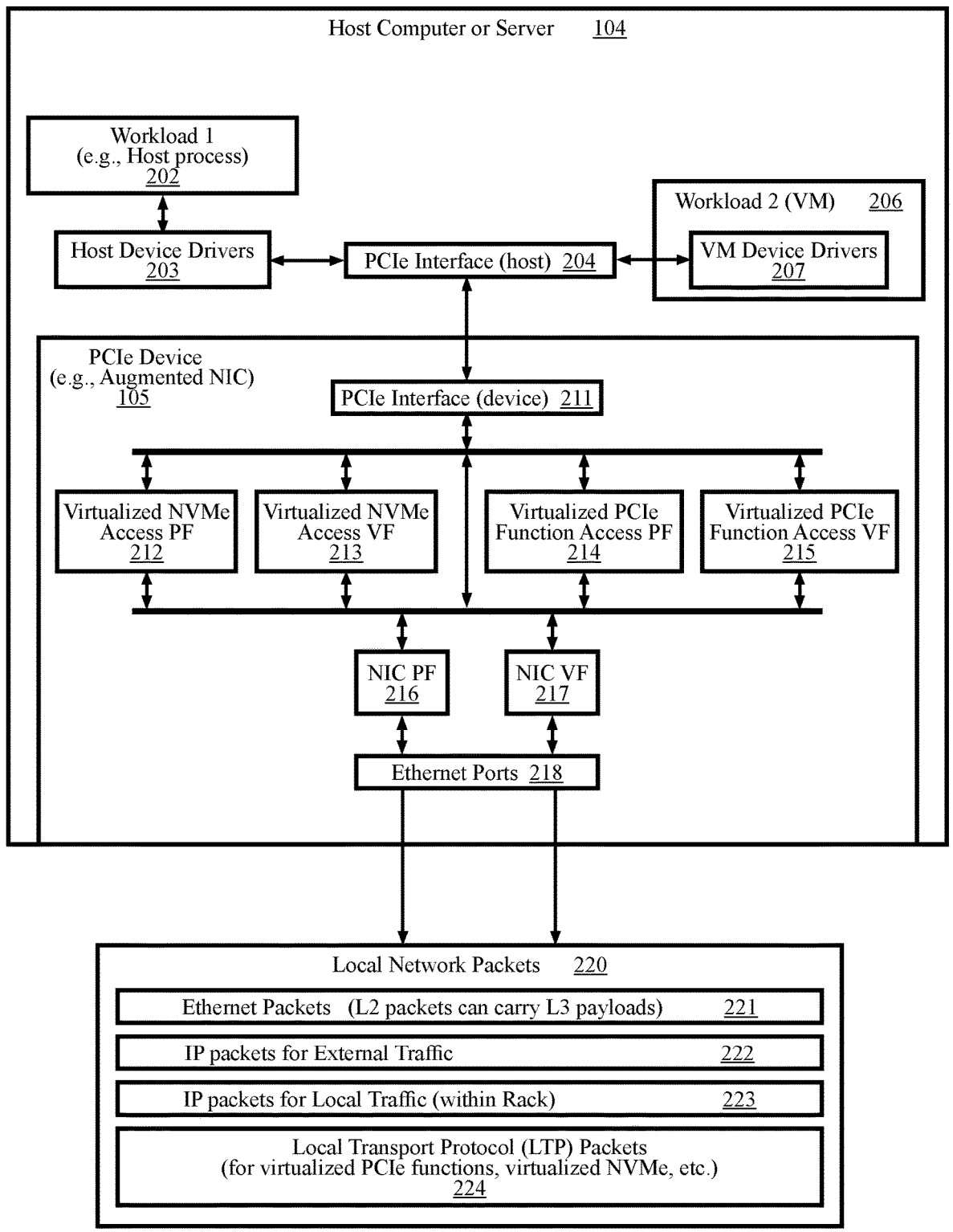
FIG. 2 is a high-level diagram illustrating a peripheral component interconnect express (PCIe) device in a server according to some aspects.

FIG. 2 is a high-level diagram illustrating a peripheral component interconnect express (PCIe) device 105 in a server 104 according to some aspects. PCIe devices can use a PCIe bus to communicate with one another. "PCI Express Base Specification Revision 3.1a" (hereinafter "the PCIe specifications") published on Dec. 7, 2015 by PCI-SIG provides specifications for the PCIe bus and device communications using the PCIe bus. The host computer 104 can run workloads such as workload 1 202 and workload 2 206. Workload 1 202 is running directly on the host 104 and uses the host device drivers 203 to access hardware installed in the host 104. Workload 2 206 is a virtual machine (VM) running on the host 104. In some implementations, the hardware installed in the host 104 is a PCIe single root input output virtualization (SR-IOV) or a PCIe multiple root input output virtualization (MR-IOV) device. For simplicity, SR-IOV will be discussed here with the understanding that MR-IOV also provides the capabilities. "Single Root I/O Virtualization and Sharing Specification Revision 1.1" published by PCI-SIG on Jan. 20, 2010 provides specifications for PCIe SR-IOV. Before SR-IOV was created, PCIe devices provided physical functions and all the processes running on the host, including VMs, shared those physical functions. SR-IOV was created to streamline VM's access to PCIe devices. A SR-IOV capable PCIe device can provide physical functions and can also provide virtual functions. As such, the VM 206 can use its own device drivers 207 to access a VF provided by an SR-IOV capable PCIe device.

The PCIe interface 204 of the host 104 is connected to the PCIe interface 211 of the PCIe device 105. The PCIe bus thereby gives the workloads access to PCIe functions provided by the PCIe device. Those PCIe functions can include a virtualized nonvolatile memory express (NVMe) access physical function (PF) 212, a virtualized NVMe access virtual function (VF) 213, a virtualized PCIe function access PF 214, a virtualized PCIe function access VF 215, a network interface card (NIC) PF 216, and a NIC VF 217. Here, the term "NIC" is used to refer to devices providing network access even though the NIC may be an application specific integrated circuit (ASIC) attached directly to the main circuit board of the host. The PCIe device 105 can send and receive network packets via the ethernet ports 218. The packets sent and received by the PCIe device 105 on the local network can include Ethernet packets 221, internet protocol (IP) packets for external traffic (outside the rack) 222, IP packets for local traffic (inside the rack) 223, and LTP packets 224.

Figure 3:
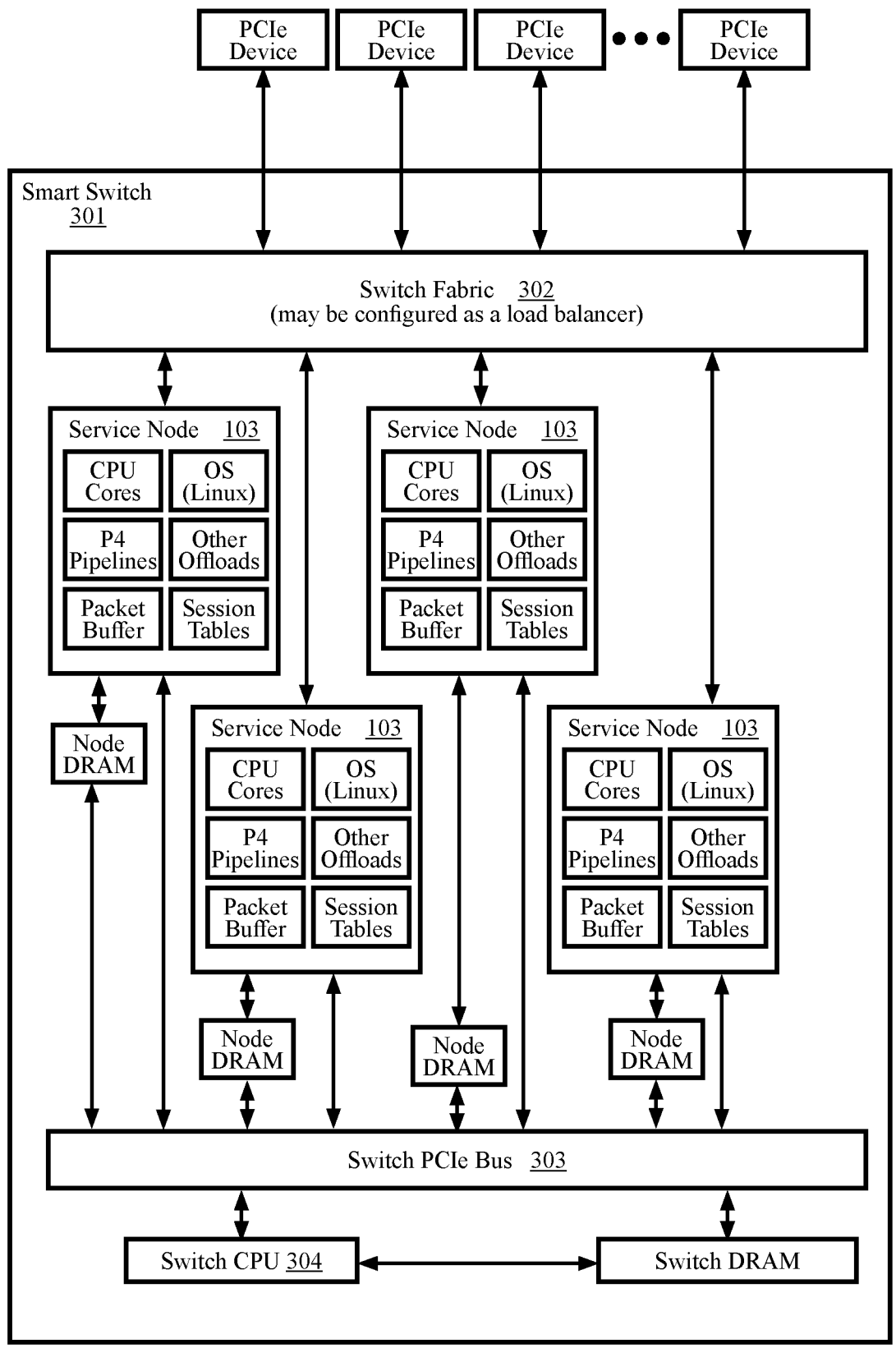
FIG. 3 is a high-level diagram illustrating service nodes in a smart switch according to some aspects.

FIG. 3 is a high-level diagram illustrating service nodes 103 in a smart switch 301 according to some aspects. The smart switch 301 includes a switch fabric 302 that may be configured as a load balancer. ASICs capable of implementing switching fabric 302 are currently commercially available. The service nodes each have a node dynamic random-access memory (DRAM). The service nodes 103 can communicate with one another, with PCIe devices, and with the public network through the switch fabric 302. A switch CPU 304 can control and monitor the smart switch 301. The switch CPU 304 has switch DRAM. A switch PCIe bus 303 provides communications between the service nodes 103, the switch CPU 304, the node DRAMs, and the switch DRAM.

Figure 4:
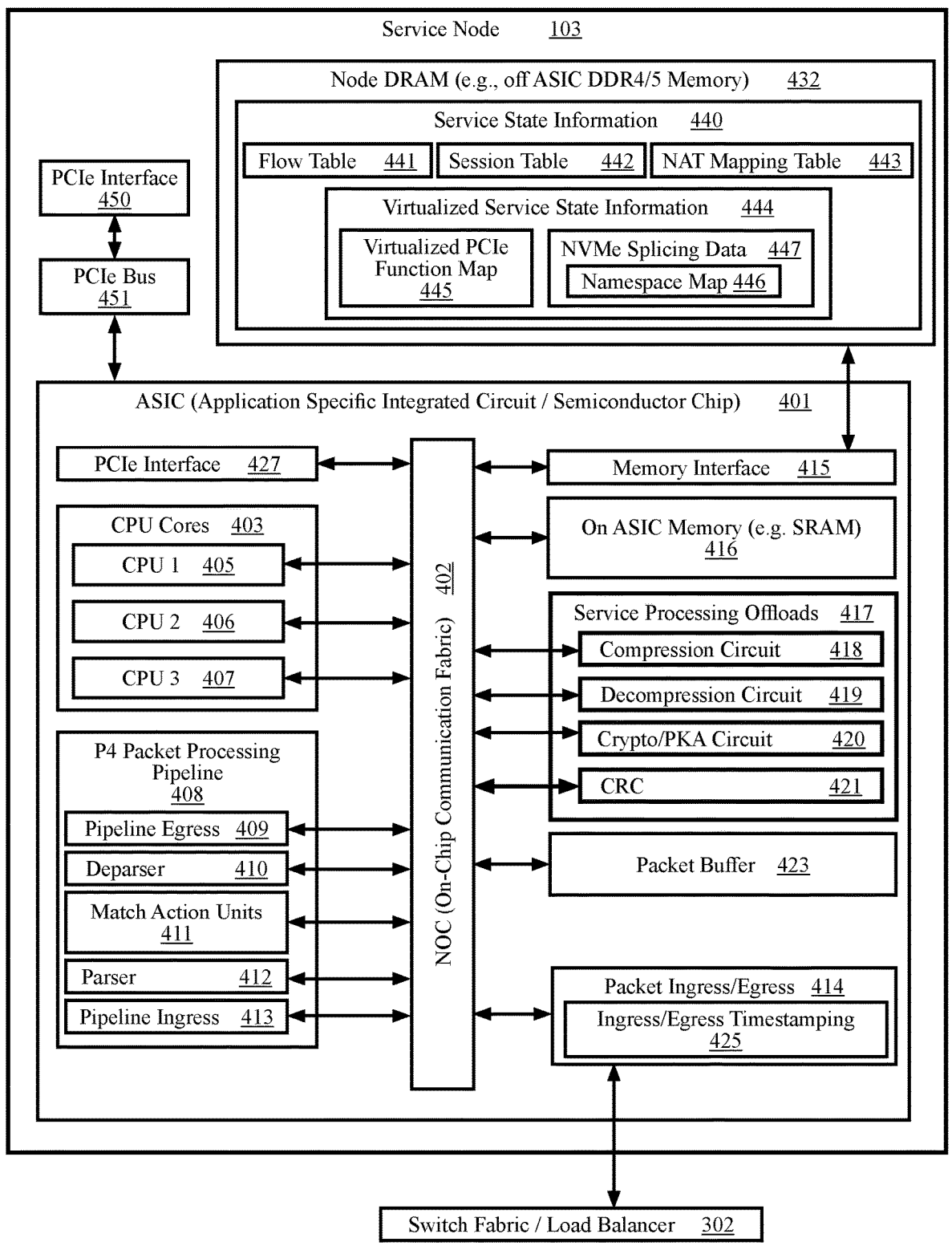
FIG. 4 is a functional block diagram of a service node having an application specific integrated circuit (ASIC), according to some aspects.

FIG. 4 is a functional block diagram of a service node 103 having an application specific integrated circuit (ASIC) 401, according to some aspects. A service node can include a PCIe interface 450 and may be installed in a smart switch. The service node 103 includes an off-ASIC memory 432 that can be one of the widely available memory modules or chips such as double data rate (DDR) 4 Synchronous DRAM (SDRAM) modules or DDR5 SDRAM modules such that the ASIC has access to many gigabytes of memory.

The ASIC 401 is a semiconductor chip having many core circuits interconnected by an on-chip communications fabric, sometimes called a network on a chip (NOC) 402. NOCs are often implementations of standardized communications fabrics such as the widely used advanced extensible interface (AXI) bus. The ASIC's core circuits can include the PCIe interface 450, central processing unit (CPU) cores 403, P4 packet processing pipeline 408 elements, memory interface 415, on ASIC memory (e.g., static random-access memory (SRAM)) 416, service processing offloads 417, a packet buffer 423, and packet ingress/egress circuits 414. The PCIe interface 450 can be used to communicate with external devices and to the ASIC via a PCIe bus 451. The CPU cores 403 can include numerous CPU cores such as CPU 1 405, CPU 2 406, and CPU 3 407. The P4 packet processing pipeline 408 can include a pipeline ingress circuit 413, a parser circuit 412, match-action units 411, a deparser circuit 410, and a pipeline egress circuit 409. The service processing offloads 417 are circuits implementing functions that the ASIC uses so often that the designer has chosen to provide hardware for offloading those functions from the CPUs. The service processing offloads can include a compression circuit 418, decompression circuit 419, a crypto/PKA circuit 420, and a CRC calculation circuit 421. The specific core circuits implemented within the non-limiting example of ASIC 401 have been selected such that the ASIC implements many, perhaps all, of the functionality of an InfiniB and channel adapter, of a non-volatile memory express (NVMe) card, and of a network appliance that processes network traffic flows carried by IP (internet protocol) packets.

The P4 packet processing pipeline 408 is a specialized set of elements for processing network packets such as IP packets, NVMe protocol data units (PDUs), and InfiniBand PDUs. The P4 pipeline can be configured using a domain-specific language. The concept of a domain-specific language for programming protocol-independent packet processors, known simply as "P4," has developed as a way to provide some flexibility at the data plane of a network appliance. The P4 domain-specific language for programming the data plane of network appliances is defined in the "P4 16 Language Specification," version 1.2.0, as published by the P4 Language Consortium on Oct. 23, 2019. P4 (also referred to herein as the "P4 specification," the "P4 language," and the "P4 program") is designed to be implementable on a large variety of targets including network switches, network routers, programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The memory interface 415 coordinates memory I/O operations to and from the off-ASIC memory 432. When the off-ASIC memory is DRAM, the memory controller may be called a DRAM controller. The off-ASIC memory can store data used by the ASIC 401 and the service node 103. That data can include service state information 440. The service state information can include a flow table 441, a session table 442, a NAT mapping table 443, and virtualized service state information 444. The virtualized service state information 444 can include a virtualized PCIe function map 445 and NVMe splicing data 447. The NVMe splicing data can include a namespace map 446.

The CPU cores 403 can be general purpose processor cores, such as reduced instruction set computing (RISC) processor cores, advanced RISC machine (ARM) processor cores, microprocessor without interlocked pipeline stages (MIPS) processor cores, and/or x86 processor cores. Each CPU core can include a memory interface, an ALU, a register bank, an instruction fetch unit, and an instruction decoder, which are configured to execute instructions independently of the other CPU cores. The CPU cores may be programmable using a general-purpose programming language such as C.

The CPU cores 403 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 403 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniB and channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 423 can act as a central on-chip packet switch that delivers packets from the switch fabric 302 to packet processing elements of the data plane and vice-versa. The packet processing elements can include a slow data path implemented in software and a fast data path implemented by packet processing circuitry 408.

The P4 packet processing pipeline 408 can be a specialized circuit or part of a specialized circuit implementing programmable packet processing pipelines. Some embodiments include a P4 pipeline as a fast data path within the network appliance. The fast data path is called the fast data path because it processes packets faster than a slow data path that can also be implemented within the network appliance. An example of a slow data path is a software implemented data path wherein the CPU cores 403 and memory 432 are configured via software to implement a slow data path.

Figure 5:
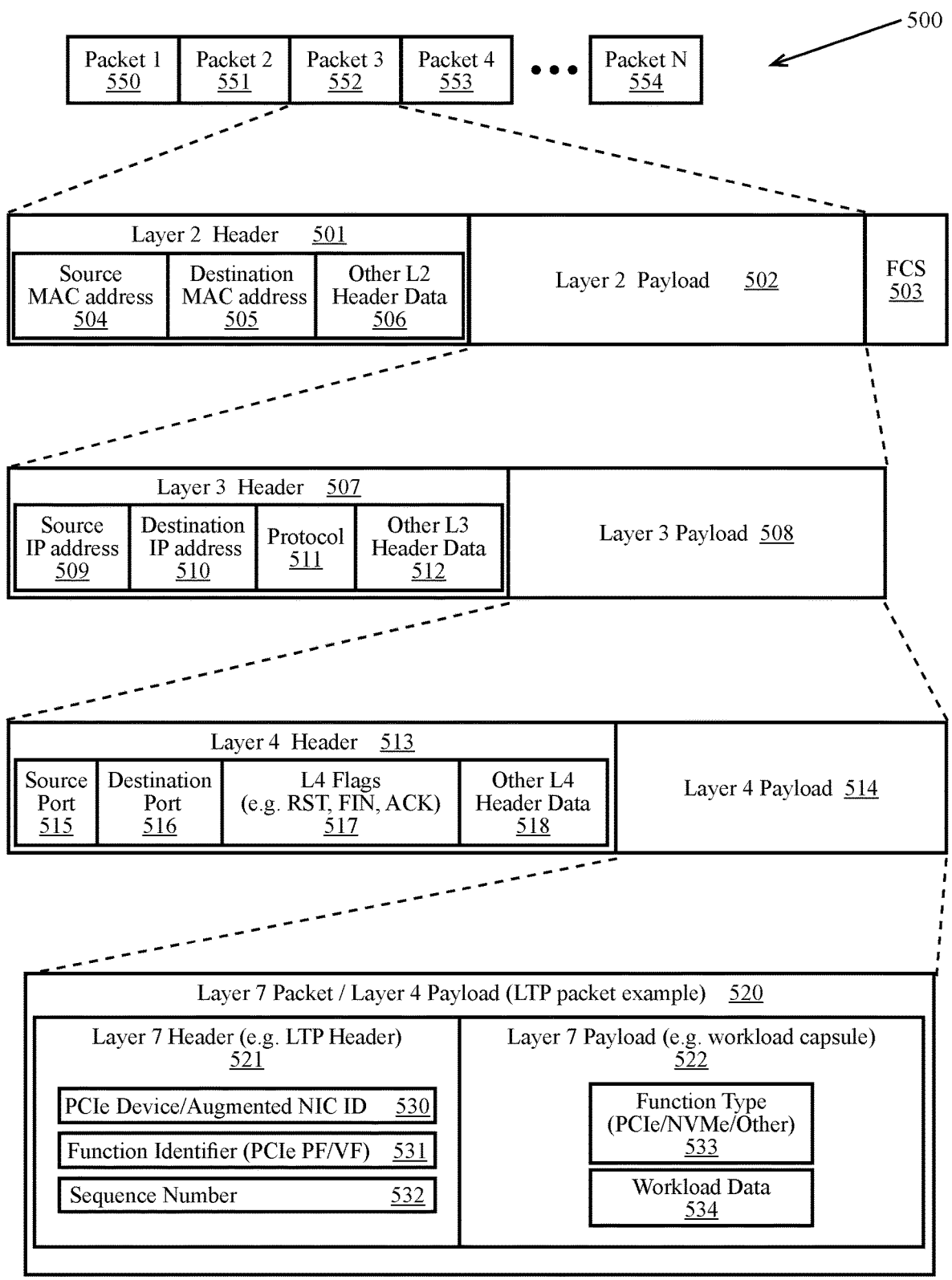
FIG. 5 is a diagram illustrating network packets according to some aspects.

FIG. 5 is a diagram illustrating network packets according to some aspects. A network traffic flow 500 can have numerous packets such as a first packet 550, a second packet 551, a third packet 552, a fourth packet 553, and a final packet 554 with many more packets between the fourth packet 553 and the final packet 554. The term "the packet" or "a packet" can refer to any of the packets in a network traffic flow. Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received as a raw bit stream or transmitted as a raw bit stream.

The link layer is often called layer 2. The protocols of the link layer operate within the scope of the local network connection to which a device is attached and includes all devices accessible without traversing a router. The link layer is used to move packets between the interfaces of two different devices on the same link. The packet has a layer 2 header 501, a layer 2 payload 502, and a layer 2 frame check sequence (FCS) 503. The layer 2 header can contain a source media access control (MAC) address 504, a destination MAC address 505, and other layer 2 header data 506. The input ports and output ports of a network connected device can have MAC addresses. Ethernet, also known as Institute of Electrical and Electronics Engineers (IEEE) 802.3 is a layer 2 protocol. IEEE 802.11 (WiFi) is another widely used layer 2 protocol. The layer 2 payload 502 can include a layer 3 packet. The layer 2 FCS 503 can include a CRC (cyclic redundancy check) calculated from the layer 2 header and layer 2 payload. The layer 2 FCS can be used to verify that the packet has been received without errors.

The internet layer, often called layer 3, is the network layer where layer 3 packets can be routed from a first node to a second node across multiple intermediate nodes. The nodes can be switches, servers, and devices such as service nodes 103 and PCIe devices 105. Internet protocol (IP) is a commonly used layer 3 protocol. A layer 3 packet can have a layer 3 header 507 and a layer 3 payload 508. The layer 3 header 507 can have a source IP address 509, a destination IP address 510, a protocol indicator 511, and other layer 3 header data 512. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 504 indicating the first node, a destination MAC address 505 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 504 indicating the intermediate node, a destination MAC address 505 indicating the second node, and the IP packet as a payload. The layer 3 payload 508 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 507 using protocol indicator 511. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 508 includes a TCP header and a TCP payload. UDP can provide for computer applications to send messages, in this case referred to as datagrams, to other hosts on an IP network using a connectionless model. When carrying UDP data, a layer 3 payload 508 includes a UDP header and a UDP payload. ICMP is used by network devices, including routers, to send error messages and operational information indicating success or failure when communicating with another IP address. ICMP uses a connectionless model.

A layer 4 packet can have a layer 4 header 513 and a layer 4 payload 514. The layer 4 header 513 can include a source port 515, destination port 516, layer 4 flags 517, and other layer 4 header data 518. The source port and the destination port can be integer values used by host computers to deliver packets to application programs configured to listen to and send on those ports. The layer 4 flags 517 can indicate a status of or action for a network traffic flow. For example, TCP has the RST, FIN, and ACK flags. RST indicates a TCP connection is to be immediately shut down and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 514 can contain a layer 7 packet.

The application layer, often called layer 7, includes the protocols used by most applications for providing user services or exchanging application data over the network connections established by the lower level protocols. Examples of application layer protocols include RDMA over Converged Ethernet version 2 (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol units (such as TCP or UDP messages), which in turn use lower layer protocols to effect actual data transfer.

A layer 4 payload 514 may include a layer 7 packet 520. A layer 7 packet 520 can be an HTTP packet, an InfiniBand PDU, or some other L7 packet. A layer 7 packet 520 can include a layer 7 header 521 and a layer 7 payload 522. The illustrated layer 7 packet is a local transport protocol (LTP) packet 520 that has a LTP header 521 and a LTP payload 522. The LTP header can include a PCIe device identifier 530, a function identifier 531, and a sequence number 532. The LTP payload 522 can be a workload capsule. The workload capsule can include a function type 533 and workload data 534. The PCIe device identifier 530 and the function identifier 531 can be used to identify a specific PCIe device and a function implemented by that PCIe device. The function type 533 can indicate the type of function such as a virtualized PCIe function, a virtualized NVMe function, etc. The sequence number 532 can be used to determine that a LTP packet has been lost such that it can be retransmitted. The LTP packets are illustrated as carried in UDP packets although they can be carried as the payloads of other L3 packets and can be carried as the payloads of L2 packets such as ethernet packets.

Figure 6:
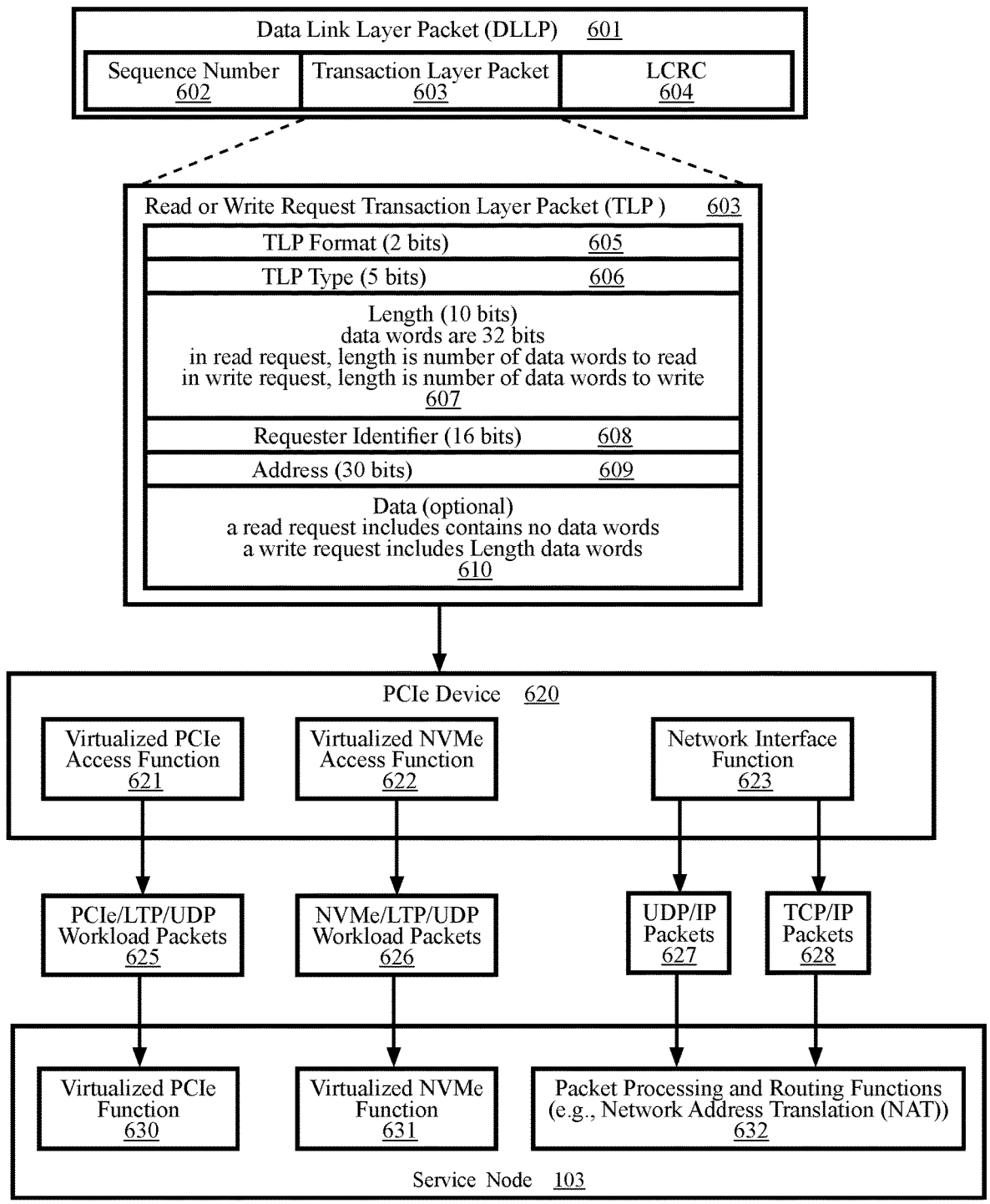
FIG. 6 illustrates using a PCIe device to access services and virtualized functions provided by a service node according to some aspects.

FIG. 6 illustrates using a PCIe device 620 to access services and virtualized functions provided by a service node 103 according to some aspects. A PCIe bus can use a data link layer packet (DLLP) 601 to carry a transaction layer packet (TLP) from one device to another device. The contents of DLLPs and TLPs is specified by the PCIe specification. A DLLP 601 includes a sequence number 602, a TLP 603, and a link cycle redundancy code (LCRC) 604. A TLP 603 includes a TLP format 605, TLP type 606, length 607, request identifier 608, address 609, and may contain data 610.

The PCIe device 620 can receive the TLP 603. The TLP 603 can be a request such as a read request or a write request. The PCIe device can determine if the TLP is a read or write request by examining the TLP format 605 and the TLP type 606. The TLP 603 can indicate a length 607 and an address 609. The length 607 indicates the number of data words (dwords) that are to be read or written. For PCIe, a dword is 32 bits. The address 609 is the physical address to which data is to be written or from which data is to be read. For a write request, the TLP 603 includes the data 610 that is to be written to the physical address. There can be many devices connected to a PCIe bus, each of which may generate TLPs. The requester identifier 608 indicates the device that sent the TLP such that a response may, at a later time, be returned to that device.

The PCIe device 620 may interpret the TLP by, for example, writing or reading data exactly as indicated by the request. A read request sent to a non-virtualized device may therefore read a register or memory location on that non-virtualized device. Similarly, a write operation to a non-virtualized device can write into a register or memory location of the device and may trigger the device to perform an operation.

In the case of virtualized functions, the TLP is used to produce a workload packet. An LTP packet can be a workload capsule. For example, an LTP packet can carry a workload capsule that was produced using the TLP. The LTP packet does not simply encapsulate the TLP. The PCIe device can implement a virtualized PCIe access function 621 that sends a PCIe workload packet 625 based on the TLP 603 to a virtualized PCIe function 630 implemented by a service node 103. The PCIe device can implement a virtualized NVMe access function 622 that sends an NVMe workload packet 626 to a virtualized NVMe function 631 implemented by a service node 103. The PCIe device may also implement a network interface function 623. The PCIe device can use the network interface function 623 to send network packets to the service node and to other destinations. For example, network interface function 623 can be used to send the PCIe LTP packets 625 and the NVMe workload packets 626 to the service node. UDP/IP packets 627 and TCP/IP packets 628 may be packets other than LTP packets sent to the service node. For those packets, the service node may provide packet processing and routing functions 632. As such, the service node may provide the services of a switch, router, or firewall.

Figure 7:
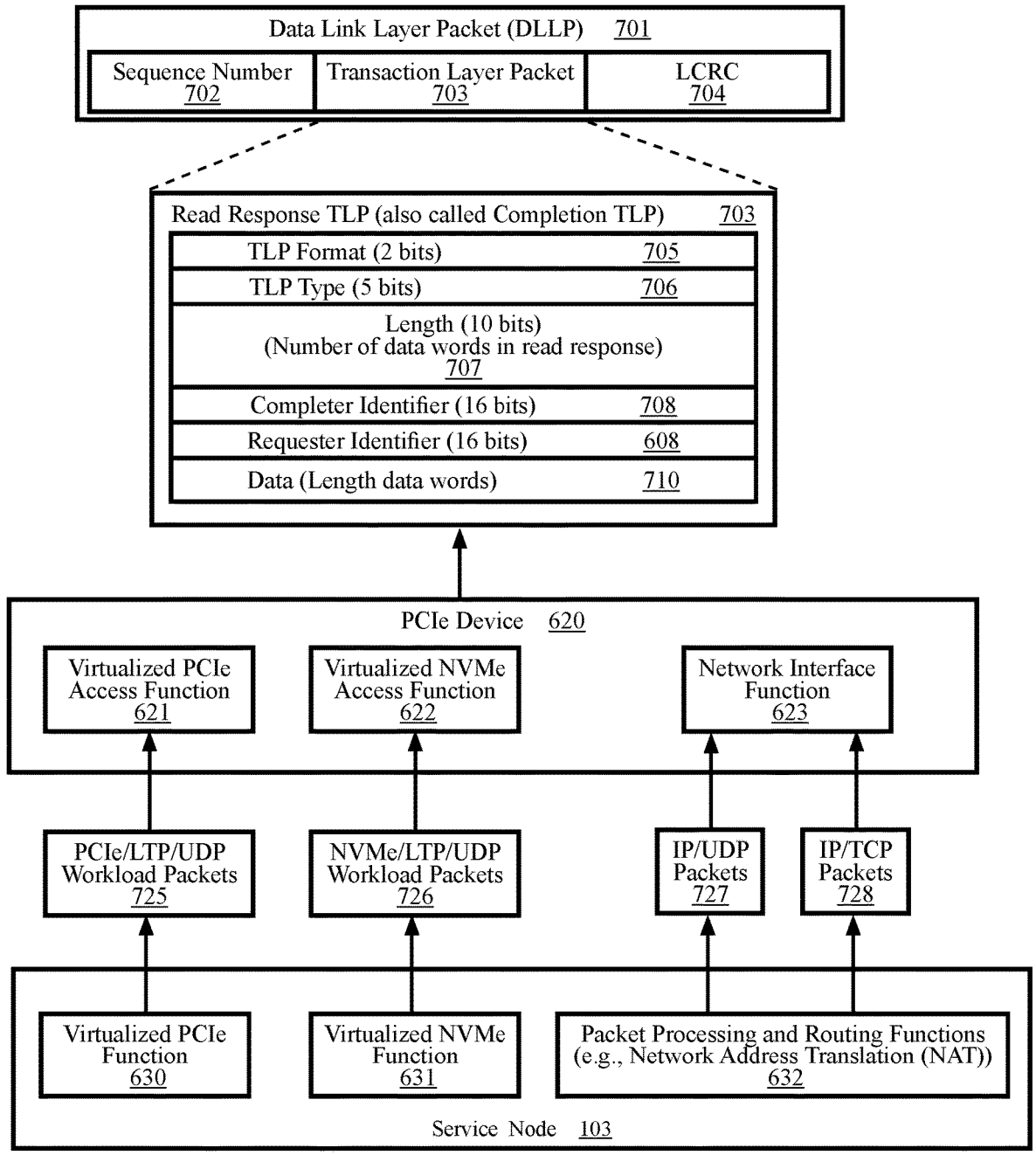
FIG. 7 illustrates a service node providing services and virtualized functions via a PCIe device according to some aspects.

FIG. 7 illustrates a service node 103 providing services and virtualized functions via a PCIe device 620 according to some aspects. In FIG. 6, a request TLP is sent to the PCIe device 620. In FIG. 7 a responsive TLP is returned. More specifically, TLP 603 can be a read request TLP and TLP 703 can be a read response TLP. Such responsive TLPs can be referred to as completion TLPs. For simplicity, a simple register read operation sent to a virtualized PCI function 630 is considered. TLP 603 can request a read from a register. The LTP packet 625 sent to the service node can indicate that a read is requested from a function implemented by the service node 103. The service node sends a responsive LTP packet 725 containing the requested data and the PCIe device 620 uses the responsive LTP packet 725 the produce read response TLP 703. The completion TLP can include a TLP format 705 and TLP type 706 indicating that the completion TLP 703 is a read response. The length 707 indicates the number of dwords in the data field 710. The completer identifier 708 indicates the source of the completion TLP 703. The requester identifier 608 can indicate the device that is to receive the completion TLP 703. For example, if the host computer 104 sends the request TLP 603 to the PCIe device 620, then the requester identifier 608 can indicate the host computer 104 and the completer identifier 708 can indicate the PCIe device 620.

The service node 103 can send PCIe workload packets 725 and NVMe workload packets 726 to the PCIe device 620. The PCIe device can interpret the workload requests and can send TLPs based on the workload requests to the host computer and to other devices on the PCIe bus. Those TLP packets can be requests, completions, or any other type of TLP defined by the PCIe specification. The service node 103 can also send other network packets, such as IP/UDP packets 727 and TCP/IP packets 728 to the PCIe device 620.

As discussed above, the host computer and the workloads running on the host computer can use device drivers to access PCIe functions. The virtualized functions discussed herein require no changes to those device drivers. The access functions on the PCIe device 620 and the virtualized functions on the service node 103 can cooperate such that, from the host's perspective, the PCIe device provides the functions and services via its own implementations of those services and functions.

Figure 8:
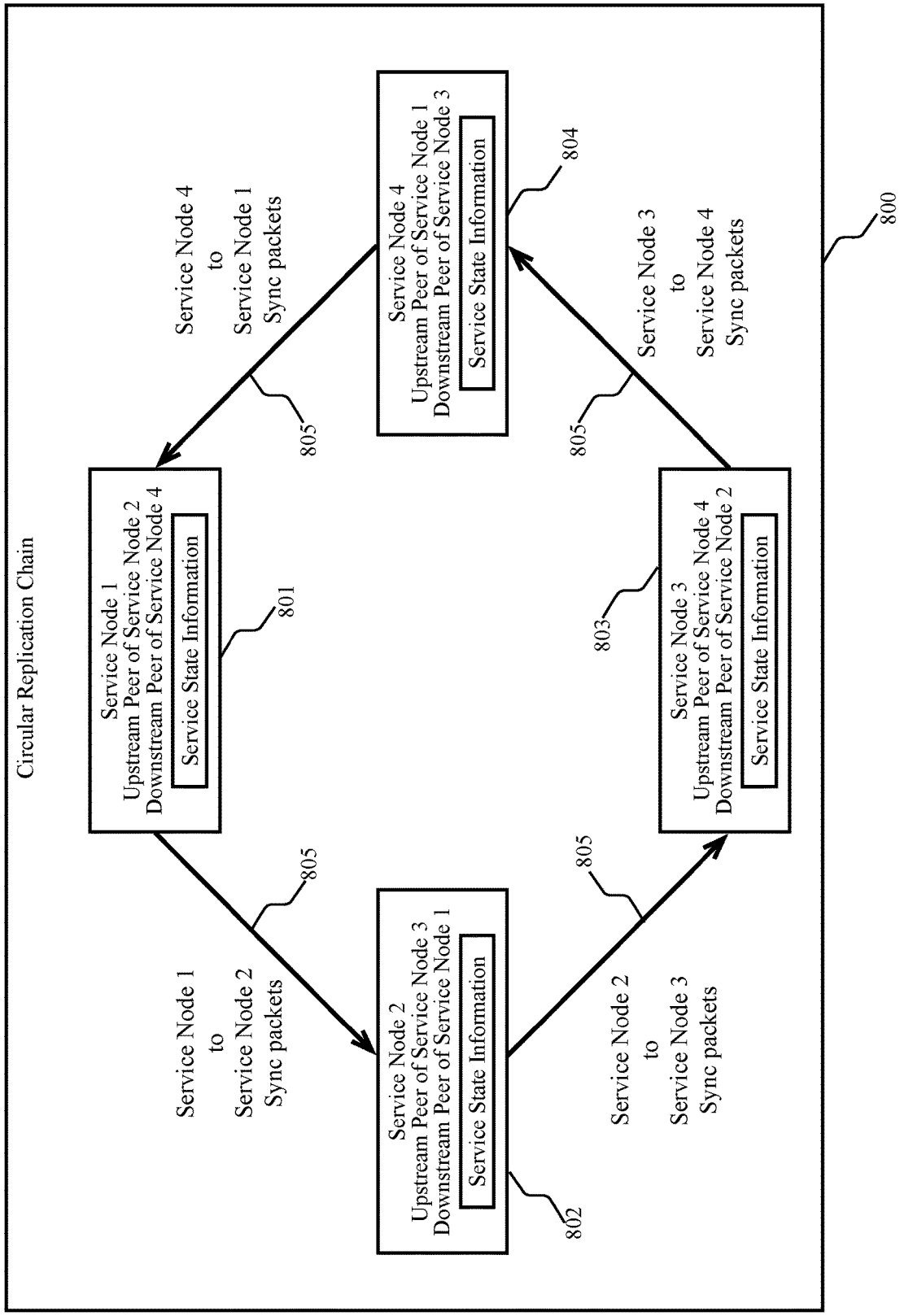
FIG. 8 is a high-level flow diagram illustrating service nodes in a circular replication chain according to some aspects.

FIG. 8 is a high-level flow diagram illustrating service nodes in a circular replication chain 800 according to some aspects. Virtualized functions can be provided by a single service node. Such virtualization allows for further benefits such as high availability, and service scaling. A circular replication chain 800 can be used to replicate service state information such that multiple service nodes have compatible versions of the service state information. As such, any of the service nodes in the circular replication chain can immediately process packets that do not change the service state information. In some cases wherein processing the packet changes the service state information, the change must be acknowledged before processing the packet can be completed. Many of the services provided by the service nodes can therefore scale linearly with the number of service nodes in the circular replication chain 800. If a service node fails or is taken offline then that service node can be removed from the circular replication chain while the remaining service nodes continue providing services. In this manner, the service can be scaled by adding or removing service nodes and the service has high availability because it is resilient to service node failure.

The circular replication chain 800 currently has four service nodes. The service nodes are service node 1 801, service node 2 802, service node 3 803, and service node 4 804. Sync packets can be used to replicate the service state information from one node to another node. The service nodes in a circular replication chain are peers. Each service node has an upstream peer and a downstream peer. The service nodes receive sync packets from their upstream peer and send sync packets to their downstream peer. Service node 1 801 is the upstream peer of service node 2 802 and sends sync packets 805 to service node 2 802. Service node 2 802 is the downstream peer of service node 1 801. Service node 2 802 is the upstream peer of service node 3 803 and sends sync packets 805 to service node 3 803. Service node 3 803 is the downstream peer of service node 2 802. Service node 3 803 is the upstream peer of service node 4 804 and sends sync packets 805 to service node 4 804. Service node 4 804 is the downstream peer of service node 3 803. Service node 4 804 is the upstream peer of service node 1 801 and sends sync packets 805 to service node 1 801. Service node 1 801 is the downstream peer of service node 4 804. For some services and functions, service state information replication results in the service nodes having exact copies of the information. In other cases, such as flow tables, replication results in service node information that is compatible but not exactly the same.

Some embodiments can use a replication chain that is not a circular replication chain. A non-circular replication chain has a head node, a tail node, and one or more intermediate nodes. Operations that change data, such as a write into a database or a service state change as considered herein, are submitted to the head node. Flow sync packets move from the head node to the tail node. The tail node has no downstream peer and therefore drops sync packets. The tail node can send an acknowledgement to the head node indicating that the sync packet has reached the tail of the chain. In order to use a non-circular replication chain, the head node is always the selected node for packets that change session state. Any node in the chain can process packets that do not change the session state information.

Figure 9:
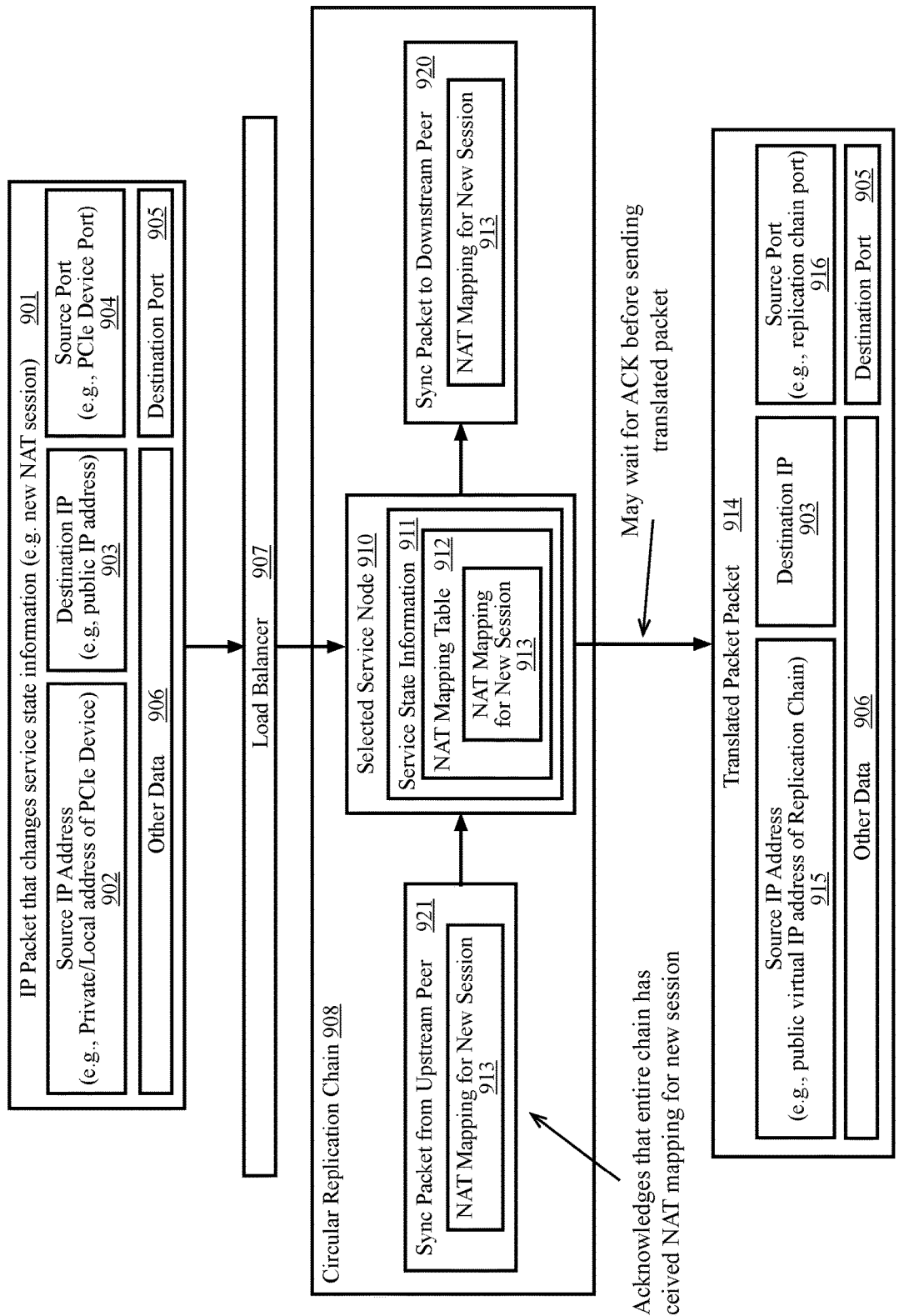
FIG. 9 is a high-level flow diagram illustrating a service node configured for chain replication of service state information according to some aspects.

FIG. 9 is a high-level flow diagram illustrating a service node configured for chain replication of service state information 911 according to some aspects. NAT is one of the services that can be provided by a service node. Those practiced in computer networks are familiar with NAT. The NAT session can be for communication between a server 104 and a machine outside the local network. The first packet of a NAT session 901 is an IP packet that changes service state information because a new NAT session is created. The first NAT packet 901 has a source IP address 902, a destination IP address 903, a source port 904, a destination port 905, and other data 906. The source IP address 902 and the source port 904 indicate the source of the packet and a port at that source. A load balancer 907 receives the first NAT packet 901. The load balancer sends the NAT packet to a selected service node 910. The selected service node 910 can be selected based on a load balancing policy such as round robin or weighted round robin. The load balancer may preferentially send certain traffic to a specific service node. For example, the load balancer can use round robin for NAT packets and can send NVMe LTP packets from a specific PCIe device 620 to a specific service node.

The selected service node 910 has service state information 911 that includes a NAT mapping table. The selected service node 910 receives the first NAT packet 901 and determines that a new NAT session is required. The selected service node creates a NAT mapping for the new session 913 and stores the new NAT mapping as a NAT entry in the NAT mapping table 912. The selected service node also sends the NAT mapping for the new session 913 to its downstream peer in sync packet 920. The service nodes in the circular replication chain forward the NAT mapping for the new session 913 until the NAT mapping is received by the selected service node in a sync packet from the upstream peer 921. The sync packet from the upstream peer 921 can be considered to be an ACK packet that acknowledges that the entire chain of service nodes has received the NAT mapping for the new session 913. The selected service node may wait for the ACK before sending a translated packet 914. NAT produces translated packets from other packets. The translated packet 914 has a source IP address 915 and a source port 916. The translated packet's source IP address 915 can be a virtual IP address indicating the replication chain. The translated packet's source port 916 can indicate a port of the replication chain. A virtual IP (vIP) address is a virtual identifier that can be used to indicate the group of service nodes in a replication chain instead of a particular one of those service nodes. For clarity, vIPs are referenced herein with the understanding that a different virtual identifier may instead be used. The load balancer 907 can receive packets sent to the vIP and forward the packets to specific service nodes.

Figure 10:
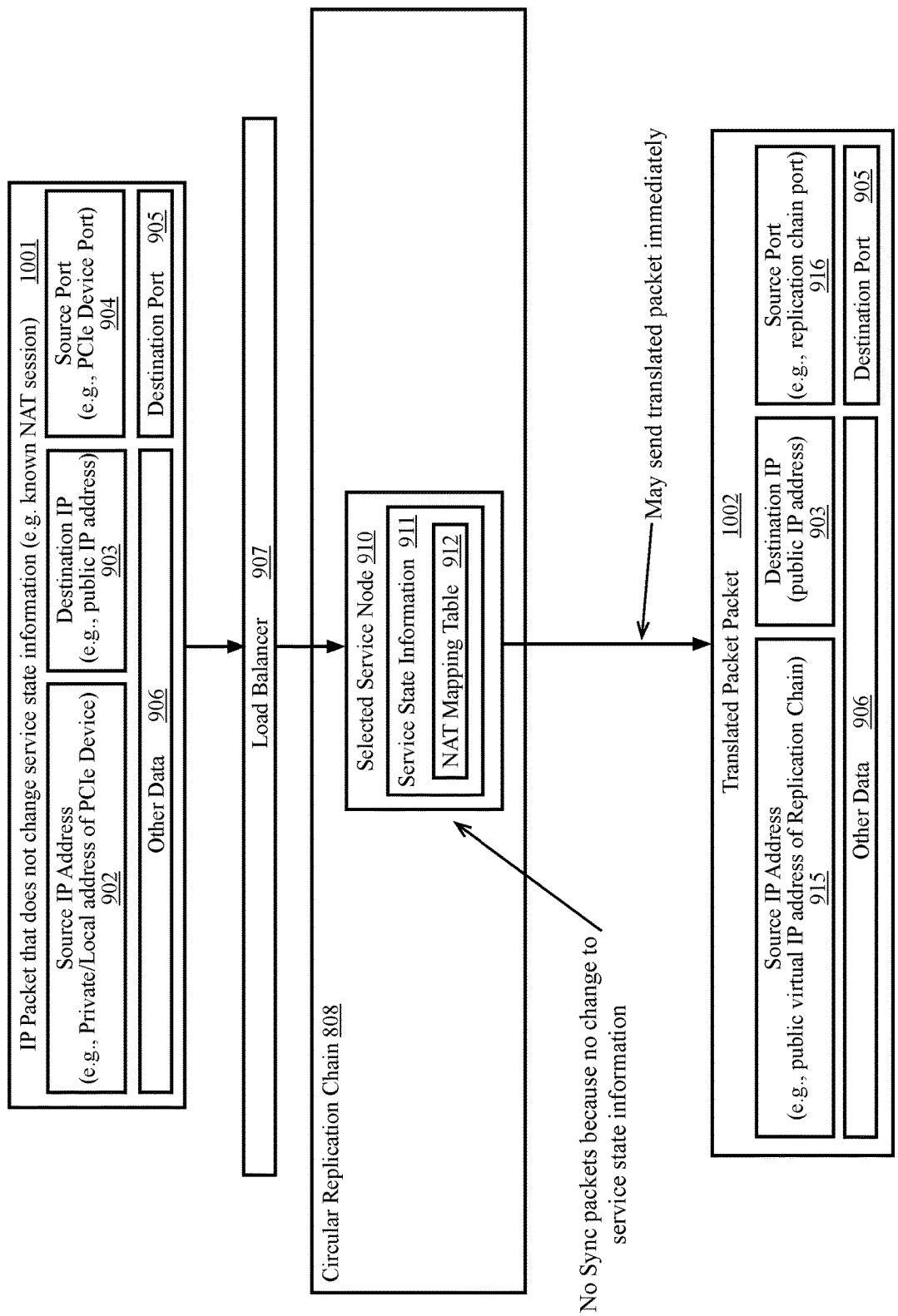
FIG. 10 is a high-level diagram illustrating a service node providing a service according to some aspects.

FIG. 10 is a high-level diagram illustrating a service node providing a service according to some aspects. An IP packet that does not change the service state information 1001 may be processed immediately by any of the service nodes in the circular replication chain. A packet for a known NAT session is an example of an IP packet that does not change the service state information 1001. The load balancer 907 can direct the packet 1001 to a selected service node 910 that sends a translated packet 1002 to its destination. There may be no sync packet because there has been no change to the service state information.

Figure 11:
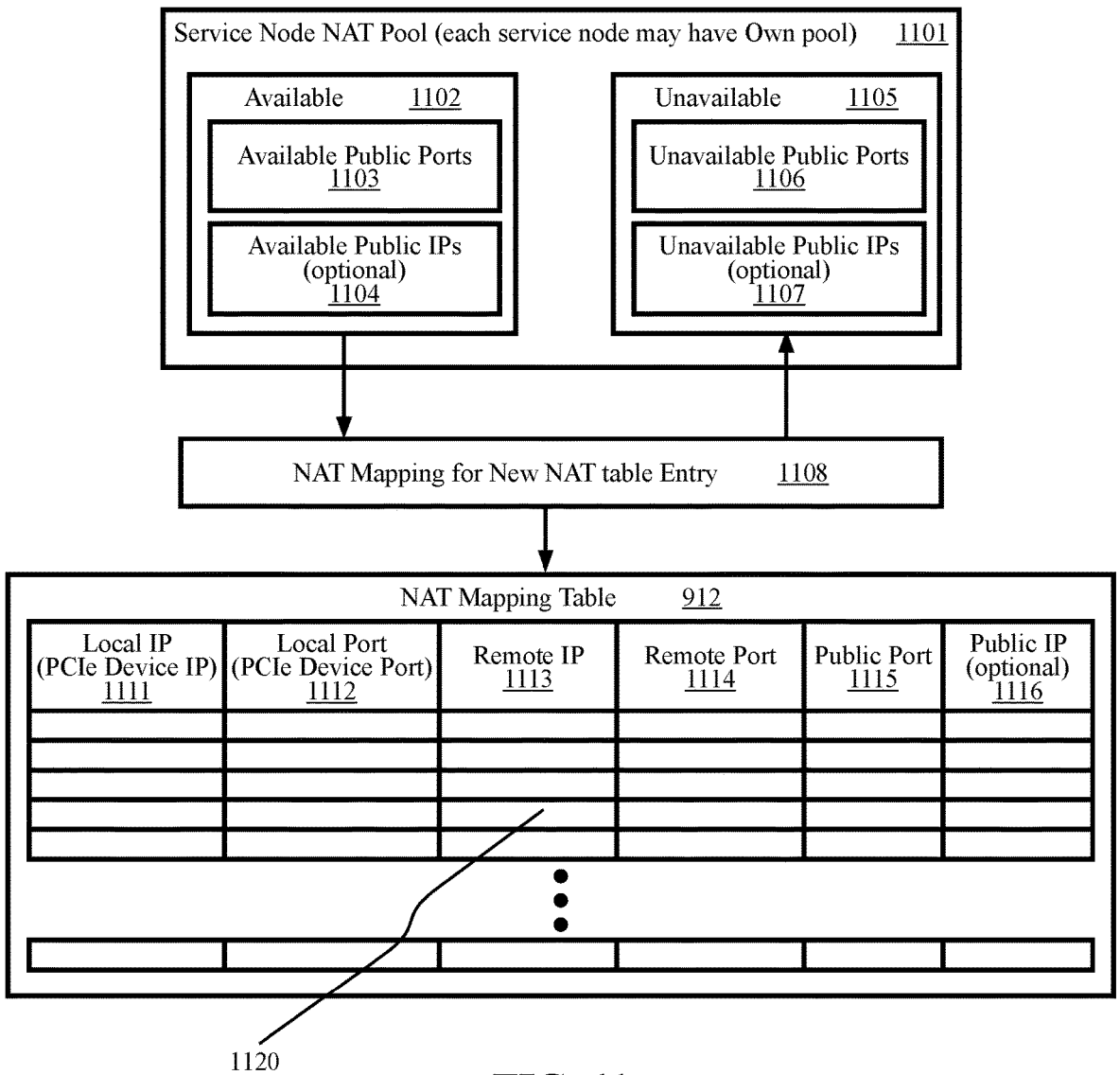
FIG. 11 a high-level diagram of adding a network address translation (NAT) table entry to a NAT table according to some aspects.

FIG. 11 a high-level diagram of adding a network address translation (NAT) table entry to a NAT table according to some aspects. A selected service node can produce a new NAT mapping for a new NAT table entry 1108 and can store the new NAT table entry as a NAT table entry 1120 in the NAT mapping table 912. An entry in the NAT mapping table can include a local IP address 1111, a local port 1112, a remote IP address 1113, a remote port 1114, a public port 1115, and a public IP address 1116. The local IP address 1111 can be the IP address of a local device, such as a PCIe device, on the local network. The local port 1112 can indicate a port of that local device. The remote IP address 1113 can be the IP address of a remote device. The local port can indicate a port of that remote device. The public port 1115 can indicate the source port 916 to use in translated packets. The public IP 1116 can indicate the source IP address 915 to use in translated packets. A public IP entry can be useful when multiple vIPs are used and in other cases.

An issue that may occur is that two service nodes may concurrently create new NAT table entries. It is possible for the two service nodes to assign the same public port to the two new NAT sessions. A solution is to assign different pools of ports to different service nodes with each service node assigning public IPs only from its own pool. A service node NAT pool 1101 can indicate available 1102 and unavailable 1105 NAT resources for a service node. The available NAT resources can include available public ports 1103 and available public IP addresses 1104. The unavailable NAT resources can include unavailable public ports 1106 and unavailable public IP addresses 1107.

Figure 12:
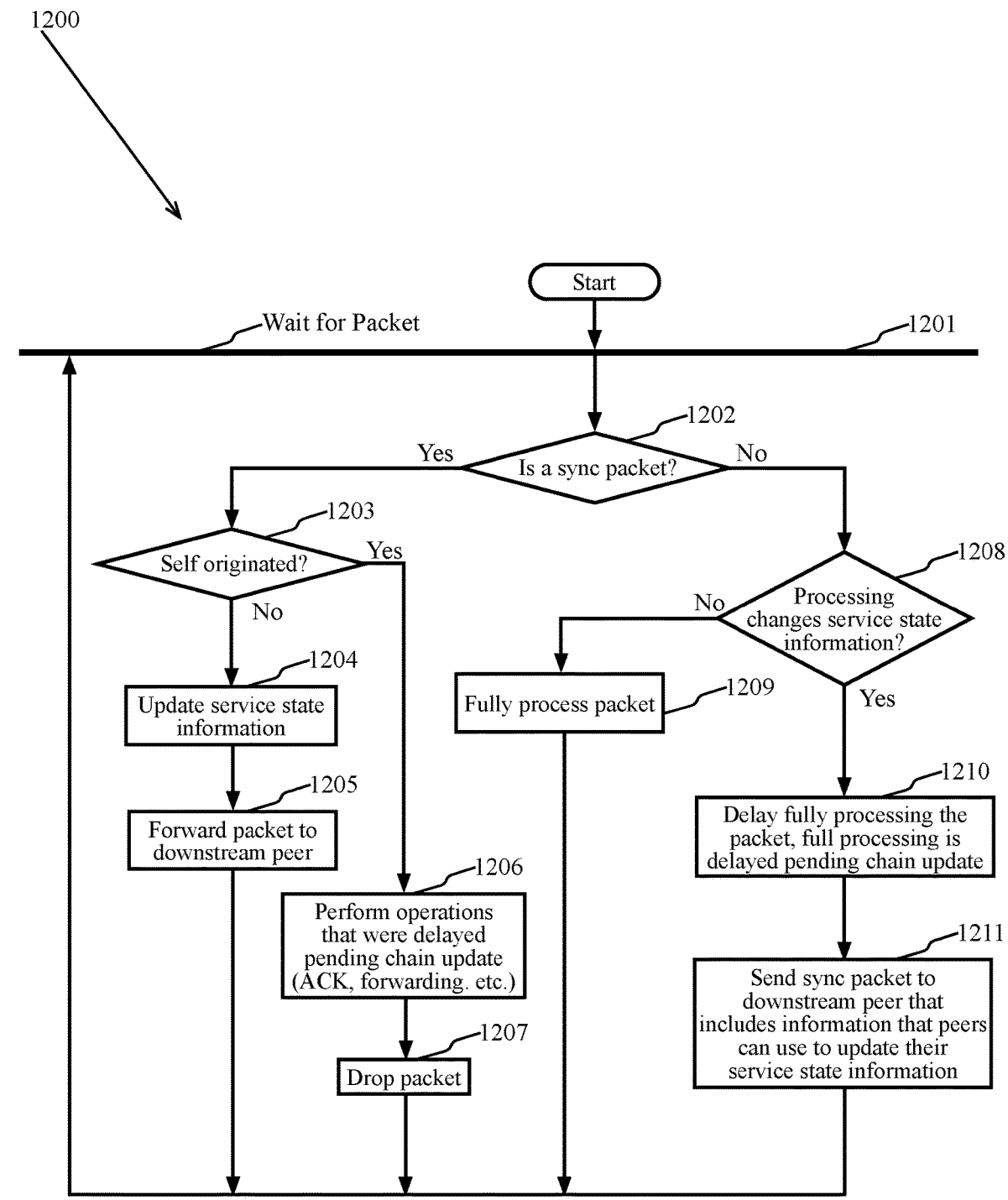
FIG. 12 is a high-level flow diagram of replicating service state information using chain replication according to some aspects.

FIG. 12 is a high-level flow diagram of replicating service state information using chain replication according to some aspects. After starting, the process can wait for packets 1201. The process can proceed to decision point 1202 when a packet is received. At decision point 1202, the process determines if the packet is a sync packet. If not, at decision point 1208 the process determines if processing the packet changes the service state information. If the service state information is not changed, then at block 1209 the service node fully processes the packet before waiting for the next packet 1201. If the service state information is changed, then at block 1210 the service node may delay fully processing the packet. The packet may be fully processed pending an ACK that indicates the chain has been updated. At block 1211, the process sends a sync packet to its downstream peer. The sync packet includes information that the peers can use to update their service state information based on the change caused by the packet. After sending the sync packet, the process can return to waiting for another packet 1201.

If a packet is determined to be a sync packet at decision point 1202, then at decision point 1203 the process can determine if the packet is self originated. A service node implementing the method of FIG. 12 can send a sync packet at block 1211. From the perspective of that service node, the sync packet sent at block 1211 is self originated. If the packet is self originated, then at block 1206 the service node can perform operations that were delayed pending chain update. Such operation can include processing for a different packet that has been delayed at block 1210. After block 1206, the packet can be dropped at block 1207 before the process waits to receive another packet 1201. If the packet is not a self originated sync packet, then at block 1204 the service node's service information can be updated. At block 1205 the sync packet can be forwarded to the nodes downstream peer before the process returns to waiting for another packet 1201.

Figure 13:
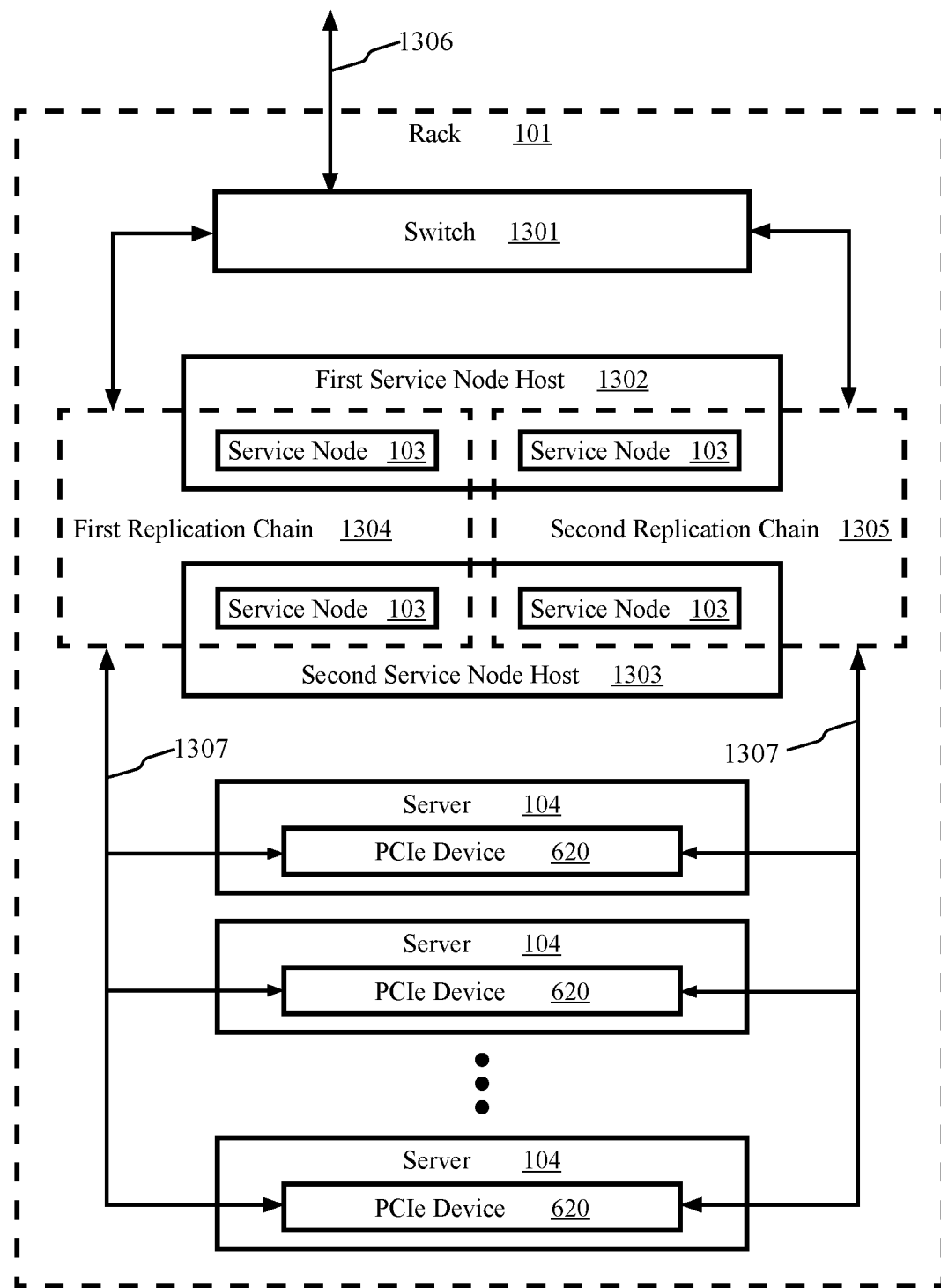
FIG. 13 is a high-level diagram of service node hosts in a rack according to some aspects.

FIG. 13 is a high-level diagram of service node hosts in a rack according to some aspects. Service nodes 103 can be deployed on the local network 1307. A first service node host 1302 includes two service nodes and a second service node host 1303 also includes two service nodes. A first replication chain 1304 includes service nodes from both service node hosts. A second replication chain 1305 includes different service nodes from both service node hosts. The illustrated arrangement provides high availability because neither replication chain completely fails if one of the service node hosts fails. In the example of FIG. 13, switch 1301, which may not be a smart switch, connects the service node hosts 1302, 1303 to a public network 1306.

Figure 14:
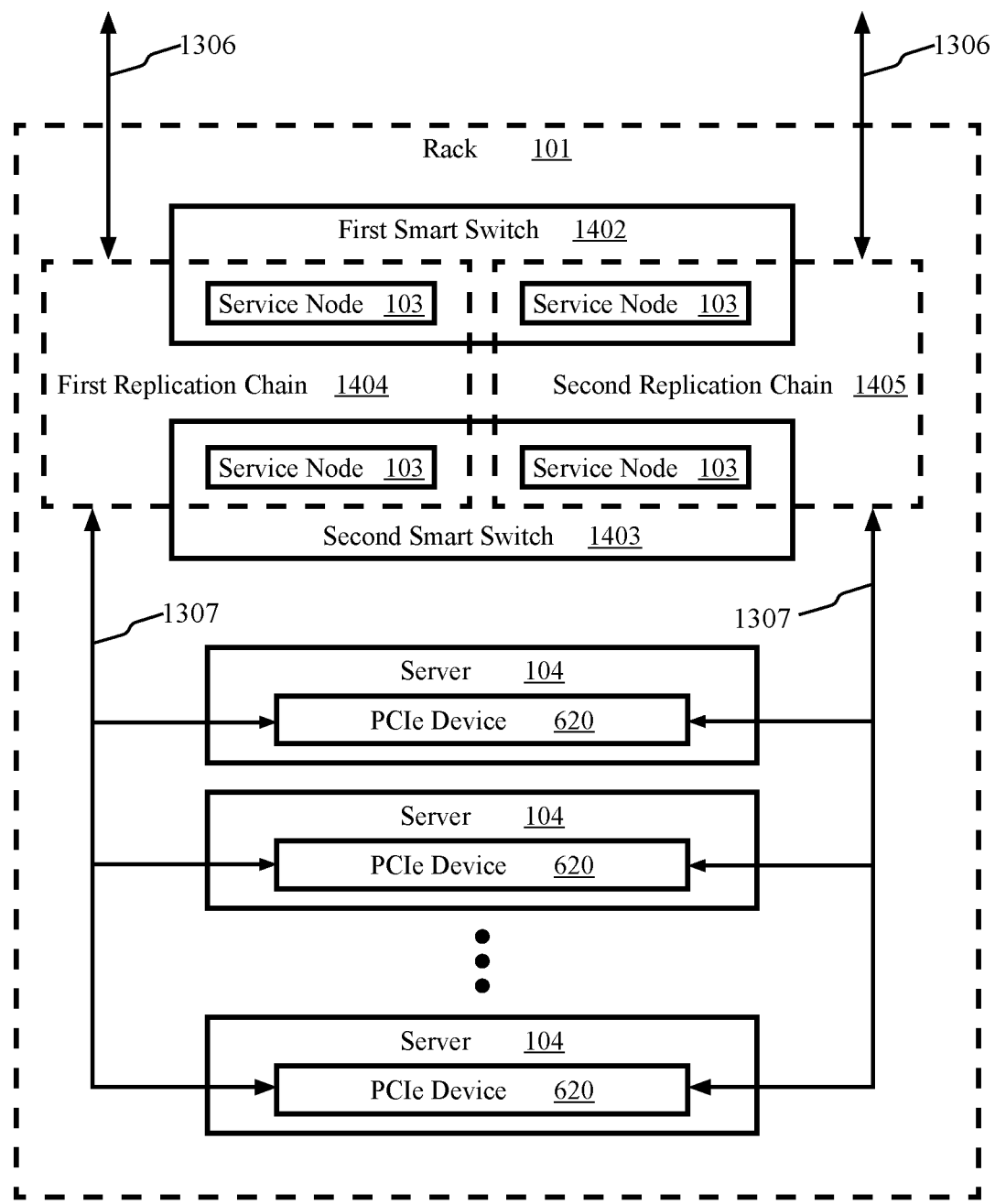
FIG. 14 is a high-level diagram of replication chains that include service nodes in multiple smart switches according to some aspects.

FIG. 14 is a high-level diagram of replication chains that include service nodes 103 in multiple smart switches according to some aspects. A first smart switch 1402 includes two service nodes and a second smart switch 1403 also includes two service nodes. A first replication chain 1404 includes service nodes from both smart switches. A second replication chain 1405 includes different service nodes from both smart switches. The illustrated arrangement provides high availability because neither replication chain completely fails if one of the smart switches fails. The example of FIG. 14 differs from the example of FIG. 13 in that FIG. 14 uses smart switches 1402, 1403 that include service nodes. The switch 1301 of FIG. 13 may not be a smart switch. As such, an existing rack of servers may be upgraded with service nodes by adding service node hosts. FIG. 14 illustrates a system in which smart switches are used. In either system, advanced networking capabilities and offloads can be obtained while using legacy NICs. Using the PCIe devices 620 as illustrated allows for also providing virtualized PCIe functions and services, providing virtualized NVMe functions and services, etc.

Figure 15:
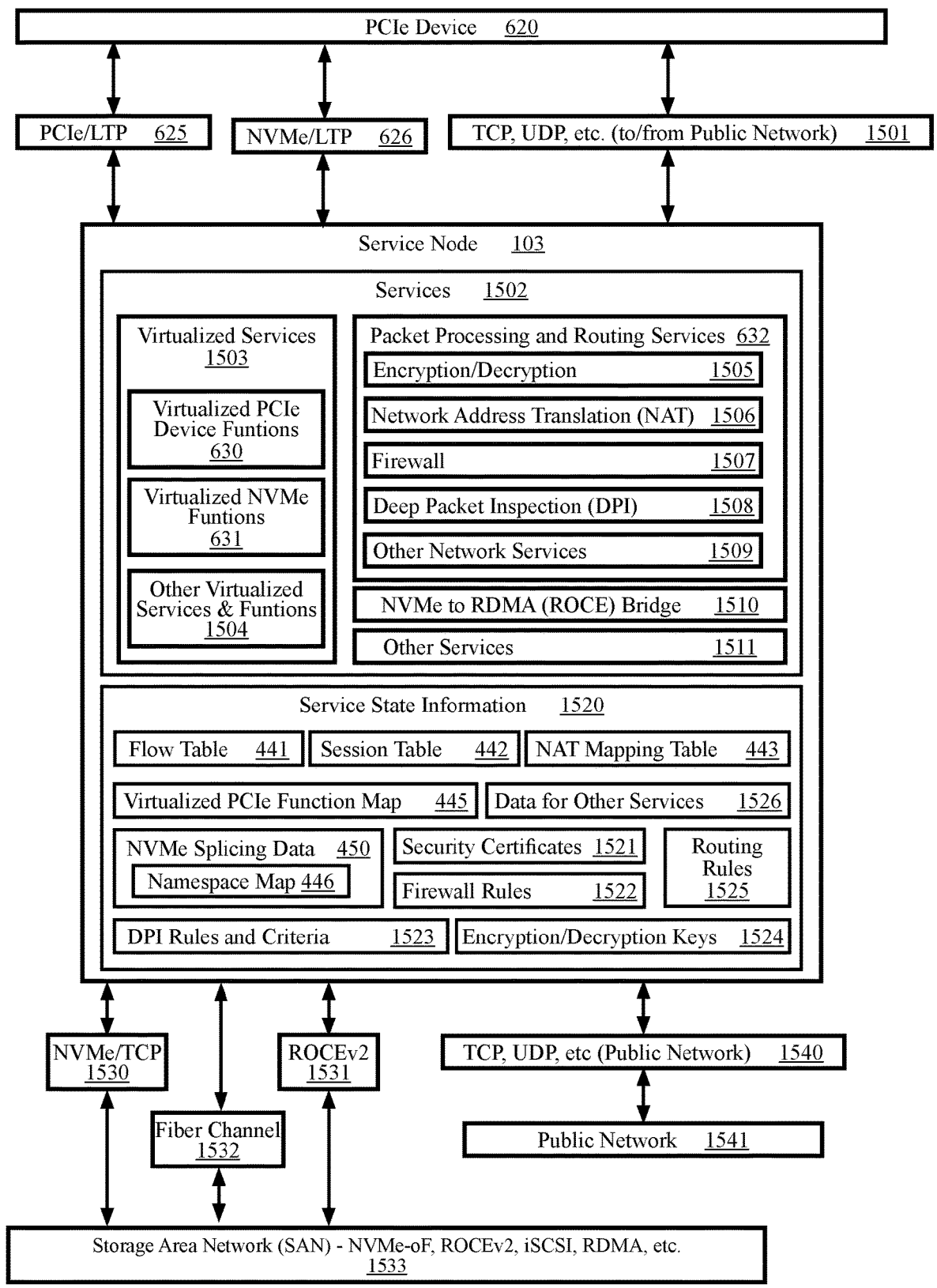
FIG. 15 is a high-level diagram of a service node providing services according to some aspects.

FIG. 15 is a high-level diagram of a service node 103 providing services 1502 according to some aspects. A PCIe device 620 and the service node 103 can exchange PCIe/LTP packets 625, NVMe/LTP packets 626, and IP packets 1501 such as TCP packets, UDP packets, etc. The services 1502 provided by the service node 103 can include virtualized services 1503. The virtualized services can include virtualized PCIe device functions 630, virtualized NVMe functions 631, and other virtualized services or functions 1504. The services 1502 can include packet processing and routing services 632. The packet processing and routing services 632 can include encryption/decryption 1505, NAT 1506, firewall 1507, deep packet inspection (DPI) 1508, and other network services 1509. The services can include an NVMe to remote direct memory access (RDMA) bridge 1510 and other services 1511. The service node can process IP packets 1501, 1540 for network traffic exchanged between the PCIe device 620 and the public network 1541. The service node 103 can connect to a storage area network 1533 via NVMe/TCP 1530, fiber channel 1532, and RDMA over converged ethernet version 2 (ROCEv2) 1531. Those practiced in storage area networks are familiar with NVMe/TCP, fiber channel, and ROCEv2, all of which are widely deployed and used within data centers. The service node 103 can store service state information 1520. The service state information 1520 can include a flow table 441, a session table 442, a NAT mapping table 443, a virtualized PCIe function map 445, NVMe splicing data 447, DPI rules and criteria 1523, security certificates 1521, firewall rules 1522, routing rules 1525, encryption/decryption keys 1524, and data for other services 1526.

Figure 16:
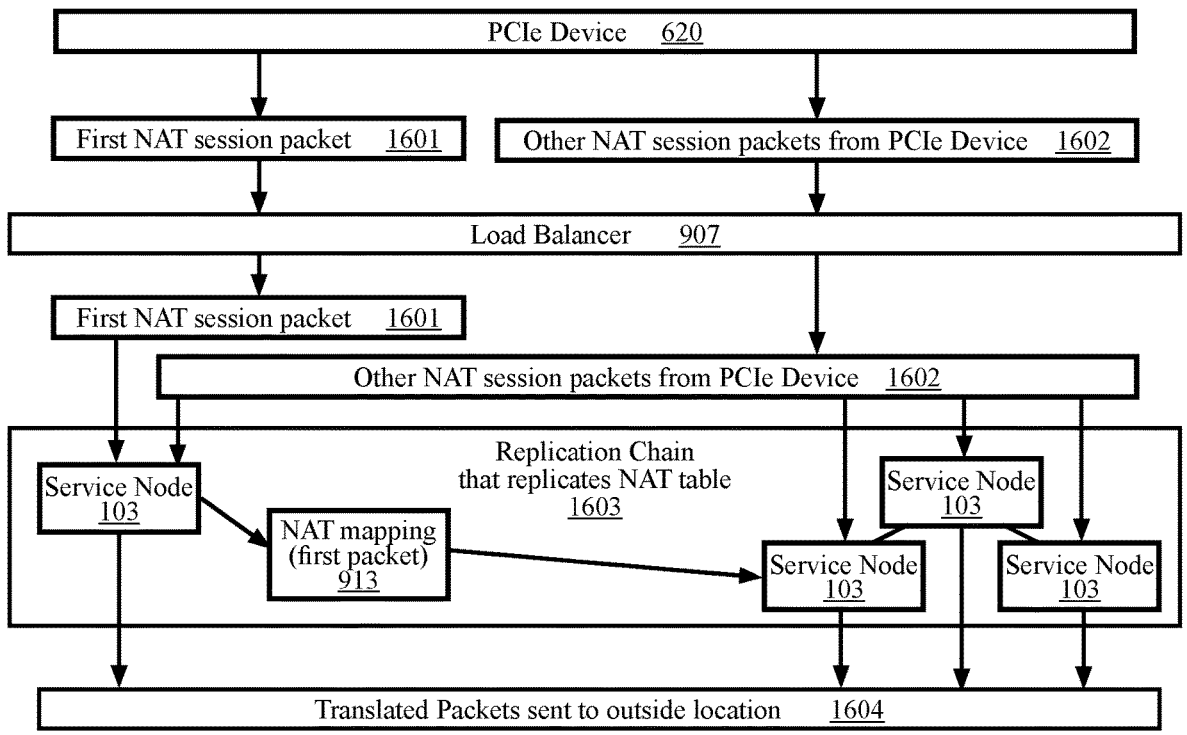
FIG. 16 is a high-level flow diagram of service nodes performing NAT on outbound packets according to some aspects.

FIG. 16 is a high-level flow diagram of service nodes performing NAT on outbound packets according to some aspects. The outbound packets include a first NAT session packet 1601 and other NAT session packets 1602 sent by a PCIe device 620 to an outside location. The PCIe device 620 sends the first NAT session packet 1601 to an outside location. The load balancer directs the first NAT session packet to a service node 103 in a replication chain 1603. The service node 103 receives the first NAT session packet 1601, creates a NAT mapping 913 for the packet, and sends the NAT mapping 913 downstream to the other service nodes. The other service nodes update their NAT mapping tables based on the NAT mapping 913. After sending the first NAT session packet 1601, the PCIe device can send other NAT session packets 1602 to the replication chain 1603. The load balancer can distribute the packets among the service nodes. The service nodes produce translated packets 1604 from the outbound packets and send the translated packets 1604 to the outside location indicated by the destination address in the outbound packets 1601, 1602.

Figure 17:
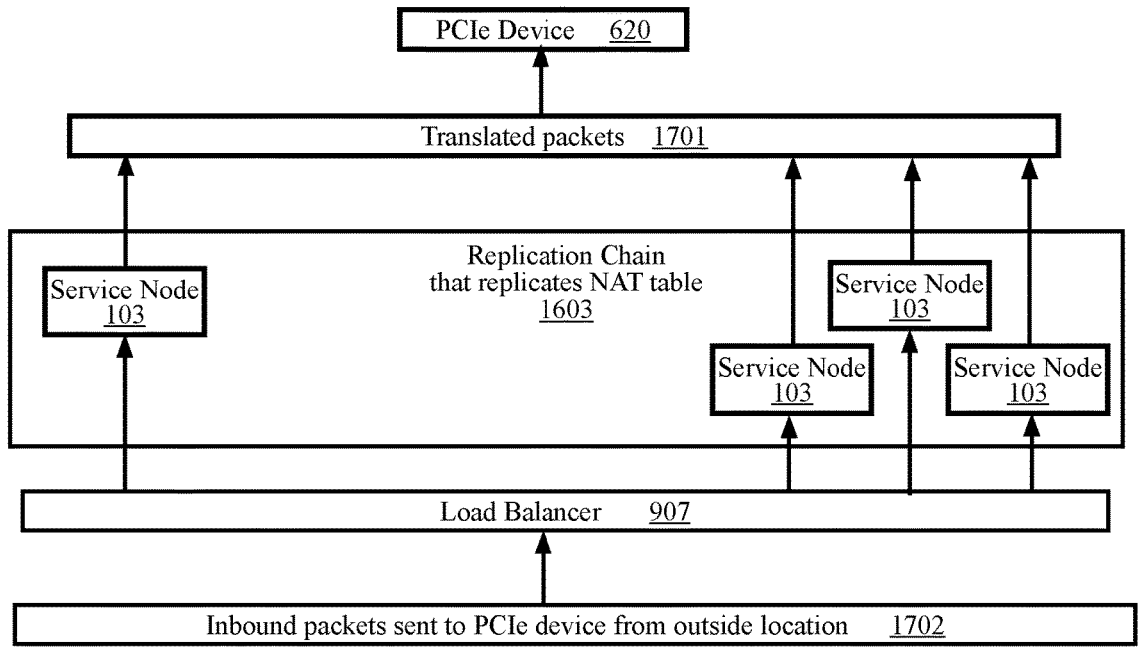
FIG. 17 is a high-level flow diagram of service nodes performing NAT on inbound packets according to some aspects.

FIG. 17 is a high-level flow diagram of service nodes performing NAT on inbound packets according to some aspects. Inbound packets 1702 are sent from the outside location to the PCI device 620. The load balancer distributes the inbound packets 1702 among the service nodes 103. The service nodes produce translated packets 1701 from the inbound packets 1702 and send the translated packets to the PCIe device 620. Here, the NAT service drops inbound packets that have no entry in the NAT mapping table. Some NAT implementations would create new NAT mappings for inbound packets of new NAT sessions. Such implementations would replicate the new NAT mappings through the replication chain.

Figure 18:
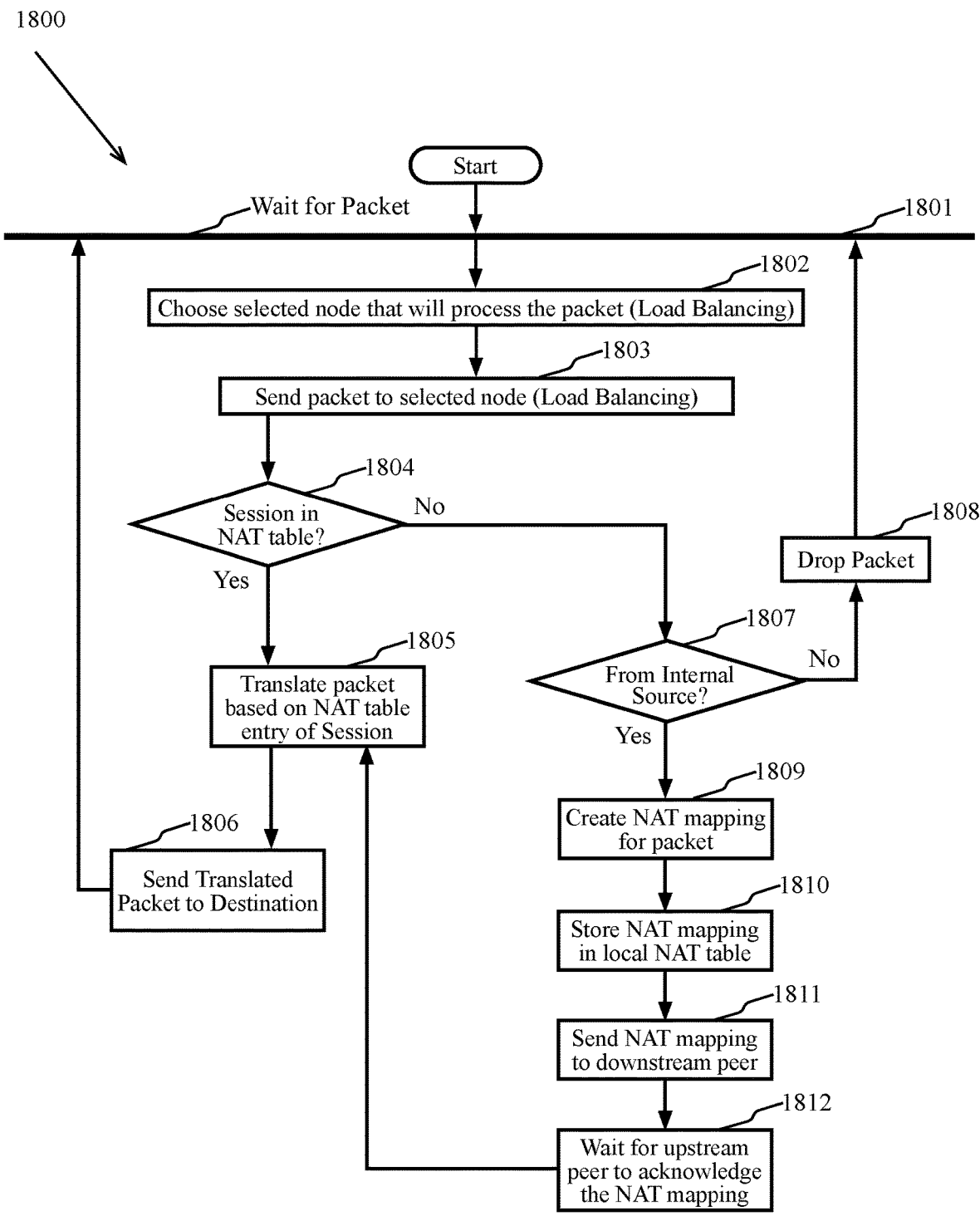
FIG. 18 is a high-level flow diagram of processing a NAT packet according to some aspects.

FIG. 18 is a high-level flow diagram of processing a NAT packet according to some aspects. After starting, the process waits for packets 1801. At block 1802, after a packet is received, the process chooses a selected service node that will process the packet. At block 1803, the packet is sent to the selected node. A load balancer may perform the operations indicated by block 1802 and 1803. A service node may perform the remaining steps in the process. At decision point 1804, the process determines if the packet is for a session that is already in the NAT mapping table. If so, at block 1805 the process produces a translated packet based on the NAT mapping table entry of the session. At block 1806, the translated packet is sent to its destination. If the NAT mapping table has no entry for the packet, the process moves to decision point 1807 where the process checks if the packet is from an internal source. If the packet is not from an internal source, the packet is dropped at block 1808 before the process returns to waiting for packets 1801. If the packet is from an internal source, then at block 1809, a NAT mapping is created for the packet. At block 1810 the NAT mapping is stored in the service node's local mapping table. At block 1811, the NAT mapping is sent to the service node's downstream peer. At block 1812, the process waits for the upstream peer to acknowledge the NAT mapping before proceeding to block 1805. In an embodiment, an internal source is a source on the local network. Implementations that allow external devices to initiate NAT mappings may skip decision point 1807 and proceed to block 1809.

As described above with reference to FIGS. 8-18, many aspects of network traffic processing, such as network address translation, that have in the past been performed by host computers or smartNICs installed in host computers can be handled by service nodes that can be located within smart switches. High availability network traffic processing can be provided using chain replication of the service node's service state information such as NAT mapping tables. Due to the nature of chain replication, network traffic processing, such as NAT, can scale almost linearly with the number of service nodes used. In addition, service nodes can be dynamically added to and removed from replication chains, thereby providing additional benefits with respect to maintenance and upgrading. This highly available service node implementation and deployment enables services that may have been provided solely by full featured smartNICs to be implemented by the combination of purpose built NICs and services nodes. Thus, the advanced features are still supported for each server but with purpose built NICs that are more capex and opex efficient and in a manner that is more energy efficient, which can reduce the environmental impact of such computing systems.

Figure 19:
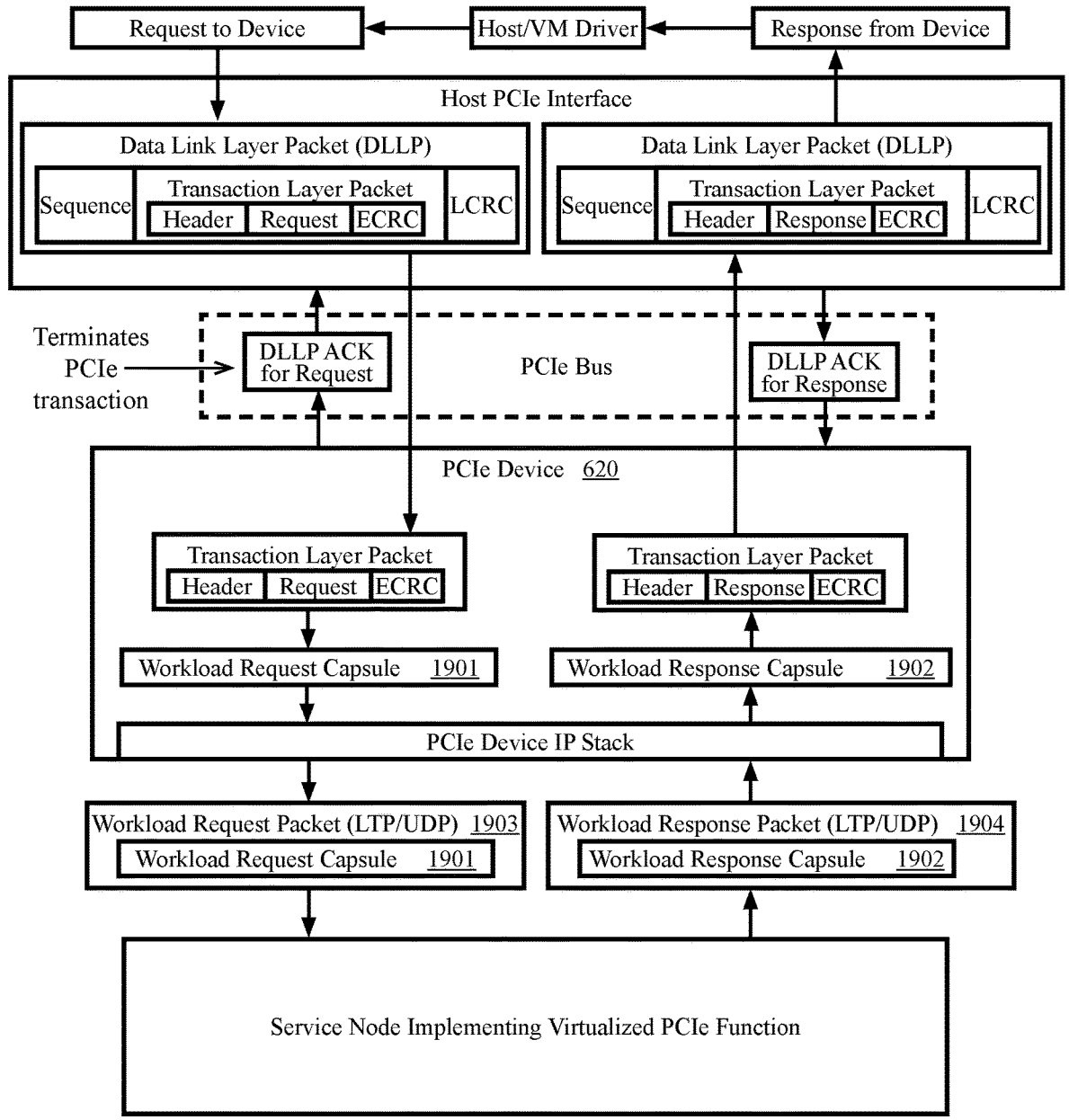
FIG. 19 is a high-level diagram of servicing a host initiated request with a virtualized function according to some aspects.

FIG. 19 is a high-level diagram of servicing a host initiated request with a virtualized function according to some aspects. The host can use a device driver to initiate a request to a PCIe device. The request can be carried in a TLP from the host to the PCIe device. As discussed above, a DLLP carries the TLP on the PCIe bus. Upon receiving the TLP, the PCIe device sends a DLLP ACK to the host, thereby terminating the PCIe transaction. Sending the DLLP ACK is a key operation because any delay in sending the DLLP ACK may cause errors or performance loss within the PCIe implementation of the host computer. For this reason, the PCIe device sends the DLLP ACK promptly and does not merely encapsulate the TLP and forward it in a network packet. The PCIe device 620 can send the DLLP ACK confirming receipt of the TLP and can use the TLP to produce a workload request capsule 1901. The workload request capsule 1901 is sent to the service node in a workload request packet. The service node processes the workload request packet and may respond with a workload response packet 1904 that includes a workload response capsule 1902. The PCIe device can process the workload response capsule 1902 to produce a TLP that is sent to the host via the PCIe bus. The DLLP ACK can be sent from the PCIe device to the host without first receiving an indication from the service node that the workload packet 1903 or workload capsule 1901 has been received. A smartNIC installed in a host may aggregate services and functionality that are provided to the host. Those services and functionality may be aggregated within the smartNIC in the host. PCIe device 620 and the service node implementing virtualized PCIe functions provide for disaggregating those services and functionality from within the host.

Figure 20:
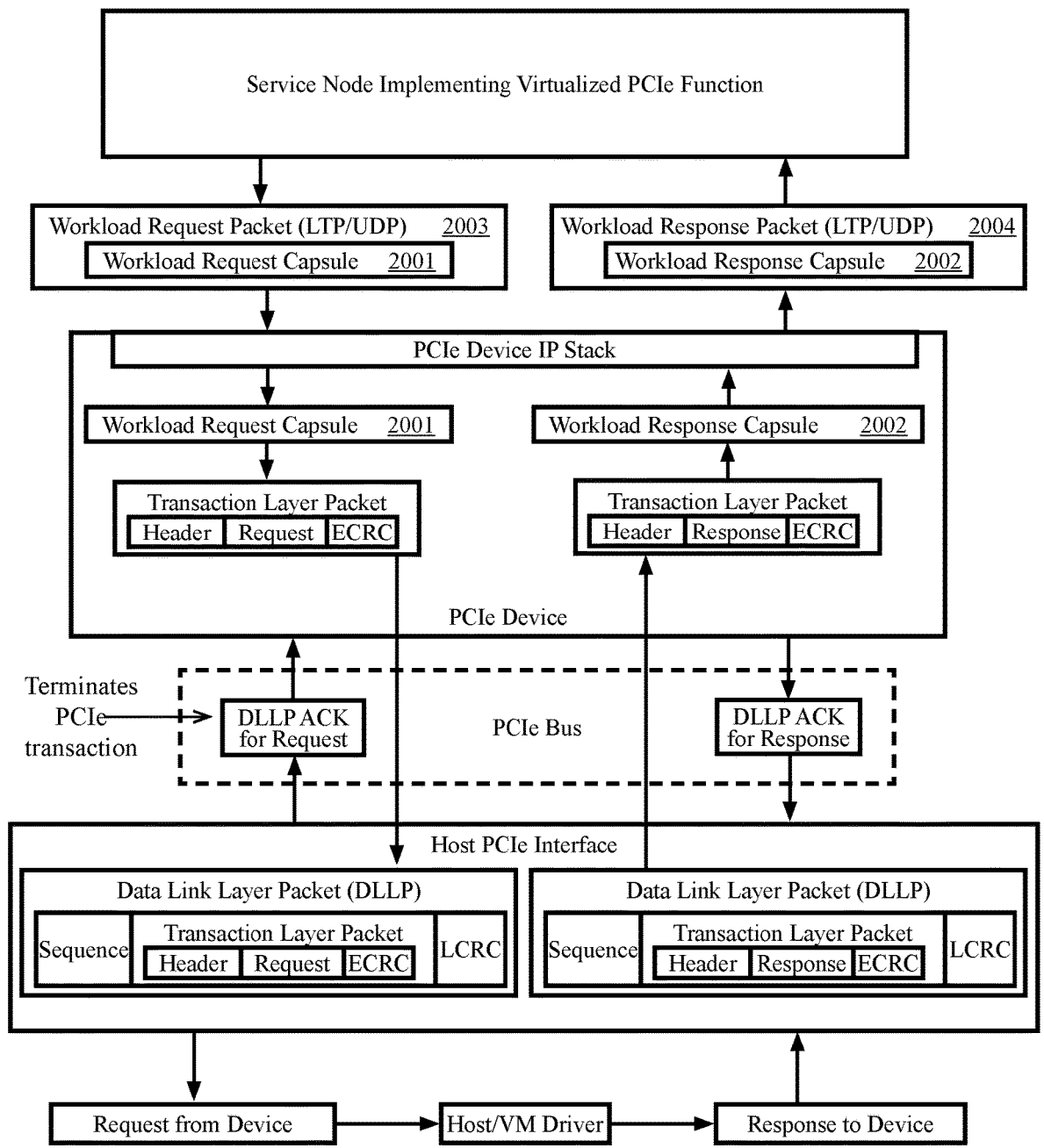
FIG. 20 is a high-level diagram of servicing a request initiated by a virtualized function according to some aspects.

FIG. 20 is a high-level diagram of servicing a request initiated by a virtualized function according to some aspects. A virtualized function running in a service node can generate a request to be processed by the host. The request can be placed in a workload request capsule 2001 and sent to the PCIe device 620 in a workload request packet 2003. The PCIe device 620 can process the workload request capsule to produce a TLP that is sent to the host via the PCIe bus. The host may produce a response that is sent to the PCIe device in a TLP via the PCIe bus. The PCIe device can immediately send a DLLP ACK to the host upon successful receipt of the TLP. The PCIe device can use the TLP to produce a workload response capsule 202 and can send the workload response capsule 202 to the service node in a workload response packet 2004. The DLLP ACK can be sent from the PCIe device to the host without first receiving an indication from the service node that the workload packet 2004 or the workload capsule 2002 has been received.

Figure 21:
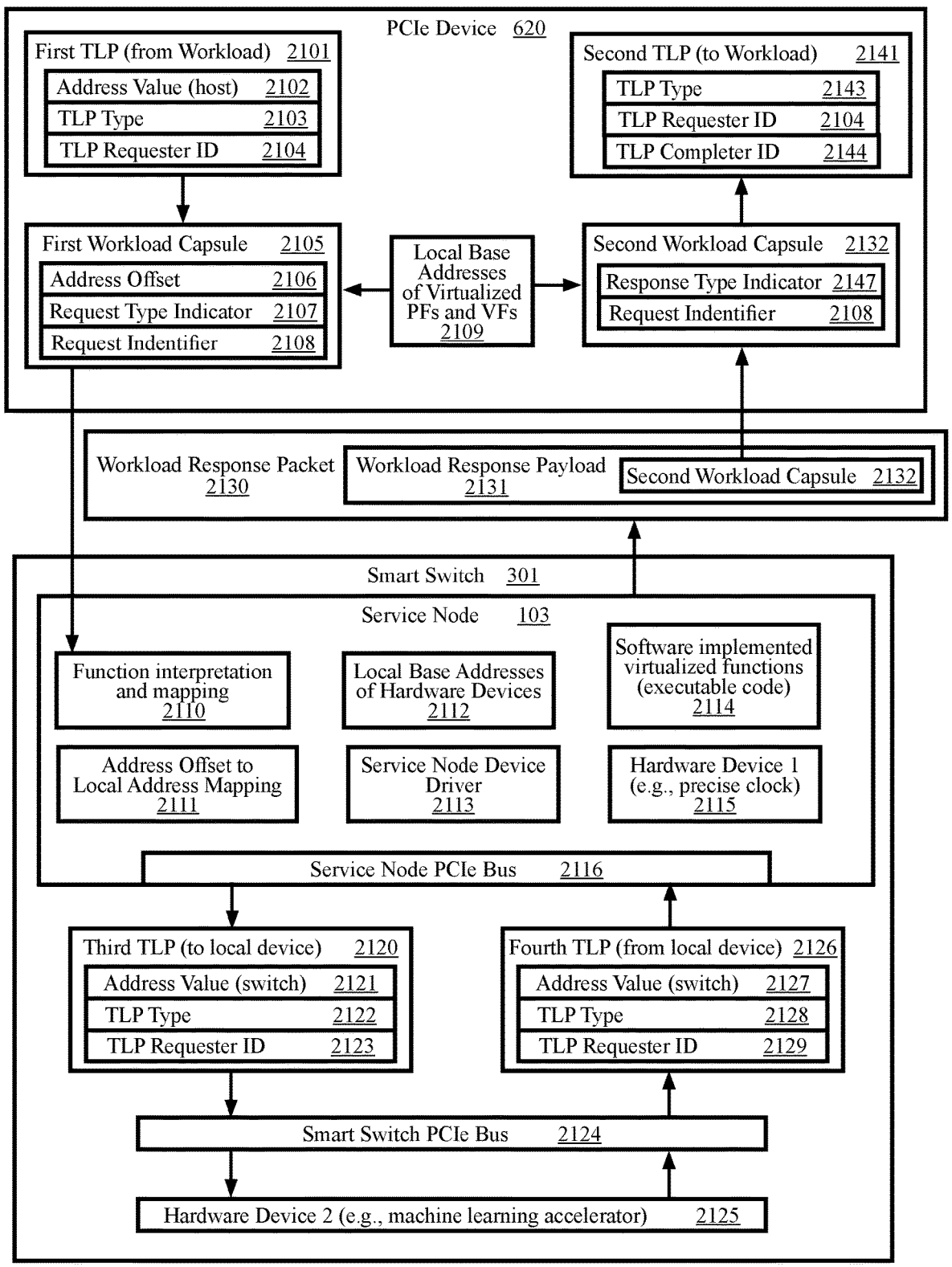
FIG. 21 is a high-level diagram of providing hardware implemented and software implemented virtualized functions according to some aspects.

FIG. 21 is a high-level diagram of providing hardware implemented and software implemented virtualized functions according to some aspects. The PCIe device 620 can receive a first TLP 2101 from a workload. The first TLP can include an address 2102, TLP type 2103, and TLP requester identifier 2104. The PCIe device can use the first TLP to produce a first workload capsule 2105. The workload capsule 2105 can include an address offset, a request type indicator 2107, and a request identifier. The address offset can be calculated from the address 2102 and the local base addresses of the virtualized PFs and VFs 2109. A PCIe function can have a base address within the host's 10 space. As such, the base address can indicate the starting location of PCIe function registers that can be accessed using memory writes and reads. The address 2102 indicates a location within the host's 10 space. The address 2102 can thereby indicate which PCIe function is being accessed and which memory location within the PCIe function is being accessed. The base address of the PCIe function may be set by the host at startup and may change from startup to startup. As such, the address 2102 may have little or no meaning to the service node. Instead, the service node can use an address offset and a PCIe function identifier. The PCIe function identifier and a request type indicator or a PCIe function indicator can indicate which PCIe function is being accessed and which memory location within the PCIe function is being accessed. In many cases, the address offset is the address 2102 minus the base address of the PCIe function being accessed in the PCIe device. The TLP type 2103 can be used to determine the request type indicator 2107. The request identifier can be a value that is uniquely associated with the workload capsule or workload packet. The workload capsule or packet may also include TLP data 710 (see FIG. 7) if the first TLP contains such data.

The service node 103 can receive the first workload capsule and identify the virtualized PCIe function that is being accessed. The virtualized PCIe function can be implemented at the service node 103 or smart switch 301 in a variety of ways. The virtualized PCIe function may be implemented by software. A software implemented virtualized function 2114 can use the request type indicator, the address offset, and TLP data 710 to identify executable code that is to be run and the inputs to provide to that executable code. The PCIe function may be implemented by a hardware device 2115 within the service node that the service node interacts with via a device driver 2113. The request type indicator, the address offset, and the TLP data 710 (see FIG. 7) may be used to identify the device driver and to provide inputs to the device driver 2113. The service node 103 can record the base addresses of hardware devices 2112. An address offset to local address mapping can use the address offset 2106 and the local base addresses 2112 to calculate local address values at which to access local devices.

Yet another option is that the virtualized PCIe device is implemented by a hardware PCIe device 2115, 2125. For example, the hardware device can be a hardware device 2125 installed within the smart switch. The service node device driver 2113 may access the hardware device 2125 via a service node PCIe bus 2116 and a smart switch PCIe bus 2124. The service node can send a third TLP to the hardware device 2125. The third TLP can contain an address 2121 determined using the address offset 2106 and the local hardware base addresses 2112. The TLP type 2122 can be the same as or based on the TLP type 2103 in the first TLP 2101. The TLP requester ID 2123 can indicate the service node 103.

The service node 103 can send a workload packet to the PCIe device 620. The workload packet can be a workload request originated at the service node or can be a workload response sent responsive to a workload request. A virtualized function at the service node may send a workload response. A request originated from the service node is similar to one originated from the host. A response is slightly different in that it indicates the request being responded to. The service node can send a workload response packet 2130 to the PCIe device 620. A second workload capsule 2132 can be included in the workload response payload 2131 of the workload response packet 2130. The workload response capsule 2132 can include a request identifier 2108 and a response type indicator 2147. The response type indicator can indicate success, failure, acknowledging a write, a read response that includes data in the second workload capsule 2132, etc. The request identifier 2108 can be the same as that of a request sent to the service node. The second workload capsule can be used to produce a second TLP 2141 that can be sent to the workload. The request identifier 2108 can be used to determine the TLP requester ID 2104 to include in the second TLP. The response type indicator 2147 can be used to determine the TLP type 2143 to include in the second TLP. The TLP completer ID 2144 can indicate the virtualized PCIe function, the PCIe device 620, or the service node 103.

The service node can implement function interpretation and mapping 2110 that may use the address offset 2106, request type indicator 2107, and LTP packet header data to determine which virtualized function is being accessed. The function interpretation and mapping 2110 may use a virtualized PCIe function map.

FIG. 22 is a diagram of an exemplary virtualized PCIe function map 2201 according to some aspects. The purpose of the virtualized PCIe function map is to associate virtualized PCIe access functions on PCIe devices with virtualized PCIe functions provided by service nodes. The specific technique for performing the mapping is implementation dependent. Different implementations may store more, less, or different data on the PCIe devices, on the service nodes, or on both. Regardless of the specific implementation, associations between virtualized PCIe access functions on PCIe devices with virtualized PCIe functions provided by service nodes are formed and used for properly directing workload packets.

The virtualized PCIe function map 2201 has virtualized PCIe function map entries that can be used for mapping between virtualized PCIe access functions on PCIe devices and virtualized PCIe functions provided by service nodes. Host computers can access the virtualized PCIe access functions via PCIe PFs and VFs implemented by PCIe devices. The service nodes and the PCIe devices can exchange workload packets to thereby provide virtualized PCIe functions to the host computers. The workload packets can be UDP/LTP packets. The virtualized PCIe function map entries can include a PCIe device identifier 2202, a PCIe function identifier 2203, a request type indicator 2204, an offset address 2205, a transaction endpoint node identifier 2206, and a transaction endpoint type 2207. The PCIe device identifier 2202 can identify a PCIe device and may be a label, a MAC address, an IP address, or some other indicator. The PCIe function identifier 2203 can identify a PCIe PF or VF. The PCIe function identifier 2203 may be a globally unique number/label or may be a number/label that is unique only within the PCIe device implementing the function. The request type indicator 2204 can be determined using the TLP request type or through some other technique. The offset address 2205 can be used to determine which aspect of the virtualized PCIe function is being accessed. For example, one offset may be for reading a clock value while a different offset may be for reading a clock parameter such as time zone. The transaction endpoint node identifier 2206 can indicate a service node or a circular replication chain. For example, the transaction endpoint node identifier 2206 may be an IP address of a service node or a vIP of a circular replication chain. The transaction endpoint type 2207 may indicate whether the virtualized PCIe function is implemented at the service node as executable code, a switch PCIe device such as a graphics processing unit (GPU) installed in a smart switch, or a local device such as a compression circuit 418 (see FIG. 4) implemented within the service node.

Figure 23:
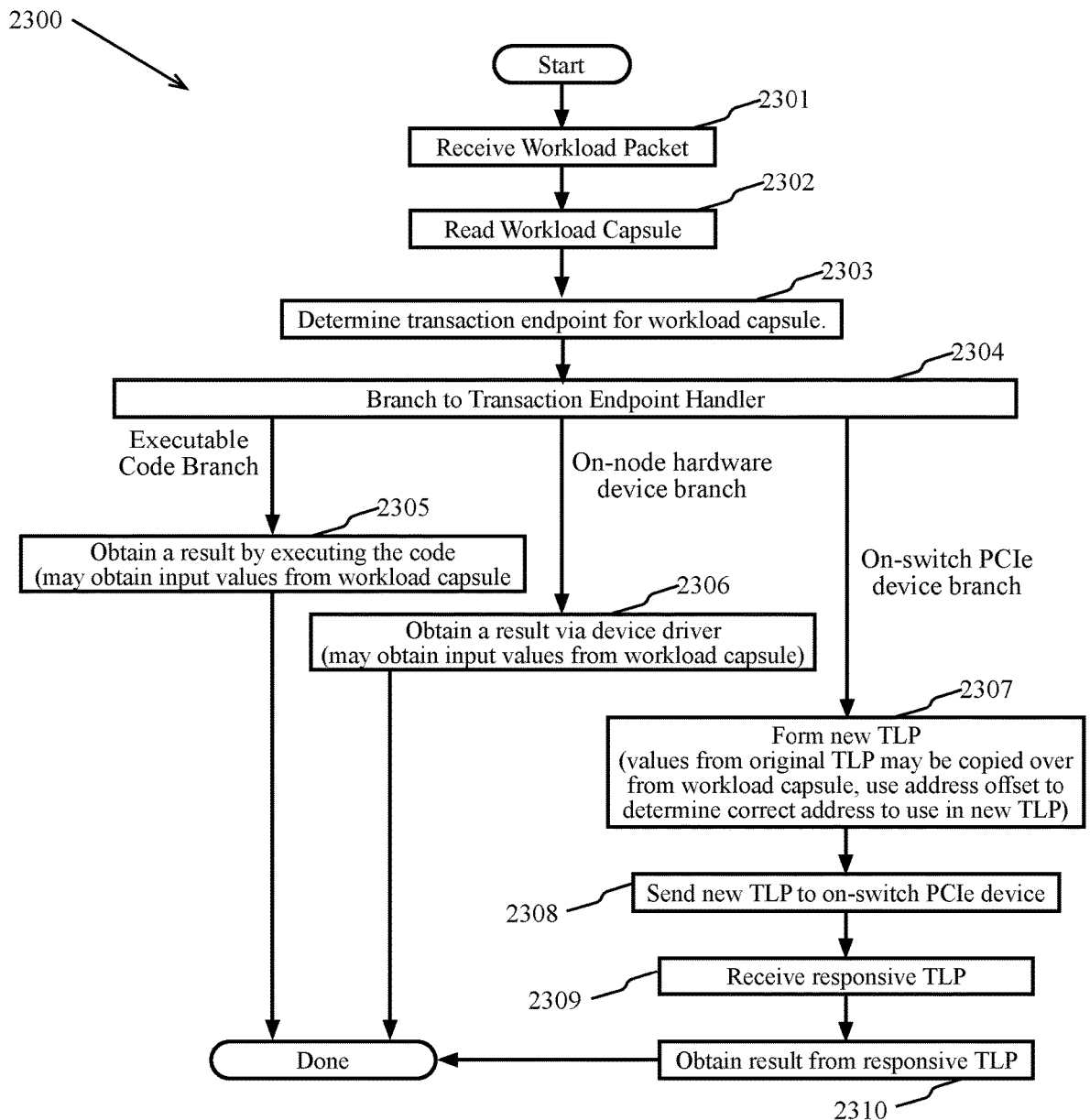
FIG. 23 is a high-level flow diagram of a process that can be used by a service node to provide virtualized PCIe functions implemented as executable code, via hardware on the service node, or via hard installed in a smart switch according to some aspects.

FIG. 23 is a high-level flow diagram of a process that can be used by a service node to provide virtualized PCIe functions implemented as executable code, via hardware on the service node, or via hardware installed in a smart switch according to some aspects. After the start, at block 2301 the process can receive a workload packet. At block 2302, the process can read a workload capsule that is included in the workload packet. Some implementations may include multiple workload capsules in a single workload capsule. For clarity, the illustrated process processes one workload capsule with the understanding that one practiced in the art could easily implement a loop for processing additional workload capsules. At block 2303, the process determines the transaction endpoint for the workload capsule. At block 2304, the process can branch to a transaction endpoint handler for the transaction endpoint. The executable code branch can be taken for software implemented virtualized PCIe functions. At block 2305, the process can obtain a result by executing the code. The specific code to execute may be determined using a virtualized PCIe function map. Input values for the executable code may be obtained from the workload capsule. The on-node hardware device branch may be taken when the virtualized PCIe function is implemented by hardware within the service node. At block 2306, the process can obtain a result via an on-node device driver that accesses the on-node hardware. Input values for the device driver or hardware device may be obtained from the workload capsule. The on-switch PCIe device branch may be taken when the virtualized PCIe function is implemented by hardware attached to a PCIe bus in the switch. At block 2307, the process can form a new TLP. Values from the original TLP (e.g., the first TLP 2101 in FIG. 21) may be included in the workload capsule and may be copied over from the workload capsule. Other values from the workload capsule may be used to help produce the new TLP. The address offset and a locally stored set of base address registers can be used to determine the correct address to use in the new TLP. At block 2308, the new TLP can be sent to the hardware via the switch's PCIe bus. At block 2309, the process can receive a responsive TLP from the hardware. At block 2310, the process can obtain a result from the responsive TLP.

FIGS. 19-23 illustrate aspects of using service nodes 103 and PCIe devices 620 to provide virtualized PCIe functions. The PCIe devices 620 can provide virtualized PCIe function access points while the service nodes 103 provide the virtualized PCIe functions. Such implementations can disaggregate certain complex and expensive operations from within the host to the service nodes. Virtualizing the functions to the service nodes can lower the costs of providing those functions and can provide increases in maintenance, upgrading, and scaling.

As described above with reference to FIGS. 19-23, PCIe functions can be virtualized using a PCIe device 620 that receives TLPs, acknowledges the TLPs, and sends LTP packets based on the TLPs to service nodes that can be located within smart switches. The functionality of the virtualized PCIe functions can be provided via the service nodes. High availability PCIe functions can therefore be provided using chain replication of the service node's service state information. This PCIe function virtualization enables services that may have been provided solely by full featured smartNICs or other hardware installed in the host to be implemented by the combination of purpose built NICs, services nodes, and smart switches. Thus, the advanced features are still supported for each server but with purpose built NICs that are more capex and opex efficient and in a manner that is more energy efficient, which can reduce the environmental impact of such computing systems.

Figure 24:
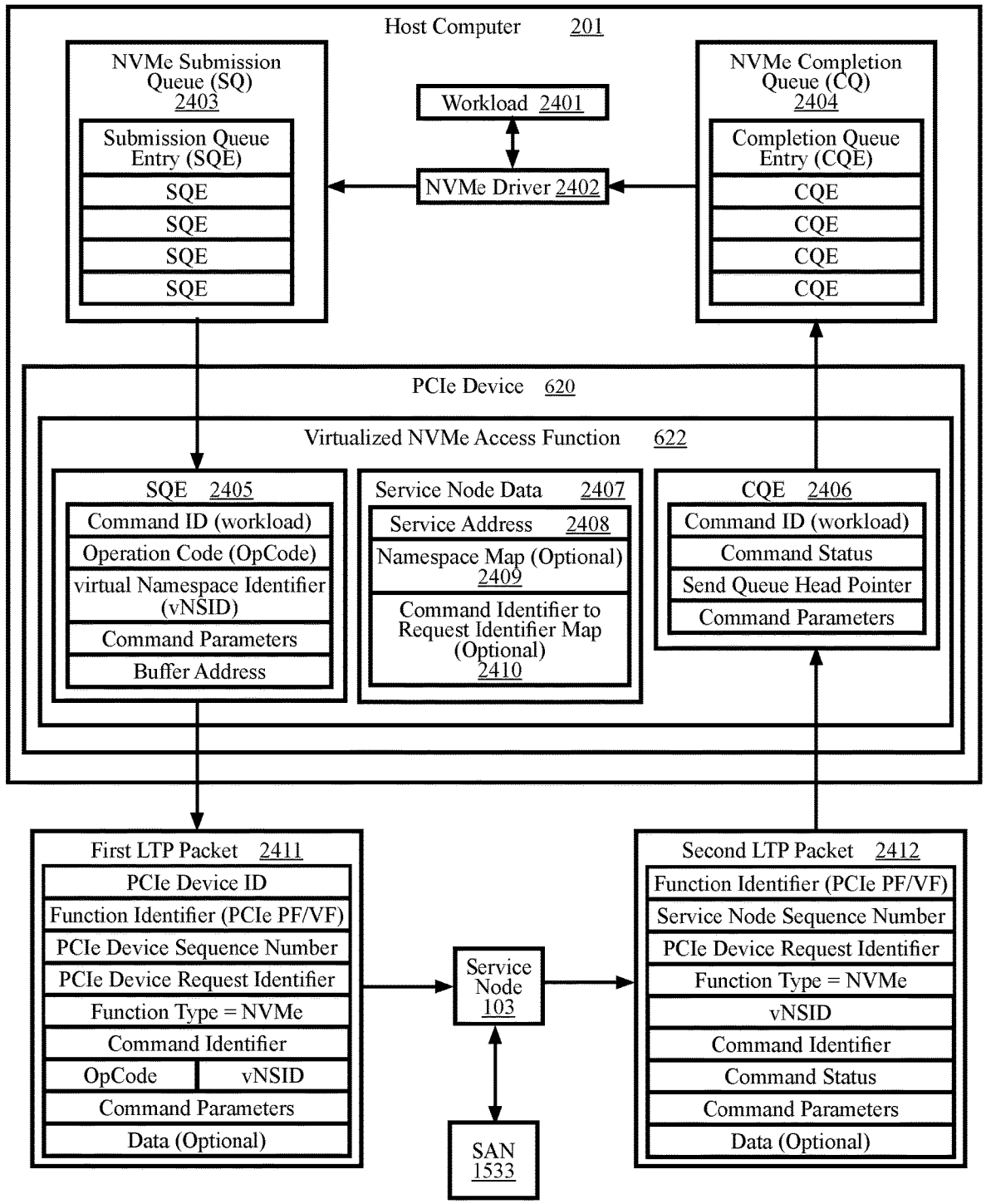
FIG. 24 is a high-level diagram illustrating a host initiated nonvolatile memory express (NVMe) transaction using a virtualized NVMe service according to some aspects.

FIG. 24 is a high-level diagram illustrating a host initiated nonvolatile memory express (NVMe) transaction using a virtualized NVMe service according to some aspects. The PCIe device 620 can implement a virtualized NVMe access function 622. The virtualized NVMe access function 622 can be a PCIe PF or VF. To the host 201, the virtualized NVMe access function 622 can appear to be an NVMe controller. As such, the workload may use a default or preinstalled NVMe driver because no special device driver for the virtualized function is required.

Many details of NVMe controller behavior, and PCIe register layouts for PCIe controllers are specified in the document "NVM Express Management Interface, Revision 1.1c" (hereinafter the NVMe specification) published Feb. 2, 2021 by NVM Express. NVM Express is a standards making body for NVMe hardware, NVMe communications, and NVMe protocols. As such, those practiced in NVMe storage are familiar with the aspects of implementing and using NVMe controllers and with other aspects of NVMe.

The virtualized NVMe access function 622 can exchange workload packets with a service node 103 that implements a virtualized NVMe function. The virtualized NVMe function implemented by the service node can use NVMe over fabric (NVMe-oF) protocols to access a storage area network (SAN). NVMe Express published "NVM Express over Fabrics, Revision 1.1" (hereinafter the NVMe-oF specification) on Oct. 22, 2019. The NVMe-oF specification details and specifies the protocols and requirements of accessing and using a storage area network (SAN) that implement an NVMe-oF interface such as NVMe/TCP, NVMe over fiber channel (NVMe/FC), and NVMe/RDMA. As such, those practiced in storage area networks are familiar with the aspects of implementing and using NVMe controllers, with implementing and using NVMe-oF, and with other aspects of NVMe.

A workload 2401 can initiate an NVMe transaction by placing a submission queue entry SQE on a submission queue (SQ) 2403. The PCIe device 620 can implement a virtualized NVMe access function and may be notified of the SQE by, for example, writing a value into a doorbell register of the PCIe device 620. The virtualized NVMe access function 622 can get SQEs from the SQ and process them to produce workload packets such as the first LTP packet 2411. The format of SQEs is defined by the NVMe specification. A SQE can include a command identifier, an operation code (opcode), virtual namespace identifier (vNSID), command parameters, and a buffer address. NVMe controllers expect a namespace identifier (NSID). An NSID identifies block storage on a physical device. The virtualized NVMe access function can use a vNSID as an NSID. The vNSID can be a value used by a PCIe device to identify block storage but that must be mapped to an NSID used by a SAN. The service node can use the vNSID to identify a NSID that identifies block storage on a SAN. The service node may therefore use a mapping between vNSIDs and NSIDs to splice together a connection (an NVMe splice) between a workload 2401 and a SAN. As such, the vNSID may indicate an NVMe splice.

The virtualized NVMe access function 622 can use the SQE 2405 to produce a workload packet such as a first LTP packet 2411. The first LTP packet 2411 can include a PCIe device identifier, a PCIe function identifier a PCIe device sequence number a PCIe device request identifier, a function type, a command identifier, an opcode, a vNSID, command parameters, and may include data. When comparing the first LTP packet 2411, the LTP packet 520 shown in FIG. 5 and SQE 2405, it may be observed that the first LTP packet may be an LTP packet wherein the workload capsule is an NVMe capsule. The PCIe device identifier and the function identifier can be used to identify a specific PCIe device and a function implemented by that PCIe device. The function type indicates that the workload capsule is an NVMe capsule. The PCIe device sequence number can be used to determine that a LTP packet has been lost such that it can be retransmitted. The PCIe request identifier can be used to identify the request being sent to the service node such that a response can be associated with the request via the PCIe device request identifier. The command identifier, opcode, vNSID, and command parameters may be the same as that in the SQE 2405. The SQE 2405 contains a buffer address that may refer to data that is to be transferred to storage. The data, if present, may be copied from the host and into the first LTP packet 2411.

The service node 103 can process the first LTP packet 2411. The service node can establish a connection with a SAN via one of the NVMe-oF protocols. As such, the service node can write data from an LTP packet into a namespace served by the SAN and can read data from a namespace served by the SAN. If an LTP includes an NVMe write request and data, then the service node can write the data to the SAN via NVMe-oF. If an LTP request includes an NVMe read request then the service node can fetch the requested data via NVMe-oF and send it to the virtualized NVMe access function as a read response or as a write request.

The service node 103 can send a second LTP packet 2412 to the PCIe device 620. The second LTP packet can include a PCIe function identifier, a PCIe device sequence number, a PCIe device request identifier, a function type, a command identifier, an opcode, a vNSID, command parameters, and may include data. The second LTP packet 2412 is shown without a PCIe device identifier because the packet can be sent to a specific PCIe device and the PCIe device identifier may therefore not be needed. The second LTP packet 2412 can contain a service node sequence identifier that may be used to help ensure reliable delivery of LTP packets from the service node to the PCIe device. Those practiced in communications networks are familiar with using sequence numbers to ensure reliable delivery. Comparing the second LTP packet 2412 to the completion queue element (CQE) 2406, it can be seen that the second LTP packet 2412 is a LTP packet carrying an NVMe capsule that includes a CQE. The contents and format of CQEs is given in the NVMe specification. The second LTP packet 2412 is shown including a PCIe device request identifier, as such, the second LTP packet is responsive to a request having that PCIe device request identifier. The command identifier and other data in the LTP packet may also indicate that the second LTP packet 2412 is a response. The PCIe device 620 can receive the second LTP packet 2412 and use it to produce a CQE 2406. The CQE 2406 can then be placed on an NVMe completion queue (CQ) associated with the SQ. The NVMe driver can use the CQE to determine the result of an SQE.

Figure 25:
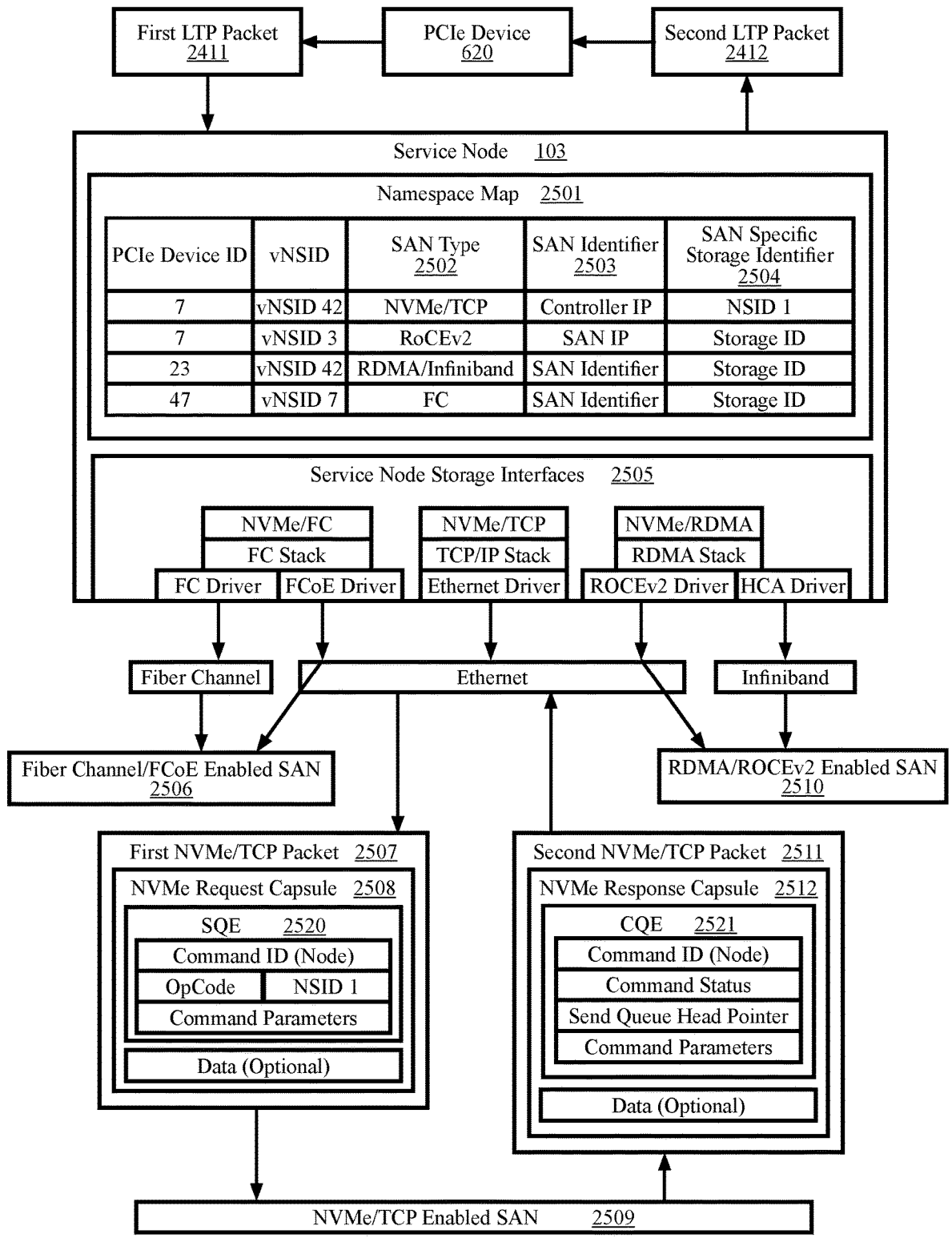
FIG. 25 is a high-level diagram of a service node providing a virtualized NVMe service according to some aspects.

FIG. 25 is a high-level diagram of a service node providing a virtualized NVMe service according to some aspects. FIG. 24 provided a view centered on the PCIe device whereas FIG. 25 provides a view centered on the service node. The service node 103 can receive the first LTP packet 2411. The function type indicates that the LTP carries an NVMe capsule. The service node 103 can use the PCIe device identifier and the vNSID in the LTP packet contents and a namespace map 2501 to identify a specific SAN, the type of the SAN, and an identifier for a block of storage served by that SAN. Namespace map entries indicate name space mappings and can include a PCIe device identifier, a vNSID, a SAN type 2502, a SAN identifier 2503, and a SAN specific storage identifier 2504. The service node 103 can use service node storage interfaces 2505 to access SANs using a variety of transports and transport protocols, many of which are illustrated. The illustrated transport protocols include NVMe/FC, fiber channel (FC), fiber channel over ethernet (FCoE), NVMe/TCP, NVMe/RDMA, RDMA, and ROCEv2. Each of these transport protocols is well known in the art and software, including open source software, is available for implementing these transport protocols. The illustrated transports are fiber channel, ethernet, and InfiniB and. Fiber channel or ethernet may be used to access a fiber channel/FCoE enabled SAN 2506. Ethernet or InfiniBand may be used to access an RDMA/ROCEv2 enabled SAN 2510.

Ethernet may be used to access a NVMe/TCP enabled SAN. Each of these transports is well known in the art and is widely available. The service node 103 may also use other transports and transport protocols. The SAN type 2502 can indicate a transport and a transport protocol to use for accessing the SAN identified by the SAN identifier 2503. SANs can provide access to different blocks of storage and can use SAN specific storage identifiers to identify the blocks of storage. For example, NVMe refers to those blocks of storage as name spaces and uses namespace identifiers (NSIDs) to identify the blocks of storage.

Having used the PCIe device identifier and the vNSID to identify a SAN, SAN type, and storage block in the SAN, the service node can access the SAN to read data from the storage block or write data to the storage block. Using the first namespace mapping in the namespace map 2501, the identified SAN can be an NVMe/TCP enabled SAN 2509 and the storage block can have the NSID "NSID 1". ("NSID 1" is used here for clarity, actual NSIDs have a different format in accordance with the NVMe specification and the NVMe-oF specification.) The service node can send a first NVMe/TCP packet 2507 to the NVMe/TCP enabled SAN 2509 having the IP address "controller IP". The first NVMe/TCP packet 2507 can include a NVMe request capsule 2508. The formats and contents of NVMe/TCP request capsules and response capsules are specified in the NVMe specification and the NVMe-oF specification. The NVMe request capsule 2508 includes an SQE 2520. The SQE 2520 sent to the SAN is not the same as the SQE 2405 submitted to the workload. The SQE 2520 sent to the SAN 2509 has an NSID, "NSID 1", that the SAN 2509 can use to identify a storage block. The command identifier in the SQE 2520 sent to the SAN 2509 has a command identifier that identifies the transaction between the service node and the SAN. The SQE 2405 submitted by the host 201 identifies the transaction between the host 201 and the PCIe device 620. The PCIe device 620 can store the PCIe device request identifier in association with the command identifier for the transaction between the host 201 and the PCIe device. The service node 103 can store the PCIe device request identifier in association with the command identifier for the transaction between the service node 103 and the SAN 2509. As such, the two transactions may be spliced together via the LTP packets 2411, 2412 and PCIe device request identifier.

The SAN 2509 can send a second NVMe/TCP packet 2511 to the service node. The second NVMe/TCP packet 2511 and be responsive to the first NVMe/TCP packet 2507. The second NVMe/TCP packet 2511 can include a NVMe response capsule 2512 that can include a CQE 2521. The command identifier in the CQE 2521 is the same as the command identifier in the SQE 2520 when the CQE is responsive to the SQE. If the SQE 2520 is a read request, the NVMe response capsule 2512 can contain the data that was requested. If the SQE 2520 is a write request, the NVMe response capsule 2512 can indicate the success or failure of the write request. The NVMe-oF specification specifies the contents and formats of NVMe capsules, such as NVMe request capsules and NVMe response capsules. The service node may use the NVMe response capsule 2512 to produce the second LTP packet 2412.

Figure 26:
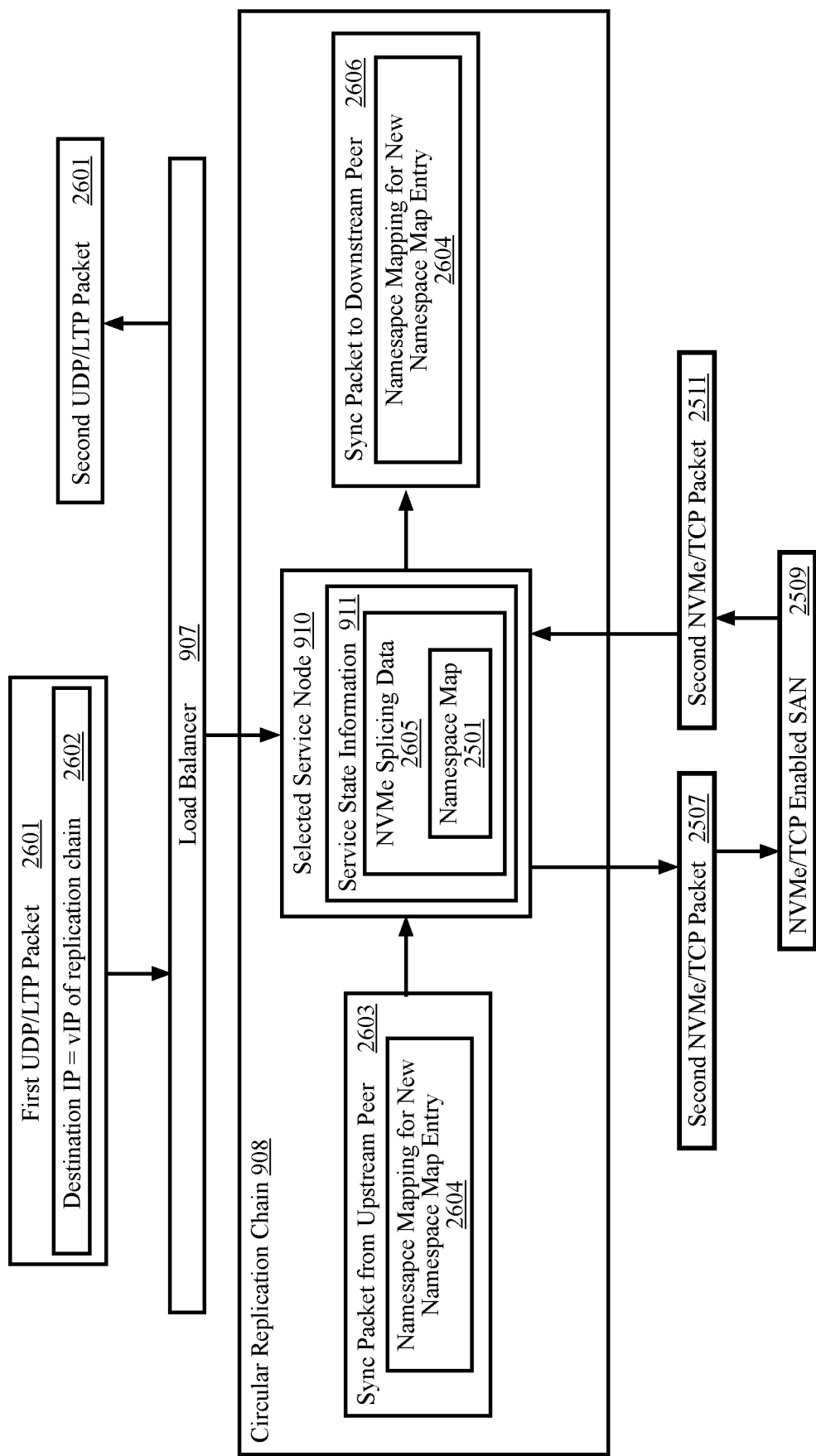
FIG. 26 is a high-level diagram of a service node in a circular replication chain providing a virtualized NVMe service according to some aspects.

FIG. 26 is a high-level diagram of a service node in a circular replication chain 908 (see FIG. 9) providing a virtualized NVMe service according to some aspects. A first UDP/LTP packet 2601 can have a destination IP that is the vIP of the circular replication chain. The load balancer 907 can receive the first LTP/UDP packet 2602 and send it to a selected service node 910. The service state information 911 of the selected service node can include NVMe splicing data 2605 such as a namespace map 2501. Upon receiving the first LTP/UDP packet 2601, the selected service node may create a new namespace map entry 2604 in the namespace map 2501 or may in some other way change the service state information 911. As such, the service state information 911 has changed and the select service node 910 sends a sync packet 2606 to its downstream peer. Eventually, the service node's upstream peer can send the new namespace map entry 2604 to the selected service node.

FIG. 27 is a diagram illustrating exemplary service node data 2407 that may be stored by a PCIe device according to some aspects. The service node data 2407 can contain a service address 2408 and may contain a namespace map 2409. The service address can indicate a service node or circular replication chain that may provide virtualized NVMe services. The namespace map 2409 may be provided by a service node. The service node data can contain a command identifier to request identifier map 2410. The entries in the command identifier to request identifier map 2410 can associate a command identifier, a request identifier, a send queue head pointer, and a buffer address. The command identifier, the send queue head pointer, and the buffer address can be obtained from an SQE submitted by the host. The request identifier (e.g., the PCIe device request identifier in the LTP packets 2411, 2412) can identify the transaction between the PCIe device 620 and the service node 103.

FIG. 28 is a diagram illustrating an exemplary command identifier to request identifier map 2801 according to some aspects. The command identifier to request identifier map 2801 can have entries that associate a PCIe device identifier, a PCIe function identifier, a command identifier (from host SQE), a request identifier, another command identifier (SQE to SAN) a send queue head point (from host SQE), and a buffer address (from host SQE). The entry fields annotated "from host SQE" may be included in implementations where those values are included in the LTP packets and stored at the service node. In such implementations, the LTP packets sent from the service node to the PCIe device may include all the information needed by the PCIe device to generate a CQE.

Figure 29A:
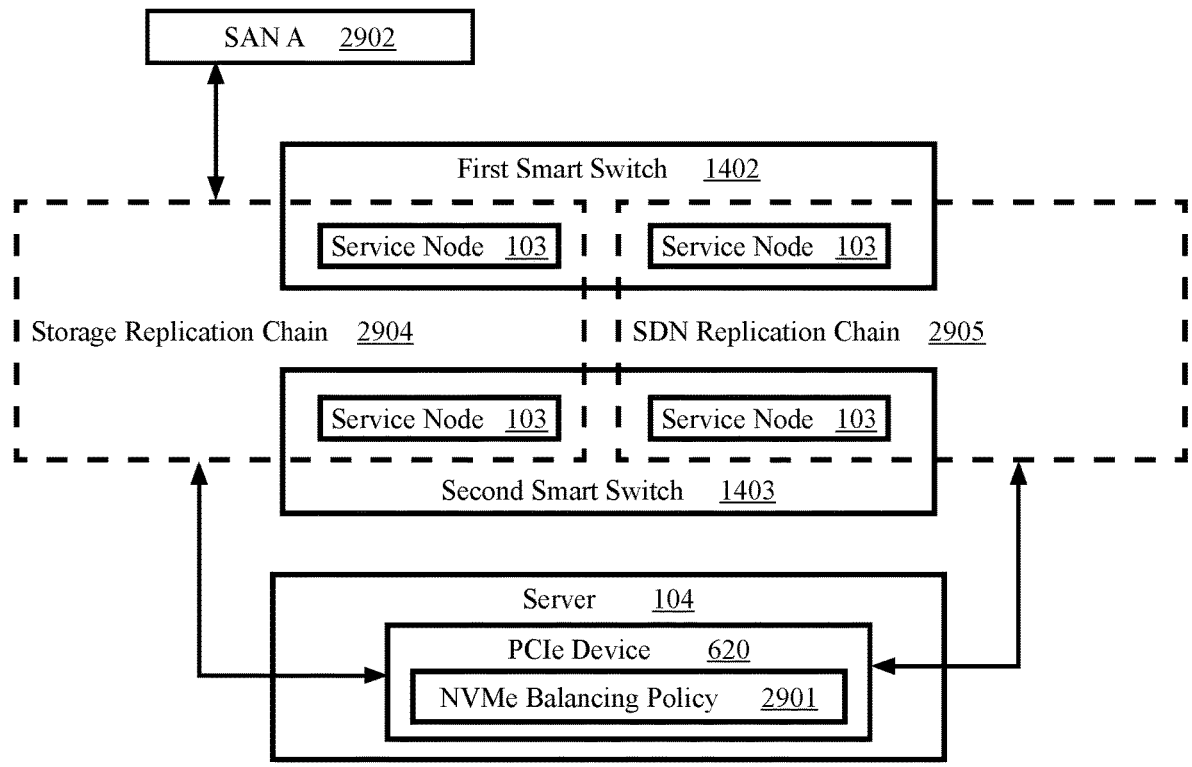
FIG. 29A, FIG. 29B, and FIG. 29C are high-level diagrams of providing high availability access to a storage area network (SAN) according to some aspects.
Figure 29B:
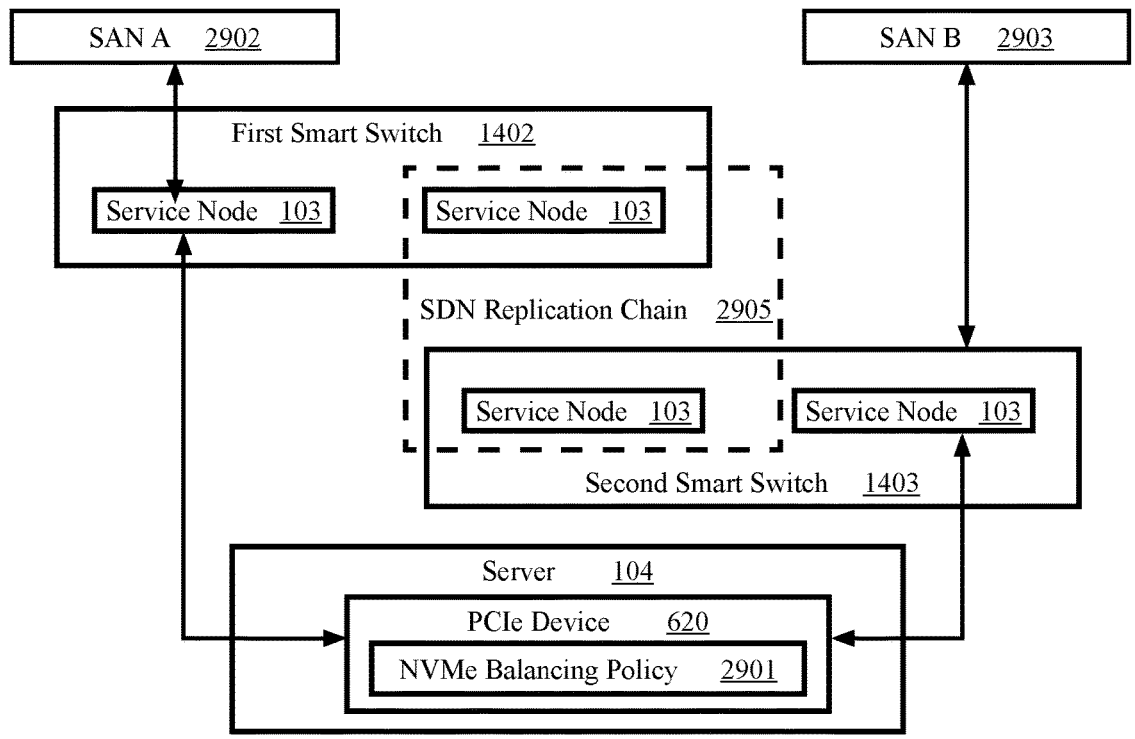
Figure 29C:
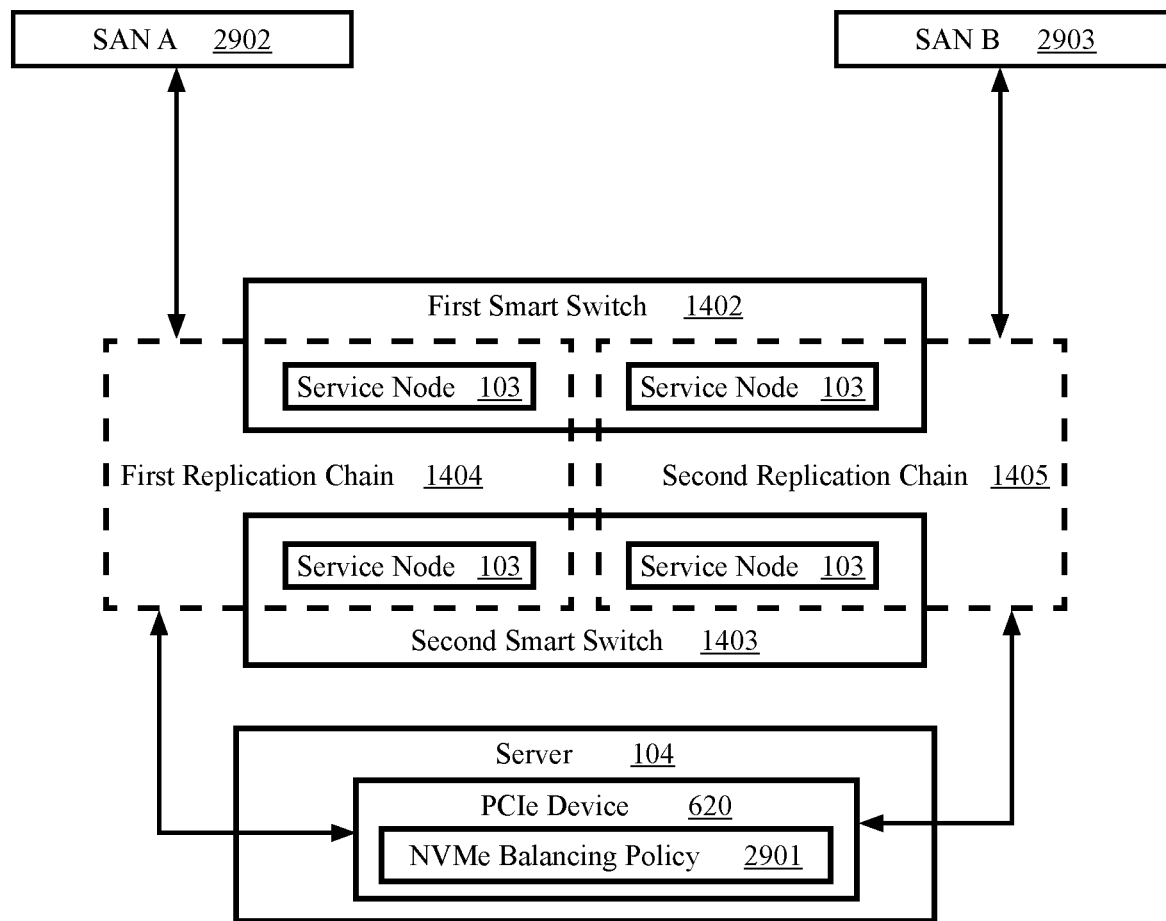

FIG. 29A, FIG. 29B, and FIG. 29C are high-level diagrams of providing high availability access to a storage area network (SAN) according to some aspects.

FIG. 29A is a high-level diagram of using a storage replication chain 2904 and two smart switches for providing high availability to persistent storage according to some aspects. The persistent storage can be accessed via SAN A 2902. The PCIe device 620 can have two ports and can use one of the ports to access SAN A 2902 via the storage replication chain 2904. The storage replication chain 2904 includes services nodes 103 that are in the first smart switch 1402 and in the second smart switch 1403. As such, the server 104 can access SAN A 2902 when one of the smart switches is not functioning due to failure, maintenance, upgrading, etc. A software defined networking (SDN) replication chain 2905 can also include service nodes 103 that are in the first smart switch 1402 and in the second smart switch 1403. The service nodes in the SDN replication chain can provide SDN services such as NAT, firewalling, processing TCP and UDP packets, etc. A single service node may be configured within numerous replication chains such as storage replication chains, SDN replication chains, replication chains providing virtualized PCI services and functions, etc.

FIG. 29B is a high-level diagram of using service nodes 103 and two smart switches for providing high availability to persistent storage according to some aspects. Multiple SANs or SAN access nodes may be configured to provide high availability access to data. For example, SAN A and SAN B may provide access to a namespace in persistent storage. The namespace itself may be mirrored or replicated in some manner such that the data in the namespace is consistent when accessed via SAN A 2902 or SAN B 2903. Those practiced in SANs are familiar with providing consistent access to a namespace. The PCIe device 620 has two ports. The server 104 can use one of the PCIe device ports to access SAN A 2902 via a service node 103 in the first smart switch 1402. The server 104 can use another one of the PCIe device ports to access SAN B 2903 via a service node 103 in the second smart switch 1403. As such, the server still has access to namespaces when one of the smart switches is not functioning. The PCIe device 620 can have an NVMe balancing policy 2901. For example, the PCIe device could use an active-passive balancing policy wherein LTP packets are sent to an active smart switch, such as the first smart switch 1402. The other smart switch, the standby or backup smart switch may be idle or may handle other traffic for other devices. If the active smart switch fails or is taken out of service, then the passive smart switch can become the active smart switch. Those practiced in high availability networking are familiar active-passive balancing policies as well as many other balancing policies such as active-active, etc.

FIG. 29C is a high-level diagram of using multiple replication chains for providing high availability access to persistent storage according to some aspects. A first smart switch 1402 and a second smart switch 1403 include service nodes 103. A first replication chain 1404 includes service nodes of both smart switches. The second replication chain 1405 also includes service nodes of both smart switches. The PCIe device 620 can have an NVMe balancing policy 2901. For example, the PCIe device could use an active-passive balancing policy wherein LTP packets are sent to one of the replication chains, called the active replication chain. The other replication chain, the standby or backup replication chain may be idle or may handle other traffic for other devices. If the active chain fails, the passive replication chain can become the active replication chain. Those practiced in high availability networking are familiar activepassive balancing policies as well as many other balancing policies. It is common for SANs to have a number of access nodes. The first replication chain 1404 is connected to SAN A 2902 2902. The second replication chain 1405 is connected to SAN B 2903.

FIGS. 24-29C illustrate aspects of using service nodes 103 and PCIe devices 620 to provide virtualized NVMe services and functions. The PCIe devices 620 can provide virtualized NVMe service and function access points while the service nodes 103 provide the virtualized NVMe services and functions. Such implementations can disaggregate certain complex and expensive operations from within the host to the service nodes. For example, NVMe/TCP consumes considerable resources in smartNICs. Moving resource consuming aspects of NVMe/TCP to the service nodes allows for simplified PCIe devices 620 while still providing an NVMe/TCP capability. Virtualizing the functions to the service nodes can lower the costs of providing those functions and can provide increases in maintenance, upgrading, and scaling.

As described above with reference to FIGS. 24-29C, NVMe services and functions can be virtualized using a PCIe device 620 that reads SQEs from a SQ on the host, and sends LTP request packets based on the SQEs to service nodes that can be located within smart switches. The service nodes can perform transactions with a SAN on behalf of the host and send the transaction results to the PCIe device in LTP response packets. The PCIe device can produce CQEs based on the LTP response packets and enqueue the CQEs on a CQ on the host that is associated with the SQ. Transaction originated by a SAN can follow a similar protocol for reading from or writing to the host. High availability NVMe services and functions can be provided using chain replication of the service node's service state information. High availability can also be provided using multiple smart switches that are each connected to replicated or mirrored SANs. This NVMe function virtualization enables services that may have been provided solely by full featured smartNICs to be implemented by the combination of purpose built NICs and services nodes. Thus, the advanced features are still supported for each server but with purpose built NICs that are more capex and opex efficient and in a manner that is more energy efficient, which can reduce the environmental impact of such computing systems.

Figure 30:
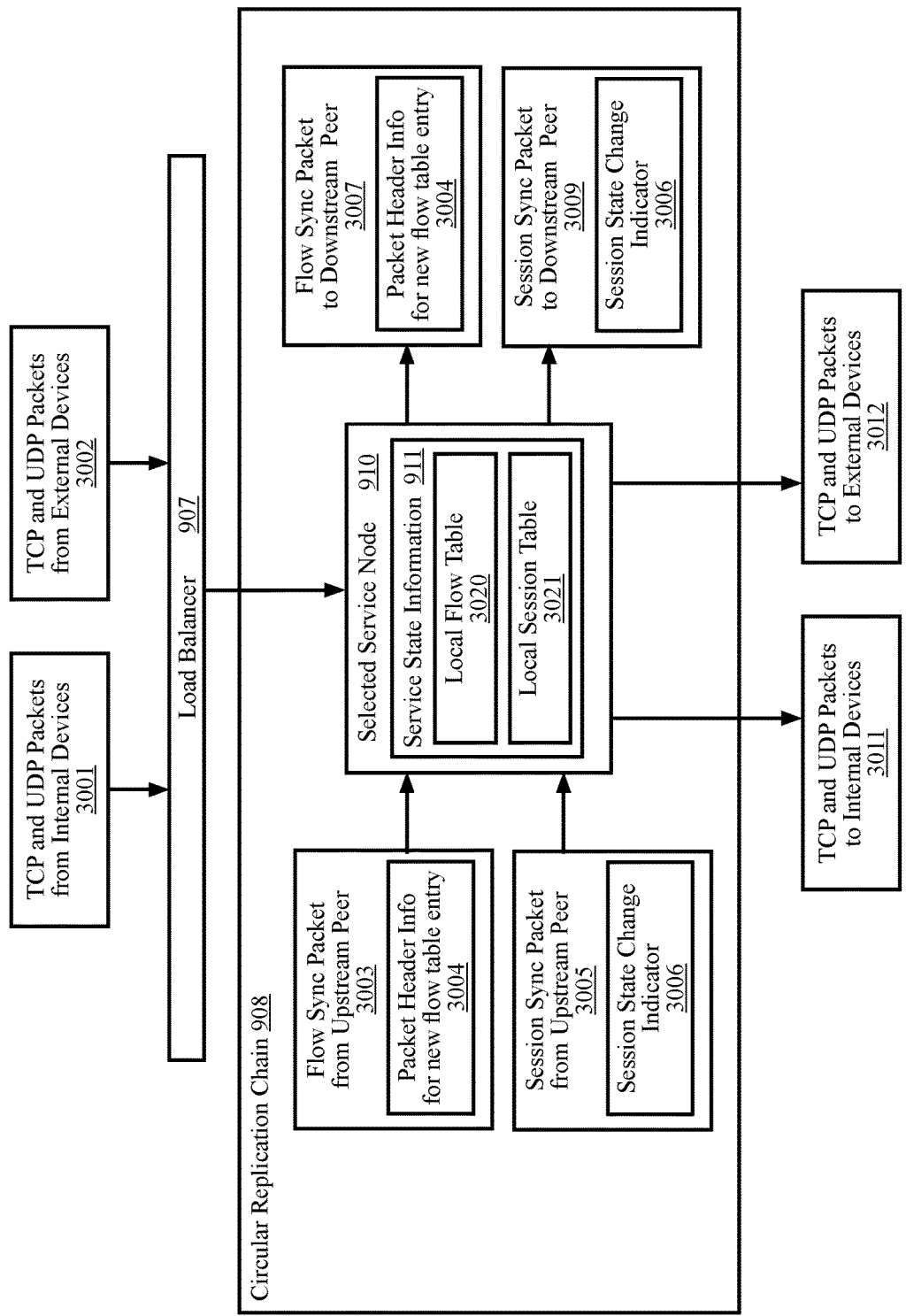
FIG. 30 is a high-level diagram of a service node in a circular replication chain providing packet processing services according to some aspects.

FIG. 30 is a high-level diagram of a service node in a circular replication chain providing packet processing services according to some aspects. The service nodes may provide network services such as routing, switching, firewalling, etc. for network traffic flows. As such, a service node can have a local flow table 3020 and a local session table 3021. Those practiced in computer switching and routing hardware are familiar with flow tables and session tables. A flow table can be used for identifying the specific processing that is to be applied to a packet. Upon receiving a packet, the service node can use the packet's header information (e.g., the packet 5-tuple of source IP, source port, destination IP, destination port, and protocol) to calculate a flow identifier. The service node can then check the flow table for an entry having that flow identifier. A "flow miss" occurs when the flow table has no such entry. A "flow hit" occurs when the flow table has an entry for the flow identifier. For a flow hit, the service node processes the packet as directed by the flow table entry. For a flow miss, the service node can determine how the packet is to be processed and create a new entry in the flow table for the packet. A session typically consists of two flows, a forward flow and a reverse flow. Both flows can have flow table entries. A session table can have entries for the active sessions being handled by a service node. The session table can be used for tracking the state of the sessions.

The service state information 911 of a service node can include the local flow table 3020 and the local session table 3021. When a flow miss occurs, a new flow table entry can be created and a flow sync packet 3007 can be sent to the downstream peer in a circular replication chain 908. The flow sync packet can include the entire packet that caused the flow miss or can include only the packet header information 3004 that can be used for producing a flow table entry for the new flow. Flow tables in different service nodes are unlikely to be identical due to implementation details of the flow tables. As such, each peer may use the packet header information 3004 for flow table replication. A service node creating a flow sync packet can send the flow sync packet to its downstream peer and may later receive the packet header information in a flow sync packet 3003 from its upstream peer.

Session tables can track the state of a session. For example, the notoriously well-known TCP protocol has sessions that can be in a number of states (e.g., LISTEN, SYN-SENT, SYN-RECEIVED, ESTABLISHED, FIN-WAIT-1, FIN-WAIT-2, CLOSE-WAIT, CLOSING, LAST-ACK, and TIME-WAIT). A service node can send a session sync packet 3009 to its downstream peer when the session changes state or a session changes. The session sync packet 3009 can include a session state indicator 3006 that indicates the new state of the session. As such, each peer may use the session state indicator 3006 to replicate session tables. A service node creating a session sync packet can send the session sync packet to its downstream peer and may later receive the same session state indicator 3006 in a session sync packet 3005 from its upstream peer.

TCP and UDP packets from internal devices 3001 (hosts and PCIe devices on the local network) can be received by the load balancer 907. TCP and UDP packets from external devices 3002 (hosts and PCIe devices on the public network) can also be received by the load balancer 907. The load balancer 907 chooses a selected service node 910 for each packet. If a packet causes a change to the service state information 911 of the selected service node, then the selected service node may send flow sync packets or session sync packets to its downstream peer. The selected service node can process a packet and then send the packet to its destination. As such, the service nodes can send TCP and UDP packets to internal devices 3011 and can send TCP and UDP packets to external devices 3012.

Due to the nature of network traffic flows, a service node may process a packet without waiting for all the peers to forward a related flow sync packet 3003 or a related session sync packet 3005 through the circular replication chain. Two peers can receive packets for a new flow, create flow sync packets, and process the packets for the new flow. Upon receiving the flow sync packet for a known flow, a peer may drop the flow sync packet or may forward it down the replication chain. The network traffic is still processed properly. The same observation applies for session sync packets and session table entries.

Figure 31:
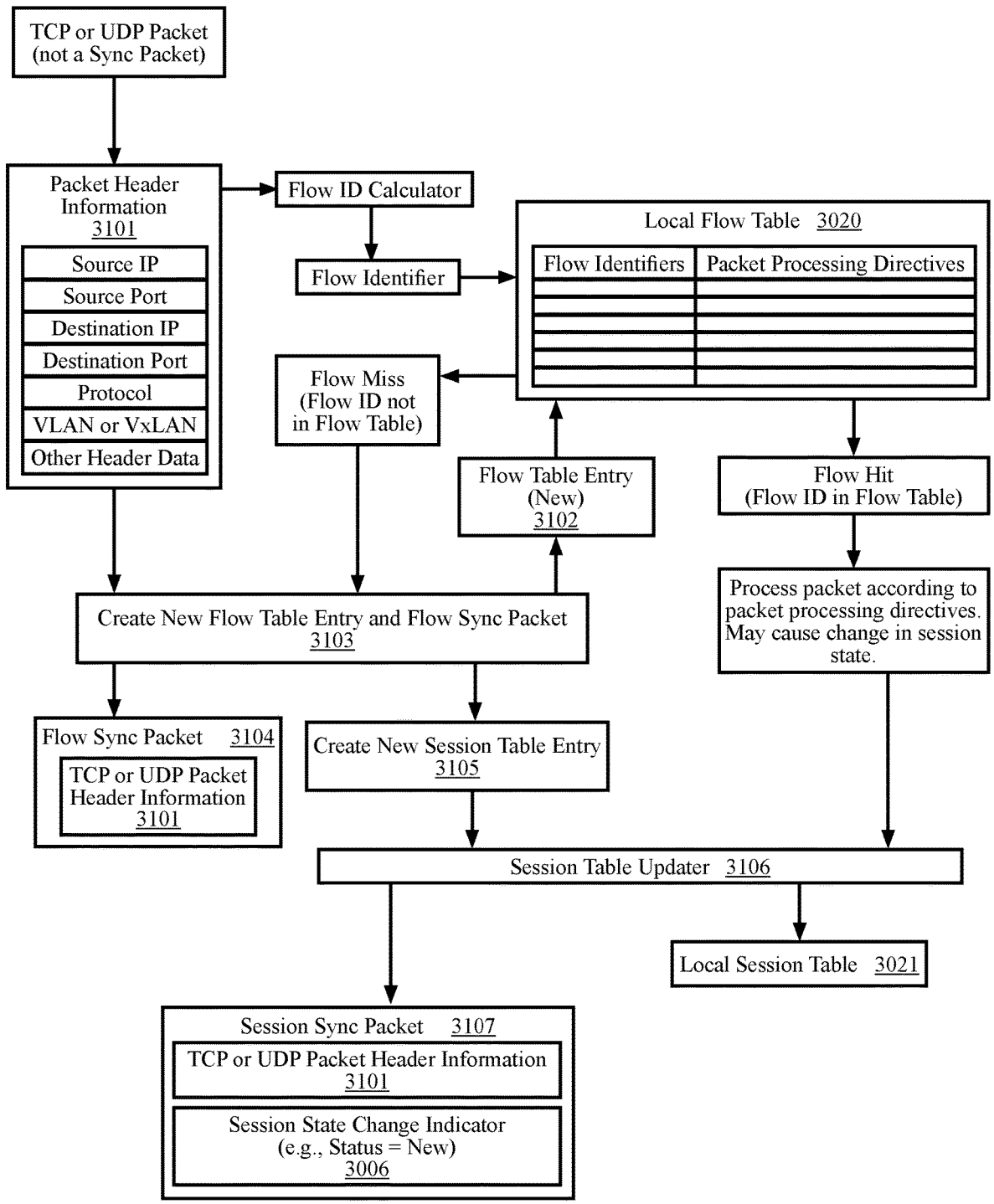
FIG. 31 is a high-level diagram of adding flow table entries and session tables entries according to some aspects.

FIG. 31 is a high-level diagram of adding flow table entries and session tables entries according to some aspects. The packet header information 3101 of a TCP or UDP packet can be used to calculate a flow identifier. A flow miss results in a new flow table entry being created and stored in the local flow table 3020, in the packet header information 3101 being sent in a flow sync packet 3104 to the downstream peer, and in the creation of a new session table entry 3105. A session table updater 3106 can store the new session table entry in the local session table 3021 and can send a session sync packet to the downstream peer. The session sync packet may contain the entire packet or the packet header information 3101 such that the peer service nodes can add an appropriate session table entry. The session state change indicator for a new session can indicate that it is a new session. A flow hit does not cause a change to the local flow table 3020, but processing the associated packet may cause a change in session state. If session state changes, the local session table can be updated and a session sync packet sent to the peer nodes.

Figure 32:
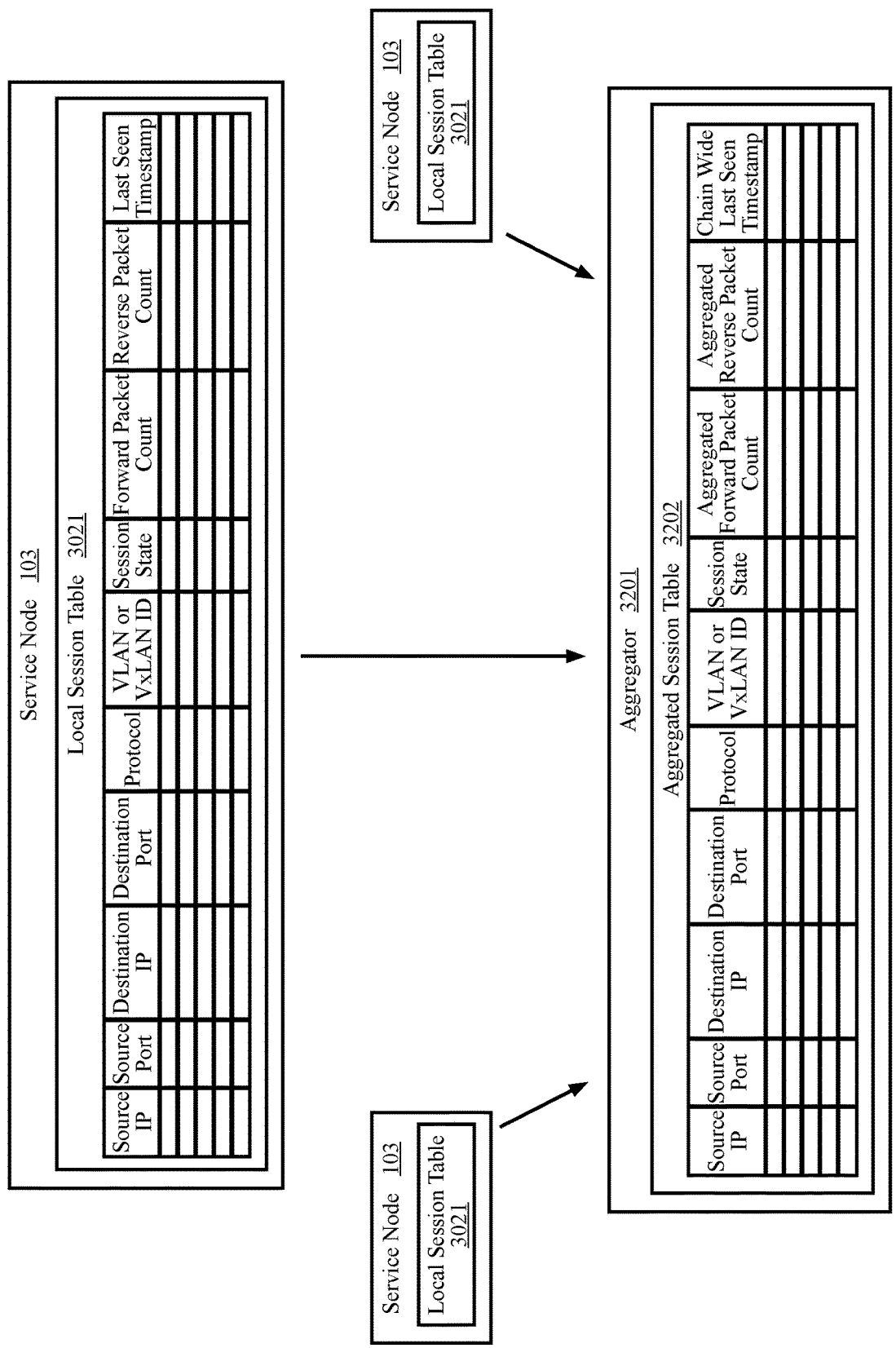
FIG. 32 is a high-level diagram of aggregating session table information according to some aspects.

FIG. 32 is a high-level diagram of aggregating session table information according to some aspects. Session state tables are often used to keep statistics for a flow such as the number of packets in the reverse flow and the number of packets in the forward flow. Session state may not be changed when a statistic is updated. As such, each service node only has the statistics for those packets the service node has processed. The statistics may therefore be aggregated such that an aggregator 3201 with an aggregated session table 3202 has statistics based on all the packets processed by the circular replication chain. The statistics that can be gathered include packet counts, byte counts, number of invalid packets, etc. The aggregated statistics can be used for monitoring the performance of the network (both local and public), the workloads, the service nodes, the PCIe devices, the SANs, and other devices.

Figure 33:
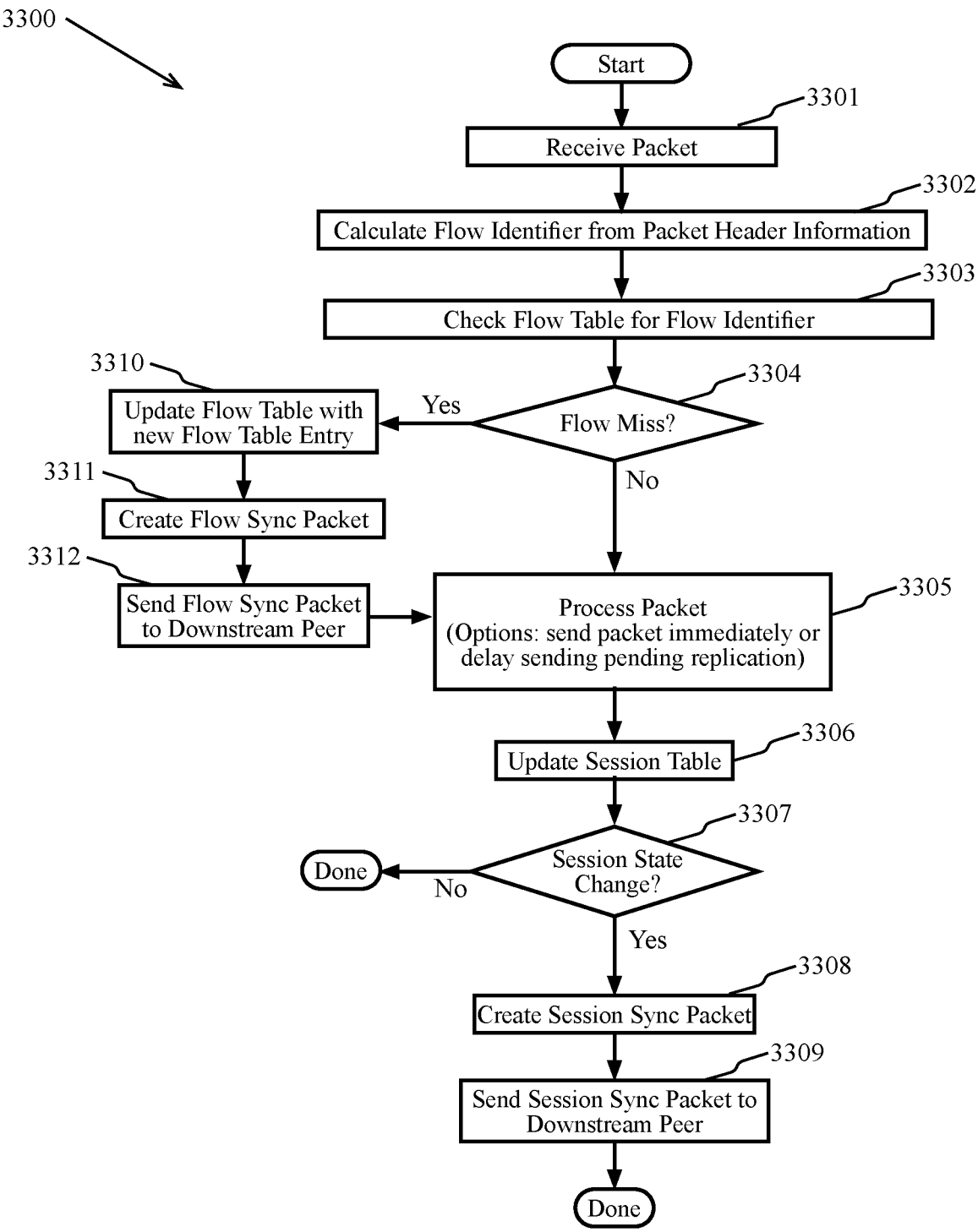
FIG. 33 is a high-level flow diagram of a process that can be used by service nodes for processing network traffic and for chain replication of flow tables and session tables according to some aspects.

FIG. 33 is a high-level flow diagram of a process that can be used by service nodes for processing network traffic and for chain replication of flow tables and session tables 3300 according to some aspects. After the start, at block 3301 a packet is received. At block 3302, a flow identifier can be calculated from the packet's header information. At block 3303, the flow table can be checked for an entry having the flow identifier. At decision point 3304, the process checks if there is a matching flow table entry (a flow hit or a flow miss). If there is not a flow miss then at block 3305 the packet can be processed. At block 3305, the packet may be immediately forwarded to its destination or it may be delayed pending replication. For example, a session often includes a forward flow and a reverse flow. The service nodes can be configured to allow forward flows to initiate new sessions while reverse flows are not allowed to initiate new sessions. A forward flow can be packets flowing from an internal network to an outside network. A reverse flow can be packets flowing from an outside network to an internal network. As such, all of the service nodes should have flow table entries for a new session before a reverse flow packet is received because otherwise a service node may drop a reverse flow packet for the new session. If a reverse flow is allowed to establish a new session, then the packet may be forwarded immediately.

Figure 34:
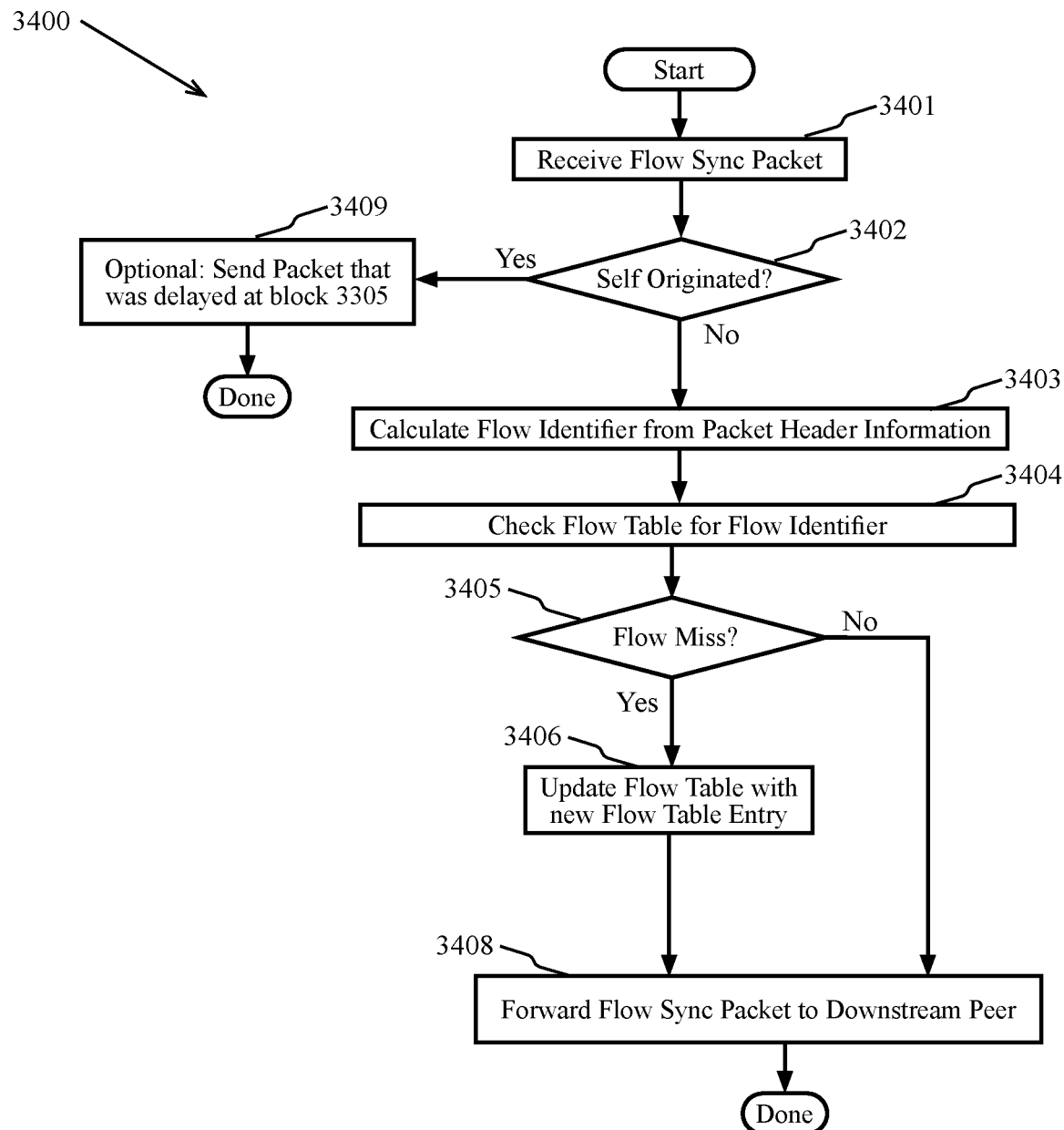
FIG. 34 is a high-level flow diagram of a process that can be used by service nodes for processing flow sync packets and for chain replication of flow tables according to some aspects.
Figure 35:
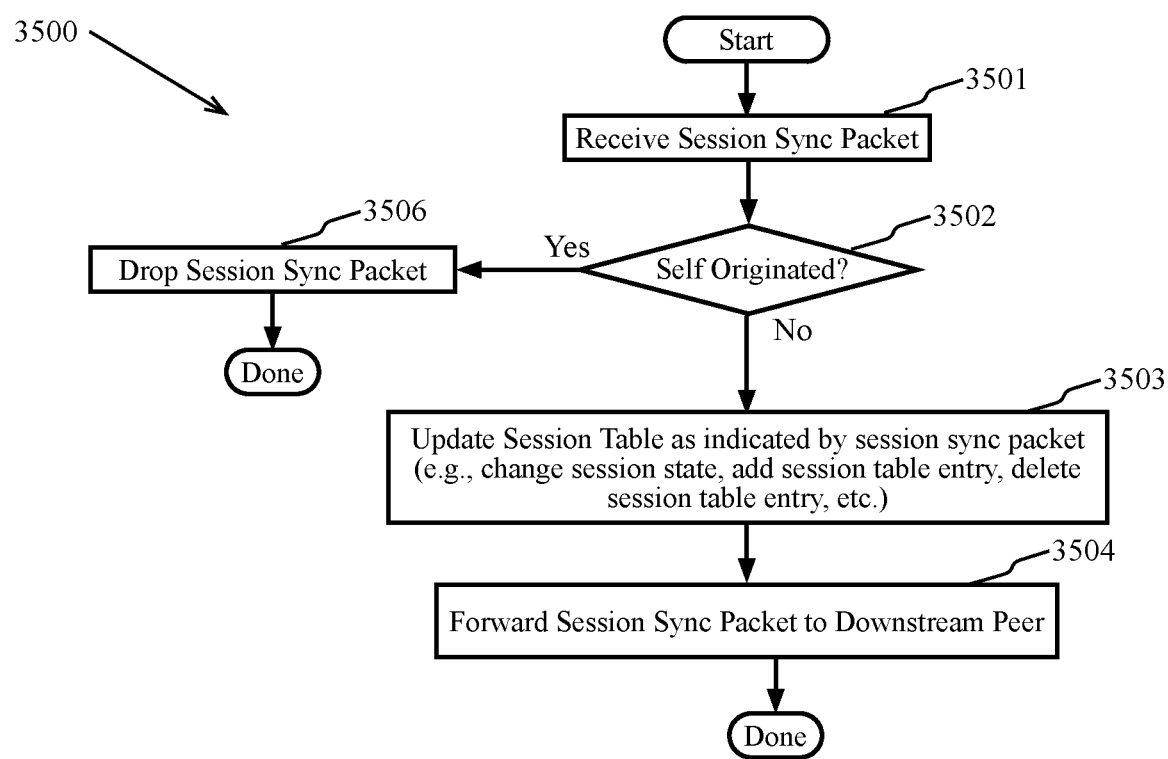
FIG. 35 is a high-level flow diagram of a process that can be used by service nodes for processing session sync packets and for chain replication of session tables according to some aspects.

At block 3306, the session table can be updated. At decision point 3307, the process determines if there is a session state change. If not, the process is done. Otherwise, at block 3308 a session sync packet is created. At block 3309 the session sync packet is sent to the downstream peer before the process is done. If at decision point 3304 there is a flow miss, the process moves to block 3310. At block 3310, the flow table is updated to include the new flow entry. At block 3311, a flow sync packet is created. At block 3312, the flow sync packet is sent to the downstream peer before the process moves to block 3305. After the process is done, the packet has been processed and the service node's downstream peer has been informed of any service state changes caused by processing the packet. FIGS. 34 and 35 provide exemplary processes the downstream peer and other peer nodes may use for chain replication of that changed service state information.

FIG. 34 is a high-level flow diagram of a process that can be used by service nodes for processing flow sync packets and for chain replication of flow tables 3400 according to some aspects. After the start, at block 3401 a flow sync packet is received. At decision block 3402, the process determines if the flow sync packet is self originated. A sync packet that a service node sends to its downstream peer is a self originated packet. In a circular replication chain, the service node receives the self originated packet from its upstream peer after the self originated packet has traversed the replication chain. At block 3305 of FIG. 33, a packet was delayed pending replication. At block 3409, that delayed packet can be forwarded to its destination. If the flow sync packet is not self originated, then at block 3403 a flow identifier can be calculated from the packet header information. At block 3404, the flow table is checked for the flow identifier. At block 3405, the process determines if a flow miss has occurred. If there has been no flow miss, then at block 3408 the flow sync packet can be forwarded to the downstream peer before the process is done. Some implementations may drop the packet instead of forwarding at block 3408. If there has been a flow miss, then at block 3406 the process can update the flow table with the new flow table entry before the process continues to block 3408.

A flow miss occurs when a service node receives a packet and has no flow table entry for that packet. In FIG. 33, a flow miss causes a service node to send a flow sync packet to its downstream peer. In FIG. 34, the flow sync packet has traversed the replication chain and is received by the service node that originated it. Receiving the self originated flow sync pack indicates to the service node that the entire replication chain has received the flow sync packet. The flow sync packet may include only header information (e.g., L2, L3, and L4 header fields) from the packet that caused the flow miss. Alternatively, the flow sync packet may be the entire packet that caused the flow miss. In such a case, at block 3409, the flow sync packet (which is the same as the packet that caused the flow miss) may be forwarded to its destination. In yet another alternative, a service node, here called the first service node, can send an entire packet that causes a flow miss to its downstream peer as a flow sync packet. After receiving the flow sync packet from its upstream peer, the first service node can process the flow sync packet (FIG. 33 processes the packet sooner at block 3305) and immediately send it to its destination. In yet another alternative, the upstream peer can process and forward the flow sync packet (which is the same as the packet that caused the flow miss) instead of sending the flow sync packet to the service node that originated the flow sync packet.

FIG. 35 is a high-level flow diagram of a process that can be used by service nodes for processing session sync packets and for chain replication of session tables 3500 according to some aspects. After the start, at block 3501 a session sync packet is received. At block 3502, the process determines if the session sync packet is a self originated packet. At block 3506, self originated packets are dropped before the process is done. If the packet is not self originated, then at block 3503 the process can update the session table as indicated by session sync packet (e.g., change session state, add session table entry, delete session table entry, etc.). At block 3504, the session sync packet can be forwarded to the downstream peer before the process is done.

Figure 36:
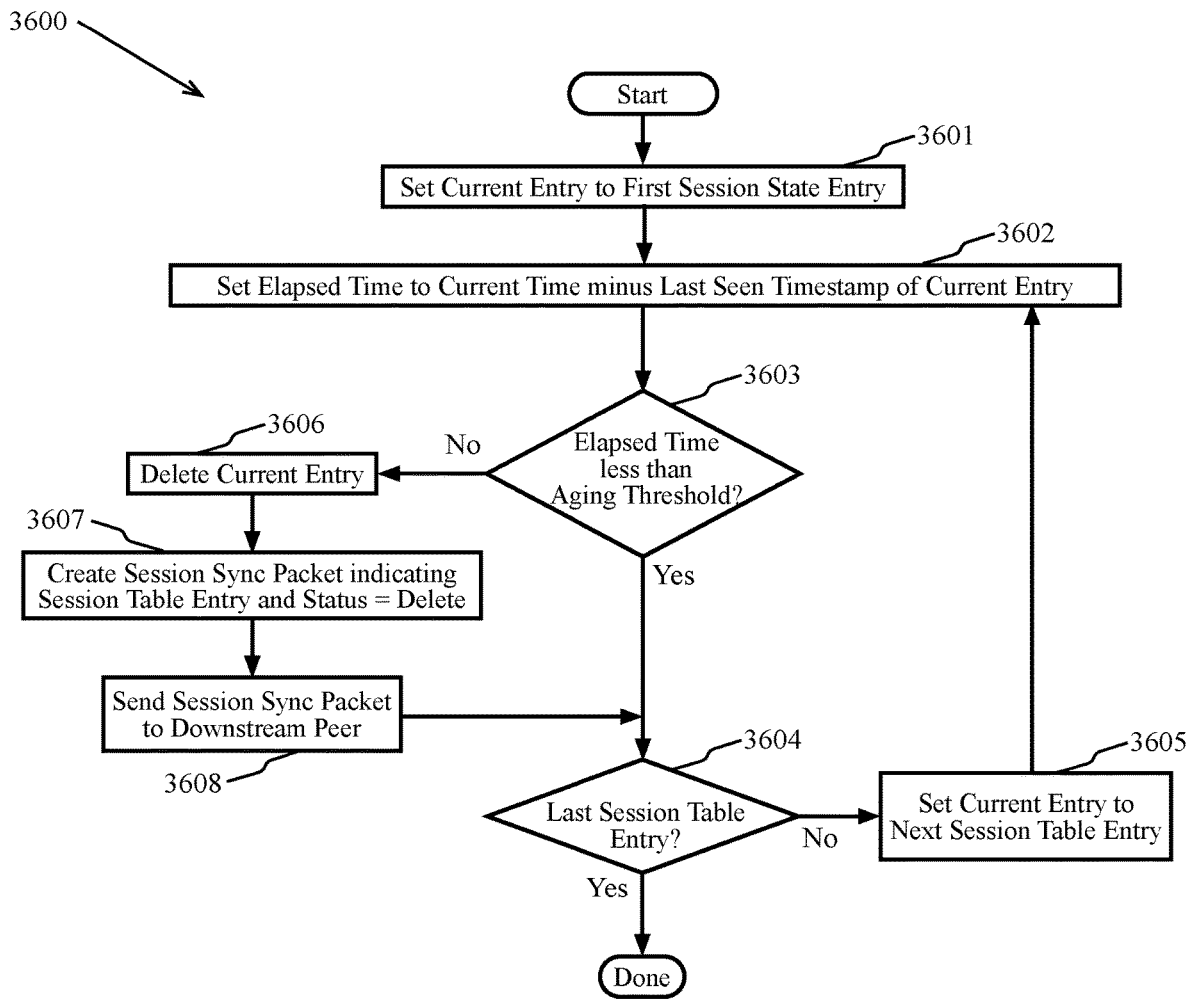
FIG. 36 is a high-level flow diagram of aging out session table entries according to some aspects.

FIG. 36 is a high-level flow diagram of aging out session table entries according to some aspects. Session tables have a finite size because service nodes 103 have finite memory and because large tables are slower to process. As such, entries can be "aged out" of the session table when it appears the session is inactive or complete. After the start, at block 3601, the current entry is set to the first session table entry. At block 3602, an elapsed time is set to the current time minus the last seen timestamp of the current entry. At block 3603, the process determines if the elapsed time is less than an aging threshold. If so, at block 3604 the process determines if the current entry is the last session table entry. If it is the last session table entry, the process is done. Otherwise, at block 3605 the current entry is set to the next session table entry and the process loops back to block 3602. If the elapsed time is not less than the aging threshold, then at block 3606 the session table entry is deleted. At block 3607 a session sync packet is created indicating that the session table entry has been deleted. At block 3608, the process sends the session sync packet to the downstream peer before continuing to block 3604. Flow table entries may be aged out using a similar mechanism or as a side effect of aging out a session. Recall that a session can have an upstream flow and a downstream flow. Aging out a session can include aging out the upstream flow and the downstream flow. Flow sync packets for aged out flows can be sent to the downstream peer.

FIG. 37A, FIG. 37B, FIG. 37C, and FIG. 37D are high level flow diagrams of processes that shut down TCP sessions according to some aspects. A first computer and a second computer can establish a TCP session by opening a TCP connection, can transfer data using the TCP protocol, and can shut down the TCP session by closing the TCP connection. As is well known in computer networking, four packets are often used to close a TCP connection. The first computer sends a first TCP FIN packet to the second computer. Second, the second computer sends the first computer an ACK to the first TCP FIN packet. (ACKs are also TCP packets). Third, the second computer sends a second TCP FIN packet to the first computer. Fourth and finally, the first computer sends the second computer an ACK to the second TCP FIN packet. The packets for the TCP session often traverse network equipment, such as switches and routers, that track the state of TCP session. FIG. 37A, FIG. 37B, FIG. 37C, and FIG. 37D illustrate aspects of tracking TCP session state using service nodes in a circular replication chain. All the service nodes in the replication chain can process packets for the TCP session while it is open and not changing state. As such, processing TCP packets can scale almost linearly with the number of service nodes in the replication chain. The TCP session has many state changes when the TCP connection is being closed. As such, the replication chain can sync the TCP session state during shutdown.

Figure 37A:
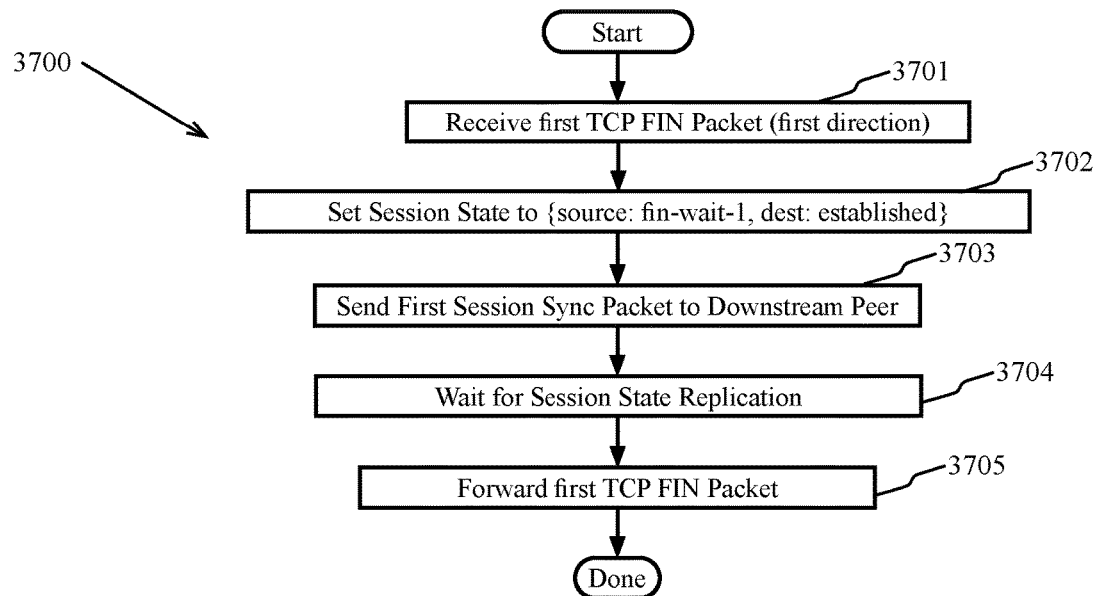
FIG. 37A, FIG. 37B, FIG. 37C, and FIG. 37D are high level flow diagrams of processes that shut down TCP sessions according to some aspects.

FIG. 37A is a high-level flow diagram of a process 3700 for processing the first TCP FIN packet according to some aspects. Packets sent from a first computer to a second computer are traveling in a "first direction". Packets sent from the second computer to the first computer are traveling in a "second direction". After the start, at block 3701 a service node receives a first TCP FIN packet for a session. The first TCP FIN packet flows in the first direction. At block 3702, the service node can set the session state to "{source: fin-wait-1, dest: established}" to indicate the first computer is in a "fin-wait" state and the second computer is in an "established" state. At block 3703, the service node sends a first session sync packet to its downstream peer. The first session sync packet informs the peer nodes of the session state change. At block 3704, the service node waits for session state replication. Service state replication can be indicated when the service node receives the first session sync packet from its upstream node. At block 3705, the service node forwards the first TCP FIN packet to its destination.

Figure 37B:
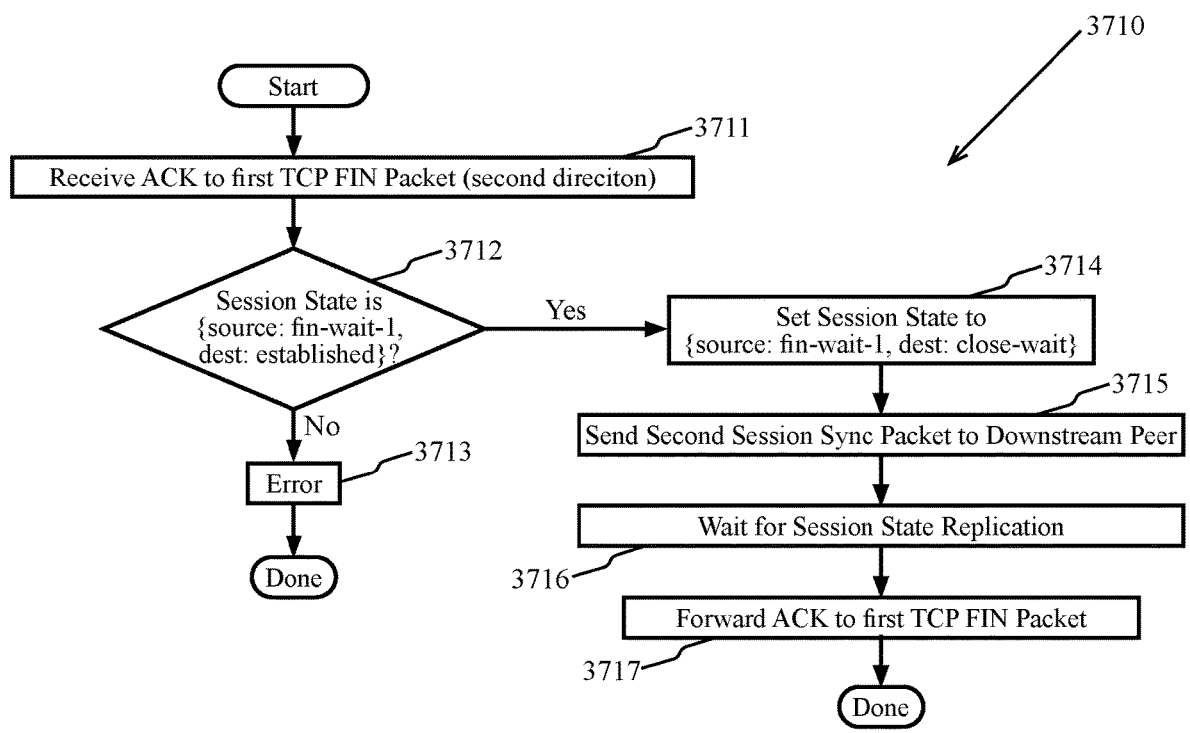

FIG. 37B is a high-level flow diagram of a process 3710 for processing the ACK to the first TCP FIN packet according to some aspects. After the start, at block 3711 a service node receives an ACK to the first TCP FIN packet for a session. The ACK to the first TCP FIN packet flows in the second direction. At decision block 3712, the service node confirms that the TCP session is in a proper state such as "{source: fin-wait-1, dest: established}". If the TCP session is not in a proper state, then at block 3713 an error can be logged or otherwise processed before the process is done. If the TCP session is in a proper state, then at block 3714, the service node can set the session state to "{source: fin-wait-1, dest: close-wait}" to indicate the first computer is in a "fin-wait" state and the second computer is in a "close-wait" state. At block 3715, the service node sends a second session sync packet to its downstream peer. The second session sync packet informs the peer nodes of the session state change. At block 3716, the service node waits for session state replication. Service state replication can be indicated when the service node receives the second session sync packet from its upstream node. At block 3717, the service node forwards the ACK to the first TCP FIN packet to its destination.

Figure 37C:
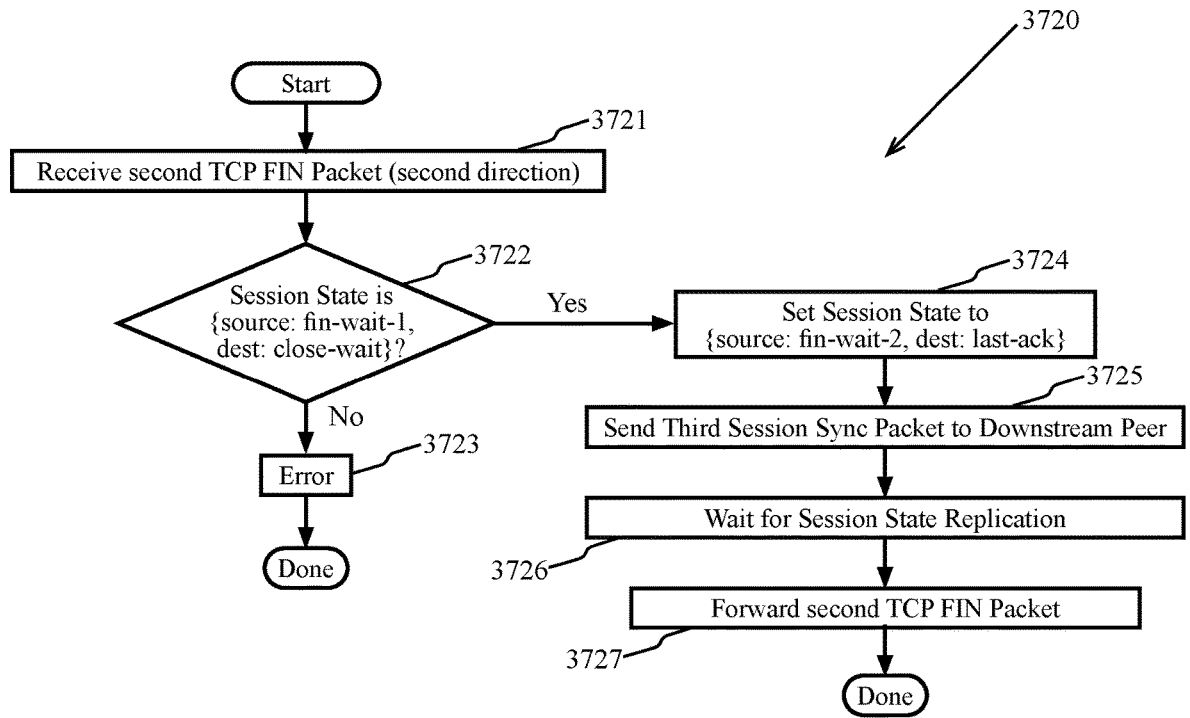

FIG. 37C is a high-level flow diagram of a process 3720 for processing the second TCP FIN packet according to some aspects. After the start, at block 3721 a service node receives the second TCP FIN packet for a session. The second TCP FIN packet flows in the second direction. At decision block 3722, the service node confirms that the TCP session is in a proper state such as "{source: fin-wait-1, dest: close-wait}". If the TCP session is not in a proper state, then at block 3723 an error can be logged or otherwise processed before the process is done. If the TCP session is in a proper state, then at block 3724, the service node can set the session state to "{source: fin-wait-2, dest: last-ack}" to indicate the first computer is in a "fin-wait-2" state and the second computer is in a "last-ack" state. At block 3725, the service node sends a third session sync packet to its downstream peer. The third session sync packet informs the peer nodes of the session state change. At block 3726, the service node waits for session state replication. Service state replication can be indicated when the service node receives the third session sync packet from its upstream node. At block 3727, the service node forwards the second TCP FIN packet to its destination.

Figure 37D:
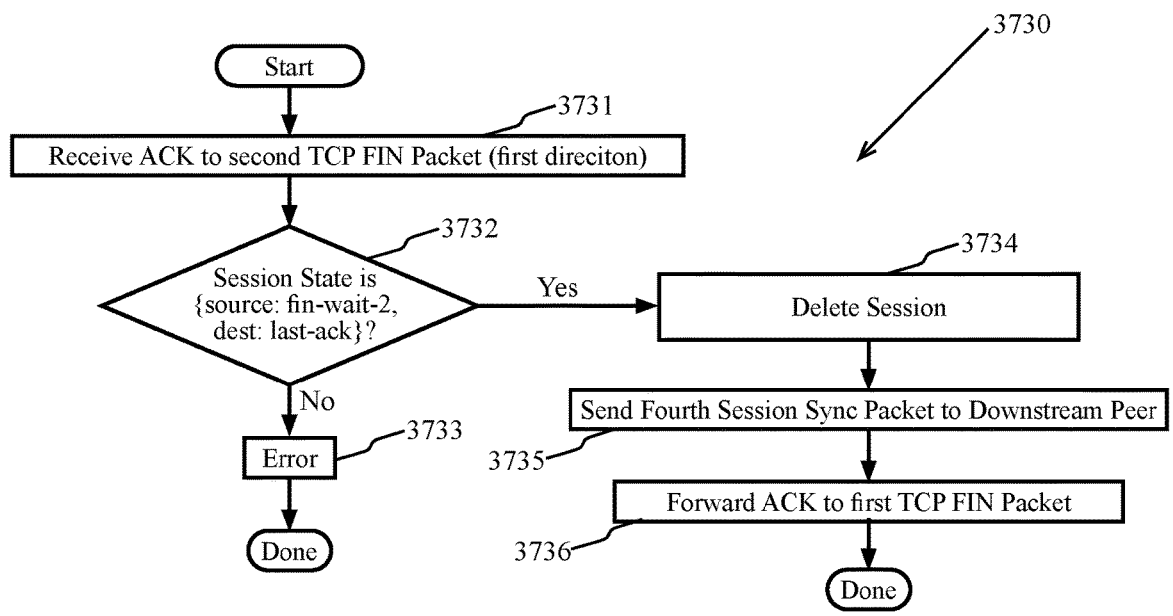

FIG. 37D is a high-level flow diagram of a process 3730 for processing the ACK to the second TCP FIN packet according to some aspects. After the start, at block 3731 a service node receives an ACK to a second TCP FIN packet for a session. The second TCP FIN packet flows in the first direction. At decision block 3732, the service node confirms that the TCP session is in a proper state such as "{source: fin-wait-2, dest: last-ack}". If the TCP session is not in a proper state, then at block 3733 an error can be logged or otherwise processed before the process is done. If the TCP session is in a proper state, then at block 3734, the service node can delete the session. At block 3735, the service node sends a fourth session sync packet to its downstream peer. The fourth session sync packet informs the peer nodes of the session ending. At block 3736, the service node forwards the ACK to the second TCP FIN packet to its destination. Note that the ACK to the second TCP FIN packet can be sent to its destination without waiting for session state replication.

As described above with reference to FIGS. 30-37D, many aspects of network traffic processing that have in the past been performed by host computers or smartNICs installed in the host computers can be handled by service nodes that can be located within smart switches. High availability network traffic processing can be provided using chain replication of the service node's service state information such as flow tables and session tables. Due to the nature of chain replication, network traffic processing can scale almost linearly with the number of service nodes used. In addition, service nodes can be dynamically added to and removed from replication chains, thereby providing additional benefits with respect to maintenance and upgrading. This highly available service node implementation and deployment enables services that may have been provided solely by full featured smartNICs to be implemented by the combination of purpose built NICs and services nodes. Thus, the advanced features are still supported for each server but with purpose built NICs that are more capex and opex efficient and in a manner that is more energy efficient, which can reduce the environmental impact of such computing systems.

Figure 38:
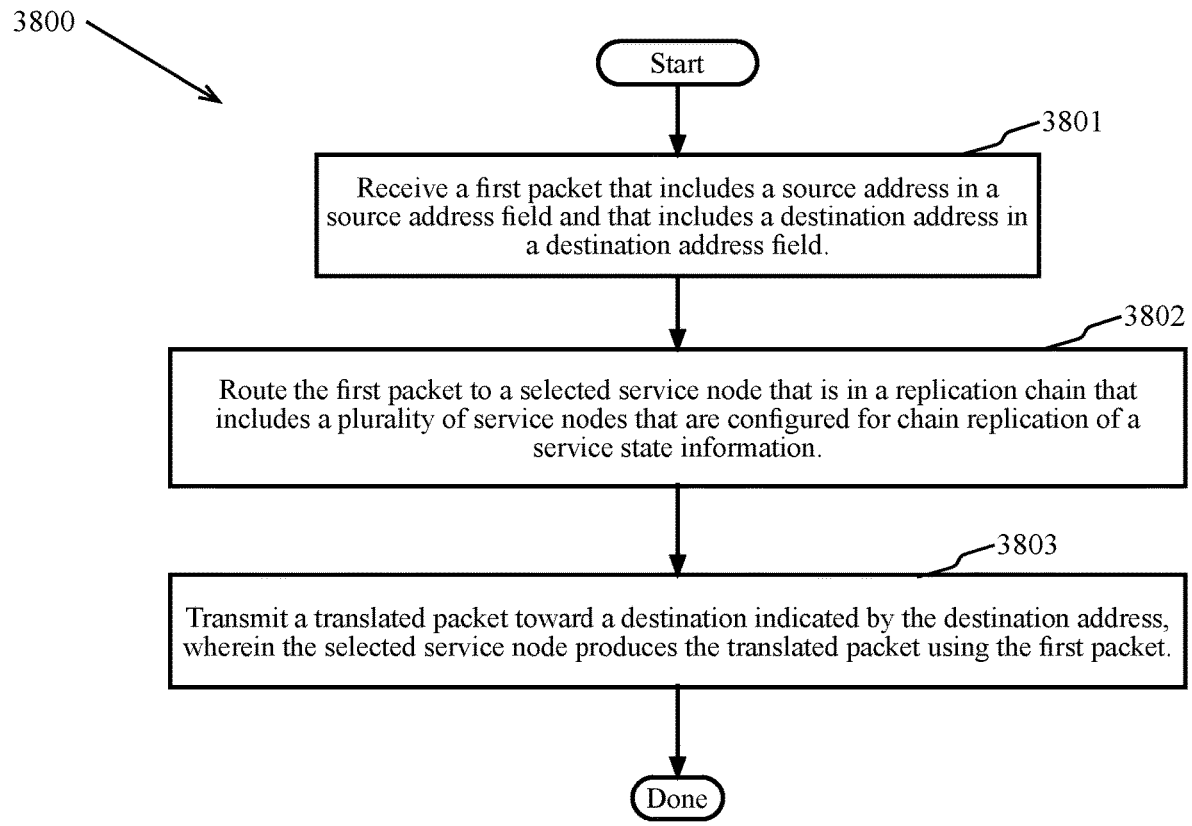
FIG. 38 is a high-level flow diagram of a method for service distribution using data path state replication and intermediate device mapping according to some aspects.

FIG. 38 is a high-level flow diagram of a method for service distribution using data path state replication and intermediate device mapping 3800 according to some aspects. After the start, at block 3801 the method can receive a first packet that includes a source address in a source address field and that includes a destination address in a destination address field. At block 3802, the process can route the first packet to a selected service node that is in a replication chain that includes a plurality of service nodes that are configured for chain replication of a service state information. At block 3803, the process can transmit a translated packet toward a destination indicated by the destination address, wherein the selected service node produces the translated packet using the first packet.

Figure 39:
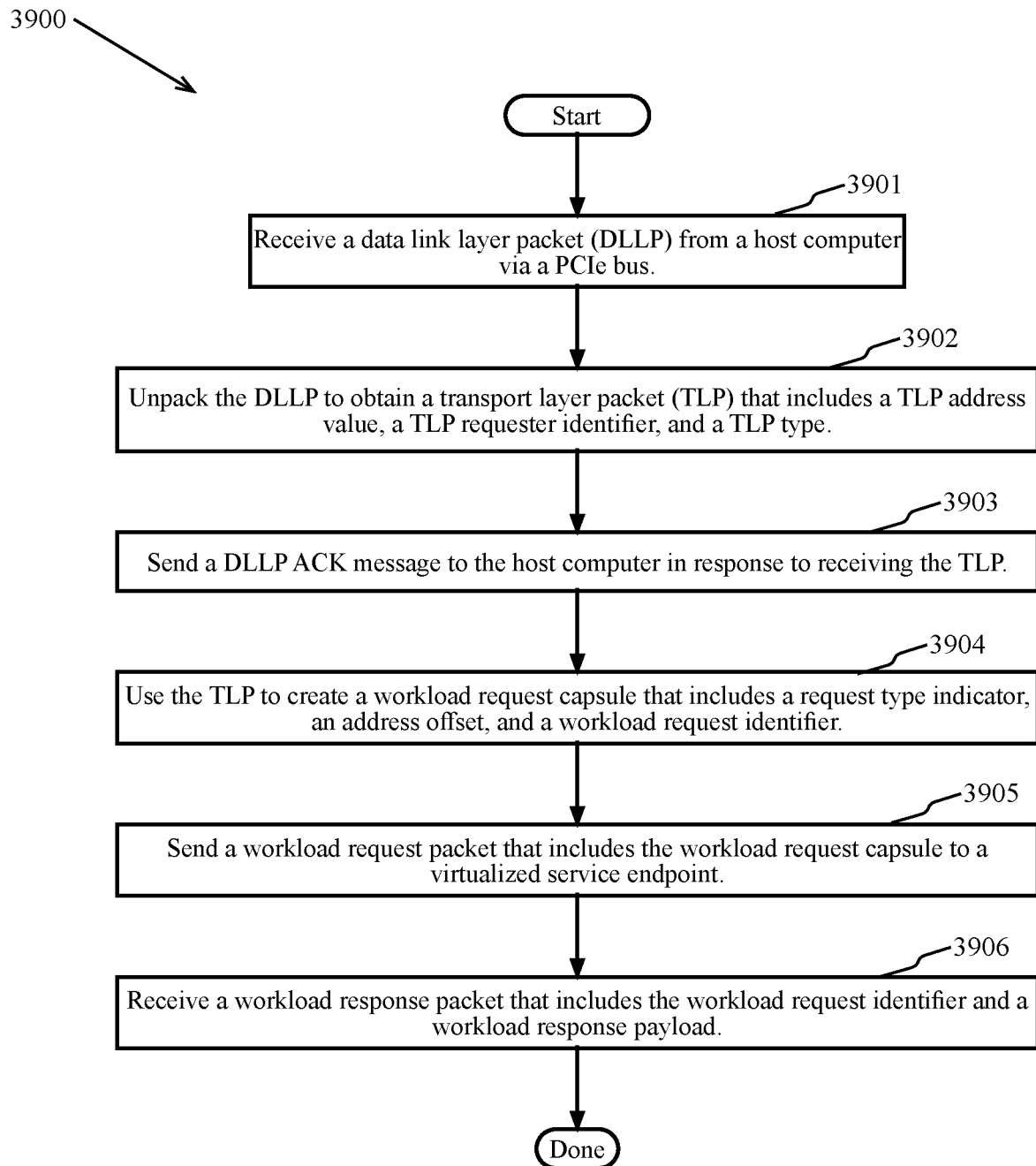
FIG. 39 is a high-level flow diagram of a method for loosely coupled PCIe service proxy over an IP network according to some aspects.

FIG. 39 is a high-level flow diagram of a method for loosely coupled PCIe service proxy over an IP network 3900 according to some aspects. After the start, at block 3901 the process can receive a data link layer packet (DLLP) from a host computer via a PCIe bus. At block 3902, the process can unpack the DLLP to obtain a transport layer packet (TLP) that includes a TLP address value, a TLP requester identifier, and a TLP type. At block 3903, the process can send a DLLP ACK message to the host computer in response to receiving the TLP. At block 3904, the process can use the TLP to create a workload request capsule that includes a request type indicator, an address offset, and a workload request identifier. At block 3905, the process can send a workload request packet that includes the workload request capsule to a virtualized service endpoint. At block 3906, the process can receive a workload response packet that includes the workload request identifier and a workload response payload.

Figure 40:
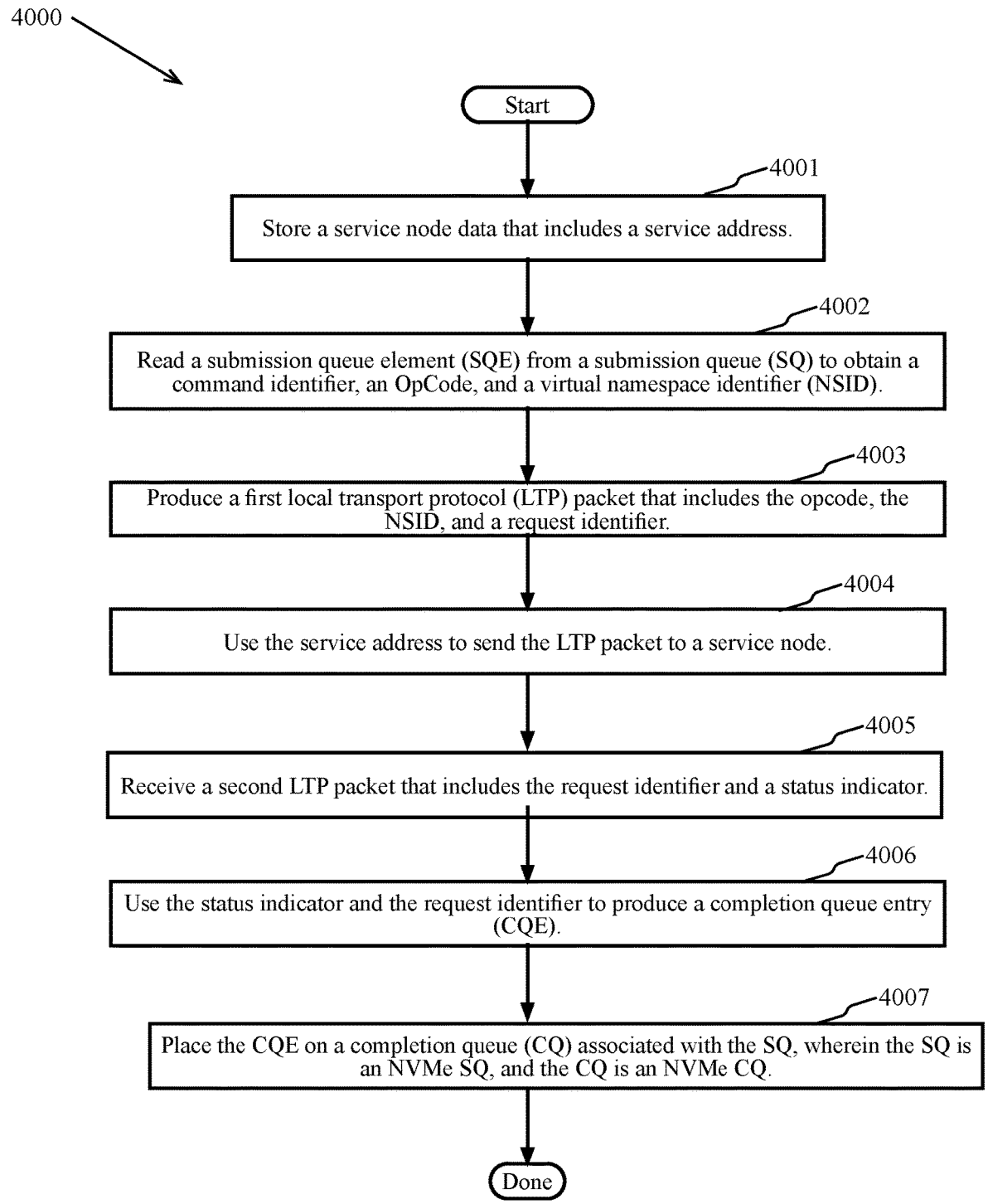
FIG. 40 is a high-level flow diagram of a method for providing a virtualized NVMe over fabric (NVMe-oF) service according to some aspects.

FIG. 40 is a high-level flow diagram of a method for providing a virtualized NVMe over fabric (NVMe-oF) service 4000 according to some aspects. After the start, at block 4001, the process can store a service node data that includes a service address. At block 4002, the process can read a submission queue element (SQE) from a submission queue (SQ) to obtain a command identifier, an OpCode, and a virtual namespace identifier (NSID). At block 4003, the process can produce a first local transport protocol (LTP) packet that includes the opcode, the NSID, and a request identifier. At block 4004, the process can use the service address to send the LTP packet to a service node. At block 4005, the process can receive a second LTP packet that includes the request identifier and a status indicator. At block 4006, the process can use the status indicator and the request identifier to produce a completion queue entry (CQE). At block 4007, the process can place the CQE on a completion queue (CQ) associated with the SQ, wherein the SQ is an NVMe SQ, and the CQ is an NVMe CQ.

Figure 41:
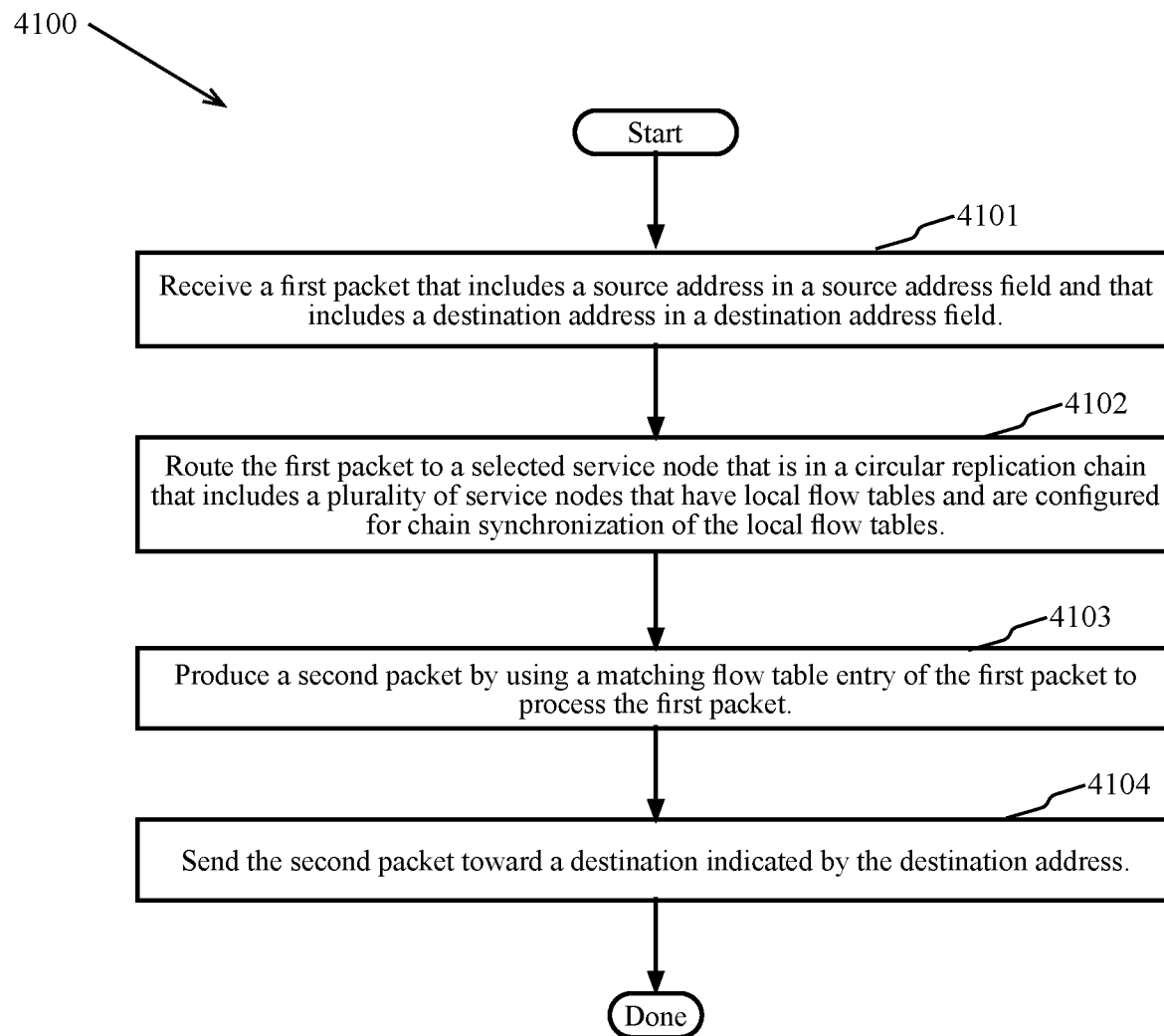
FIG. 41 is a high-level flow diagram of a method for service state replication using original data packets according to some aspects.

FIG. 41 is a high-level flow diagram of a method for service state replication using original data packets 4100 according to some aspects. At block 4101, the process can receive a first packet that includes a source address in a source address field and that includes a destination address in a destination address field. At block 4102, the process can route the first packet to a selected service node that is in a circular replication chain that includes a plurality of service nodes that have local flow tables and are configured for chain synchronization of the local flow tables. At block 4103, the process can produce a second packet by using a matching flow table entry of the first packet to process the first packet. At block 4104, the process can send the second packet toward a destination indicated by the destination address.

The techniques described herein can be implemented at least in part by NICs and service nodes that are integrated into a rack along with services and a switch fabric. In accordance with an embodiment of the invention, an equipment rack includes multiple servers, each server having a NIC, a service node, and a switch fabric that connects the multiple servers to the service node via the NICs, wherein the NICs and the service node are configured to implement network interface services as described herein. In accordance with another embodiment of the invention, an equipment rack includes multiple servers, each server having a NIC, and at least one smart switch including multiple service nodes and a switch fabric to connect the multiple servers to the service nodes, wherein the multiple servers connect to the smart switch via the NICs, and wherein the NICs and the service nodes are configured to implement network interface services as described herein. In accordance with another embodiment of the invention, an equipment rack includes multiple Rack Units (RUs) including multiple servers and at least one smart switch, the servers including a host computer and a NIC, and the at least one smart switch including multiple service nodes and a switch fabric to connect the multiple servers to the service nodes, wherein the multiple servers connect to the smart switch via the NICs, and wherein the NICs and the service nodes are configured to implement network interface services as described herein.

Aspects described above can be ultimately implemented in a network appliance that includes physical circuits that implement digital data processing, storage, and communications. The network appliance can include processing circuits, ROM, RAM, CAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The network appliance may be embodied as a single IC device (e.g., fabricated on a single substrate) or the network appliance may be embodied as a system that includes multiple IC devices connected by, for example, a printed circuit board (PCB). The interfaces may include network interfaces (e.g., Ethernet interfaces and/or InfiniB and interfaces) and/or PCI Express (PCIe) interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
receiving a data link layer packet (DLLP) from a host computer via a PCIe bus;
unpacking the DLLP to obtain a transport layer packet (TLP) that includes a TLP address value, a TLP requester identifier, and a TLP type;
sending a DLLP ACK message to the host computer in response to receiving the TLP;
using the TLP to create a workload request capsule that includes a request type indicator, an address offset, and a workload request identifier;
sending a workload request packet that includes the workload request capsule to a virtualized service endpoint; and
receiving a workload response packet that includes the workload request identifier and a workload response payload.

2. The method of claim 1 further including:
using the TLP requester identifier and the workload response payload to produce a second TLP; and
sending the second TLP to the host computer via the PCIe bus.

3. The method of claim 1 further including:
receiving the workload request packet;
producing the workload response payload based on the request type indicator or the address offset;
producing the workload response packet; and
sending the workload response packet.

4. The method of claim 1, further including:
using the request type indicator to determine a request type;
using a local base address and the address offset to determine a local address;
creating a first local TLP that includes the request type in a TLP type field and that includes the local address in a TLP address field;
sending the first local TLP to a PCIe function via a local PCIe bus; and
receiving a second local TLP that is responsive to the first local TLP,
wherein the second local TLP is used to produce the workload response payload.

5. The method of claim 1, further including:
using the request type indicator to identify an executable code; and
producing a code output by executing the executable code,
wherein the code output is used to produce the workload response payload.

6. The method of claim 1 further including:
receiving a workload write request capsule that includes a write address offset and data;
using the write address offset to determine a write address;
using a direct memory access operation to write the data into a location in a memory, wherein the location in the memory is determined using the write address; and
sending a workload write response capsule indicating that the data has been successfully written.

7. The method of claim 1 wherein:
a virtualized PCIe function map associates a plurality of PCIe functions with a plurality of virtualized service endpoints;
the host computer sends the TLP to a PCIe function; and
the virtualized service endpoint is determined based on the PCIe function and the virtualized PCIe function map.

8. The method of claim 1 wherein:
a plurality of TLPs is used to create the workload request packet; and
the workload response packet is used to produce a second plurality of TLPs.

9. The method of claim 1 wherein:
the host computer sends the TLP to a PCIe function that has a base address; and
the address offset indicates a difference of the TLP address value relative to the base address.

10. The method of claim 1 wherein:
a plurality of service nodes in a circular replication chain are configured for chain replication of a virtualized service state information;
each of the service nodes has an upstream peer and has a downstream peer in the circular replication chain; and
a load balancer routes the workload request packet to a selected service node that is one of the service nodes.

11. The method of claim 10 wherein:
processing the workload request packet by the selected service node does not change the virtualized service state information; and
the selected service node sends the workload response packet without waiting for a virtualized service state replication confirmation.

12. The method of claim 10 wherein:
processing the workload request packet by the selected service node changes the virtualized service state information; and
the selected service node waits for a virtualized service state replication confirmation from the upstream peer before sending the workload response packet.

13. A system comprising:
a PCIe device attached to a PCIe bus of a host computer, wherein the PCIe device is configured to
receive a transport layer packet (TLP) that includes a TLP requester identifier,
send a DLLP ACK message via the PCIe bus in response to receiving the TLP,
use the TLP to create a workload request capsule,
send the workload request capsule to a virtualized service endpoint,
receive a workload response packet that includes a workload request identifier, and
send a second TLP that is responsive to the TLP to the host computer via the PCIe bus.

14. The system of claim 13 further including:
a service node configured to
  receive the workload request capsule,
    use an address offset and a request type indicator in the workload request capsule to produce the workload response packet, and
    send the workload response packet to the PCIe device.

15. The system of claim 14 wherein the service node is configured to:
  receive a workload write request capsule that includes a write address offset and data;
  use the write address offset to determine a write address;
  use a direct memory access operation to write the data into a location in a memory, wherein the location in the memory is determined using the write address; and
  send a workload write response capsule indicating that the data has been successfully written.

16. The system of claim 13 wherein the PCI device is configured to:
  receive a workload write request capsule that includes a write address offset and data;
  use the write address offset to determine a write address;
  use a direct memory access operation to write the data into a location in a memory of the host computer, wherein the location in the memory is determined using the write address; and
  sending a workload write response capsule indicating that the data has been successfully written.

17. A system comprising:
  a circular replication chain that includes a plurality of service nodes configured to replicate virtualized service state information via chain replication; and
  a load balancer configured to distribute workload packets among the plurality of service nodes,
  wherein each of the service nodes is configured to
    provide a virtualized PCIe function,
    receive a workload request packet that includes a workload request capsule from a PCIe device,
    process the workload request capsule to produce a workload response payload by using an address offset or a request type indicator in the workload request capsule,
    send the workload response payload in a workload response packet to the PCIe device,
    send replication packets to a downstream peer in the circular replication chain, and
    receive replication packets from an upstream peer in the circular replication chain.

18. The system of claim 17 wherein:
  the load balancer routes the workload request packet to a selected service node that is one of the service nodes;
  processing the workload request capsule by the selected service node does not change the virtualized service state information; and
  the selected service node sends the workload response packet without waiting for a virtualized service state replication confirmation from the upstream peer.

19. The system of claim 17 wherein:
  the load balancer routes the workload request packet to a selected service node that is one of the service nodes;
  processing the workload request capsule by the selected service node changes the virtualized service state information;
  the selected service node sends a replication packet to the downstream peer; and
  the selected service node waits for a virtualized service state replication confirmation from the upstream peer before sending the workload response packet.

20. A system comprising:
  a virtualized function means for providing a virtualized function to a workload running on a host computer;
  a means for the virtualized function means to receive a transport layer packet (TLP) from the host computer;
  a means for acknowledging the TLP;
  a means for using the TLP to create a request means;
  a means for sending the request means to a virtualized service means; and
  a means for receiving a response means that is responsive to the request means,
  wherein
    the virtualized service means is configured to provide a virtualized service to the workload via the virtualized function means, and
    the virtualized service means communicates with the host computer using internet protocol packets.

* * * * *